(12) United States Patent
Kawai et al.

(10) Patent No.: US 10,478,725 B2
(45) Date of Patent: Nov. 19, 2019

(54) GAME MACHINE AND PROGRAM

(71) Applicant: KONAMI DIGITAL ENTERTAINMENT CO., LTD., Tokyo (JP)

(72) Inventors: Norifumi Kawai, Tokyo (JP); Shinya Suga, Tokyo (JP)

(73) Assignee: KONAMI DIGITAL ENTERTAINMENT CO., LTD., Minato-ku, Tokyo (JP)

(*) Notice: Subject to any disclaimer, the term of this patent is extended or adjusted under 35 U.S.C. 154(b) by 0 days.

(21) Appl. No.: 15/671,297

(22) Filed: Aug. 8, 2017

(65) Prior Publication Data
US 2017/0333791 A1 Nov. 23, 2017

Related U.S. Application Data

(63) Continuation-in-part of application No. PCT/JP2016/052012, filed on Jan. 25, 2016.

(30) Foreign Application Priority Data

Feb. 10, 2015 (JP) ................................ 2015-024137

(51) Int. Cl.
*A63F 13/44* (2014.01)
*A63F 13/837* (2014.01)
(Continued)

(52) U.S. Cl.
CPC .......... *A63F 13/44* (2014.09); *A63F 13/2145* (2014.09); *A63F 13/25* (2014.09);
(Continued)

(58) Field of Classification Search
USPC ............................................................ 463/7
See application file for complete search history.

(56) References Cited

U.S. PATENT DOCUMENTS 9,216,353 B2 * 12/2015 Haswell .................. A63F 13/10
2004/0048644 A1 * 3/2004 Gerrard ................... G07F 17/32
463/16
(Continued)

FOREIGN PATENT DOCUMENTS

JP H10-156039 A 6/1998
JP 3442184 B2 9/2003
(Continued)

OTHER PUBLICATIONS

Communication dated Jun. 26, 2018, from the Japanese Patent Office in counterpart application No. 2016-574631.
(Continued)

*Primary Examiner* — Pierre E Elisca
(74) *Attorney, Agent, or Firm* — Sughrue Mion, PLLC

(57) ABSTRACT

A game machine includes a game operation acceptance device configured to accept one or more game operations. The game machine also includes a skill evaluating device configured to determine whether or not the one or more game operations that are accepted satisfy one or more predefined skill conditions. The game machine also includes a game value consuming device configured to consume a game value in case that the skill evaluating device determined that the one or more game operations that are accepted satisfy one or more predefined skill conditions.

15 Claims, 33 Drawing Sheets

(51) Int. Cl.
  *A63F 13/426* (2014.01)
  *A63F 13/2145* (2014.01)
  *A63F 13/69* (2014.01)
  *A63F 13/25* (2014.01)
  *G07F 17/32* (2006.01)
  *A63F 13/798* (2014.01)
  *A63F 13/792* (2014.01)

(52) U.S. Cl.
  CPC ............ *A63F 13/426* (2014.09); *A63F 13/69* (2014.09); *A63F 13/837* (2014.09); *G07F 17/3209* (2013.01); *G07F 17/3211* (2013.01); *G07F 17/3246* (2013.01); *G07F 17/3267* (2013.01); *G07F 17/3269* (2013.01); *A63F 13/792* (2014.09); *A63F 13/798* (2014.09)

(56) References Cited

U.S. PATENT DOCUMENTS

| | | | | |
|---|---|---|---|---|
| 2014/0274242 | A1* | 9/2014 | Haswell | A63F 13/10 463/7 |
| 2014/0274304 | A1* | 9/2014 | Haswell | A63F 13/10 463/23 |

FOREIGN PATENT DOCUMENTS

| | | |
|---|---|---|
| JP | 2005-085162 A | 3/2005 |
| JP | 3686906 B2 | 8/2005 |
| JP | 2011-188985 A | 9/2011 |
| JP | 2013-223543 A | 10/2013 |

OTHER PUBLICATIONS

Communication dated Apr. 10, 2018, from the Japanese Patent Office in counterpart application No. 2016-574709.
Nintendo Koshiki Guidebook Cho Soju Meka MG, 1st Edition, Shogakukan Inc., Nov. 1, 2006, p. 152, see the passage 'Mission o Clear shita Ato, Item o Nyusyu Dekiruka Doka wa Random ni Kimaru'. (4 pages total), Cited in ISR dated Mar. 8, 2016 & dated Mar. 22, 2016.
Dodonpachi Daiojo, ARCADIA, Aug. 1, 2002, vol. 3, No. 8, pp. 90 to 95, particularly, p. 91, refer to 'Shume dewa Ika no Joken de Zanki ga Fuerunoda. "Sono Stage o Toshite Nomisu Clear" Matawa "Sono Stage o Toshite Bomb Mishiyo (Hyper wa Ka)" no Futatsu. Kono Dochiraka no Joken o Mitaseba, Stage Clear-ji ni Zanki ga Ikki Fueru'. (10 pages total), Cited in ISR dated Mar. 8, 2016.
Playstation 2 Armored core 2 Another Age Koshiki Guidebook, 1st edition, Shogakukan Inc.,jun. 10, 2001, p. 180, see the description that the reward is on a piecework basis and directly commensurate with the number of enemies defeated.(4 pages total), Cited in ISR dated Mar. 22, 2016.
International Search Report dated Mar. 8, 2016, in counterpart International Application No. PCT/JP2015/084023.
Written Opinion of the International Searching Authority dated Mar. 8, 2016, in counterpart International Application No. PCT/JP2015/084023.
International Search Report dated Mar. 22, 2016, in counterpart International Application No. PCT/JP2016/052012.
Written Opinion of the International Searching Authority dated Mar. 22, 2016, in counterpart International Application No. PCT/JP2016/052012.
Communication dated Dec. 5, 2017, from Japanese Patent Office in counterpart application No. 2016-574631.
Communication dated Dec. 5, 2017, from Japanese Patent Office in counterpart application No. 2016-574709.
Communication dated Feb. 27, 2019, from United States Patent and Trademark Office in counterpart U.S. Appl. No. 15/672,524.
Notice of Allowance dated Jul. 17, 2019 in U.S. Appl. No. 15/672,524.
Office Action dated Aug. 6, 2019 in Japanese Application No. 2016-574631.

* cited by examiner

| INSTRUCTING OBJECT ID | DRAWING REWARD | WINNING PROBABILITY |
|---|---|---|
| IO0001 | A1 | B1 |
| IO0002 | A2 | B2 |
| IO0003 | A3 | B3 |
| IO0004 | A4 | B4 |
| IO0005 | A5 | B5 |
| IO0006 | A6 | B6 |
| IO0007 | A7 | B7 |
| IO0008 | A8 | B8 |
| IO0009 | A9 | B9 |

D112

| INSTRUCTING OBJECT ID | DRAWING REWARD | WINNING PROBABILITY | REQUIRED NUMBER OF WINS | OPERATION CREDIT AMOUNT |
|---|---|---|---|---|
| IO0001 | A1 | B1 | N1 | C1 |
| IO0002 | A2 | B2 | N2 | C2 |
| IO0003 | A3 | B3 | N3 | C3 |
| IO0004 | A4 | B4 | N4 | C4 |
| IO0005 | A5 | B5 | N5 | C5 |
| IO0006 | A6 | B6 | N6 | C6 |
| IO0007 | A7 | B7 | N7 | C7 |
| IO0008 | A8 | B8 | N8 | C8 |
| IO0009 | A9 | B9 | N9 | C9 |

| INSTRUCTING OBJECT ID | DRAWING REWARD | WINNING PROBABILITY |
|---|---|---|
| L1 | A11 | B11 |
| L2 | A12 | B12 |
| R1 | A13 | B13 |
| R2 | A14 | B14 |
| C1 | A15 | B15 |
| C2 | A16 | B16 |

| OPERATION START INSTRUCTION TIMING | OPERATION END INSTRUCTION TIMING | INSTRUCTING OBJECT ID |
|---|---|---|
| t1 | – | L1 |
| t2 | – | R1 |
| t3 | – | L1 |
| t4 | – | R1 |
| t5 | t6 | L2 |
| t7 | t8 | R2 |
| t9 | – | C1 |
| t10 | t11 | C2 |
| t12 | – | L1 |
| t13 | – | R1 |
| . | . | . |
| . | . | . |
| . | . | . |

GAME MACHINE AND PROGRAM

TECHNICAL FIELD

Embodiments of the present invention generally relate to a game machine and a program.

BACKGROUND ART

Japanese Patent Application Publication No. 2011-188985 discloses a game in which the operation timing is instructed to a player and the game operating skill (game skill) of the player is evaluated in accordance with the time difference between the instructed operation time and the actual operation time. There is a game that advances by consuming game value, for example, credits held by the player, and that pays out game value to the player in accordance with the game results.

In a game machine that increases and decreases the game value in this manner, it is difficult to make the game results reflect game skill. For example, if the game skill is reflected in the game results, a player with a low skill level will consume game value more quickly as the game advances than a player with a high skill level, and it can be imagined that a player with a low skill level will avoid playing the game.

SUMMARY

In one aspect of the present invention, a game machine may include, but is not limited to, a game operation acceptance device configured to accept one or more game operations; a skill evaluating device configured to determine whether or not the one or more game operations that are accepted satisfy one or more predefined skill conditions; and a game value consuming device configured to consume a game value in case that the skill evaluating device determined that the one or more game operations that are accepted satisfy one or more predefined skill conditions.

BRIEF DESCRIPTION OF THE DRAWINGS

FIG. 11 shows an example of object data according to the same embodiment.

FIG. 20 shows an example of object data according to the same embodiment.

FIG. 21 shows an example of sequence data according to the same embodiment.

EMBODIMENTS

Embodiments of the present invention are described below, with references made to the drawings.

First Embodiment

The first embodiment of the present invention will now be described.

(Game Machine 10 Overview)

An overview of the game machine 10 according to the present embodiment will first be described.

The game machine 10 is a device that executes a game that can advance by the consumption of credit (game value) held by a player. In this case, the game executed by the game machine 10 will be described for the case in which, based on the timing with which a player performs a game operation, the game operating skill is evaluated, in a so-called timing game. In the present embodiment, as one example, by inserting a medal M into the game machine 10, the player accumulates credit, and the timing game can be advanced by consuming the credit.

Figure 1:
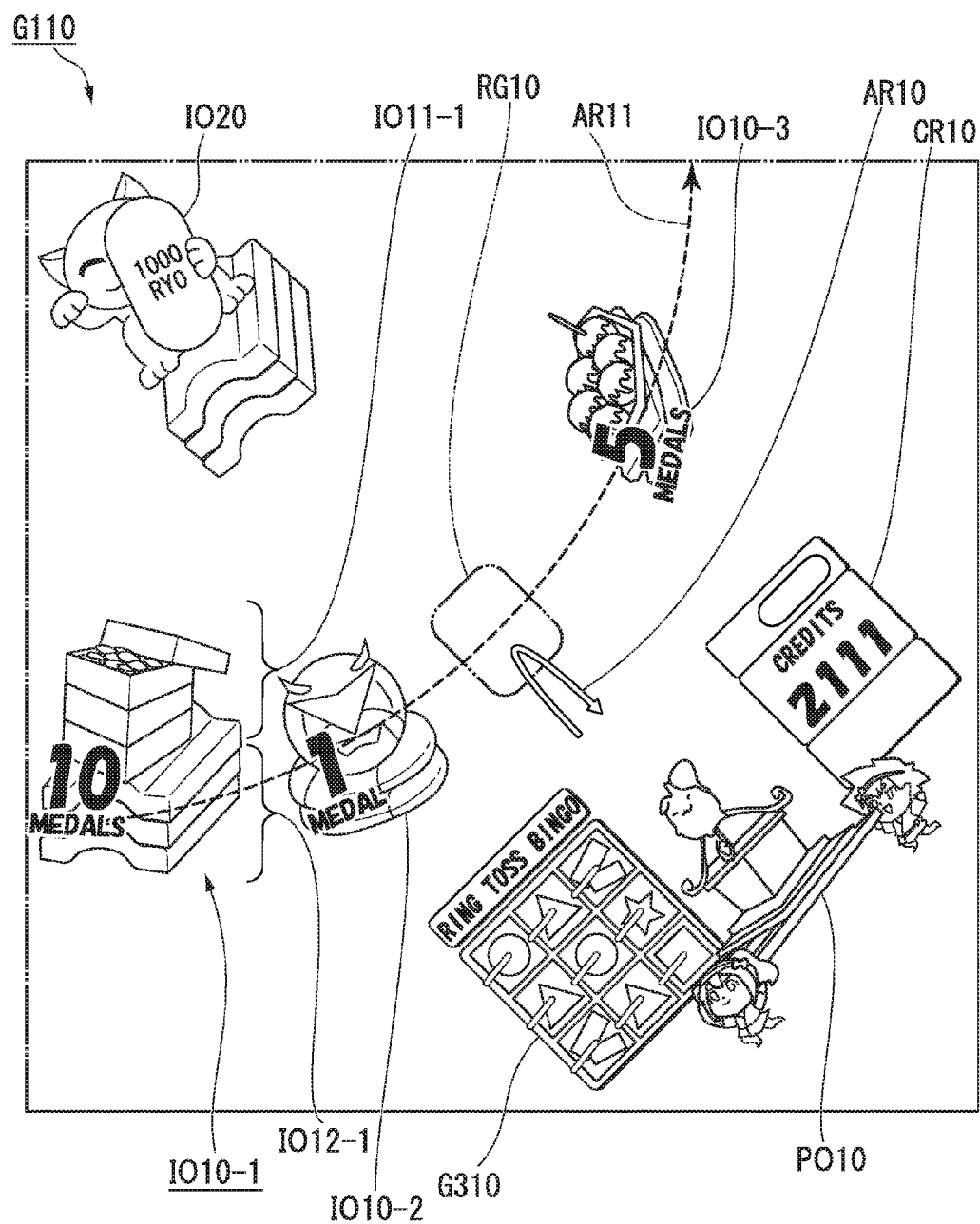
FIG. 1 is a first drawing showing a game screen of a first game according to a first embodiment of the present invention.

FIG. 1 shows a game screen G110 of a game executed by the game machine 10 according to the first embodiment of the present invention.

The game machine 10 according to the present embodiment has a touch panel 12, to be described later, and displays a game screen of a timing game. The game screen G110 shown in FIG. 1 displays the three game objects IO10-1, IO10-2, and IO10-3 and a player object PO10.

The player object PO10 is a game object that specifies a position based on a player's game operation. In the following, such a game object will be called a player object. In this case, as one example, the case will be described in which the game machine 10 moves the player object PO10 along the operation path AR10 in response to a game operation, that is, the case in which return is made to the initial position after movement from the initial position upward by a prescribed distance movement.

The game objects IO10-1, IO10-2, and IO10-3 instruct the players regarding the timing for making a game operation. In the following, this type of game object will be called an instructing object. In this case, as one example, the case will be described in which the game machine 10 instructs regarding the game operation timing by moving the game objects IO10-1, IO10-2, and IO10-3 along the movement path AR11. In the following, if there is no need to distinguish the instructing objects IO10-1, IO10-2, and IO10-3, they will be referred to as instructing objects 10.

If a player's game operation satisfies a prescribed skill condition, the game machine 10 consumes a prescribed amount of credits. If the player game operation satisfies a prescribed skill condition, the game machine 10 determines a reward with respect to the game object. If, however, the player's game operation does not satisfy the prescribed skill condition, the above-noted prescribed amount of credit is not consumed.

In this case, the skill condition is a condition taken as an indicator when evaluating the skill of a player game operation. A game operation for advancing the game. The skill condition in the present embodiment is the difference (distance) between the position of the instructing object and the position specified based on a player game operation being a value within a prescribed range. More specifically, one example of the skill condition in the present embodiment is performing a game operation so that the player object PO10 reaches the region RG10 at the timing of the instructing object IO reaching the region RG10.

As described above, the game machine 10 according to the present embodiment does not consume the prescribed amount of credit if the prescribed skill condition is not satisfied. Therefore, if the game operating skill is low in the game machine 10 according to the present embodiment, the prescribed amount of credit is not consumed and also no reward is determined. In the case of a high game operating skill, the prescribed amount of credit is consumed and also a reward is determined. By doing this, the game machine 10 can avoid having a player with a low skill level consume more credit than a player with a high skill level.

(Hardware Constitution of Game Machine 10)

The hardware constitution will next be described.

Figure 2:
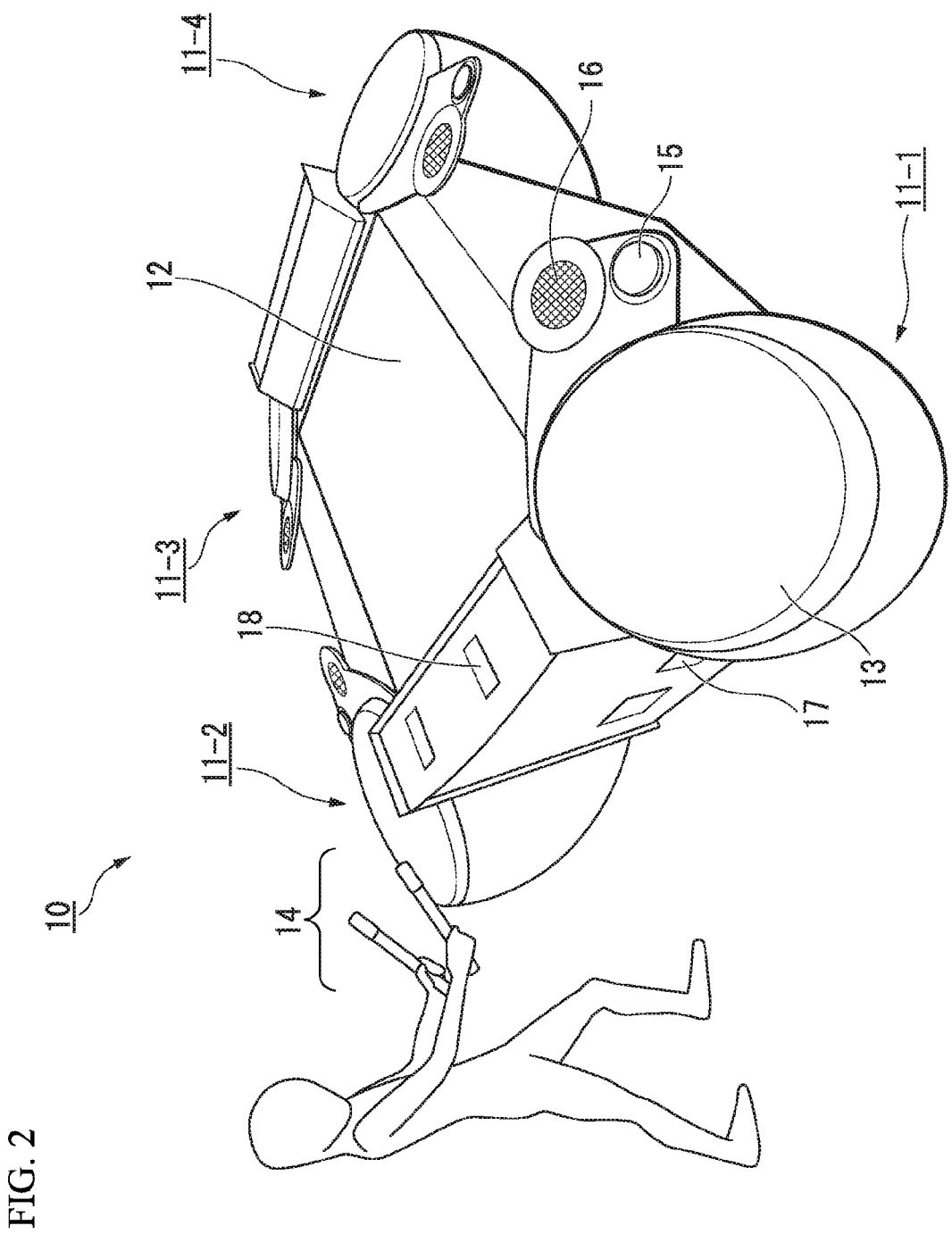
FIG. 2 shows an example of the hardware constitution of a game machine according to the same embodiment.

FIG. 2 shows an example of the hardware constitution of the game machine 10 according to the present embodiment.

The game machine 10 has four units, 11-1, 11-2, 11-3, and 11-4 and a touch panel 12 that is shared between the four units 11-1, 11-2, 11-3, and 11-4. The touch panel 12 has a substantially rectangular, flat shape and is installed so that the display region thereof faces upward. The height from the surface on which the game machine 10 is installed to the upper surface of the touch panel 12 is, for example, a height corresponding to the waste level of a child standing upright. In this manner, by installing the touch panel 12 at a low position, players have a wide view of the game screen, without a restriction on height or the like.

Figure 3:
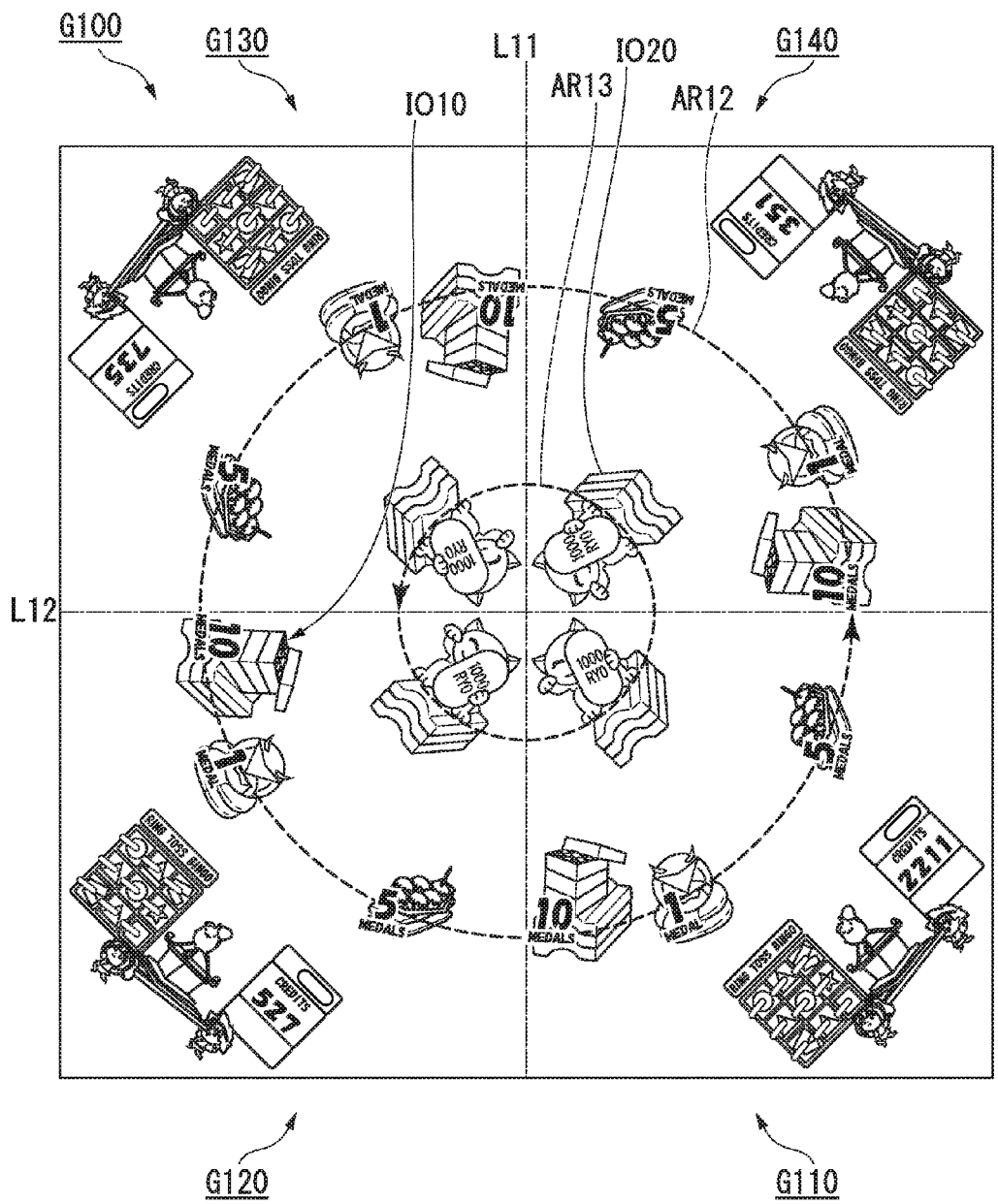
FIG. 3 is a second drawing showing a game screen of a timing game according to the same embodiment.

The four units 11-1, 11-2, 11-3, and 11-4, for example, are provided at positions corresponding to the four corners of the touch panel 12, and are positioned, when seen from above, in the clockwise direction in that sequence. In the following, the units 11-1, 11-2, 11-3, and 11-4 will be collectively called the unit 11. As shown in FIG. 3, the line segment joining the center point of the side between the units 11-1 and 11-2 and the center point of the side between the units 11-3 and 11-4 is defined as L11, and the line segment joining the center point of the side between the units 11-1 and 11-4 and the center point of the side between the units 11-2 and 11-3 is defined as L12.

Players stand at positions corresponding to each of the units 11 (hereinafter referred to as the player positions) and make game operations while facing the touch panel 12 side.

The touch panel 12 can switch between a game screen of a timing game that advances for each unit 11 and a game screen of a timing game that advances simultaneously for a plurality of units 11. In the following, the game mode in which the timing game advances for each unit 11 will be referred to as the individual play mode, and the game mode in which the timing game advances simultaneously for a plurality of units 11 will be referred to as the group play mode.

FIG. 3 shows one example of the display of the game screen in the individual play mode.

As in the game screen G100 shown in FIG. 3, in the individual play mode, the display region of the touch panel 12 is divided into four parts by the line segments L11 and L12 that join the center points of opposing sides, these being allocated to each of the units 11. Doing this enables the touch panel 12 to display one of the game screens G110, G120, G130, and G140 for each unit 11.

Figure 4:
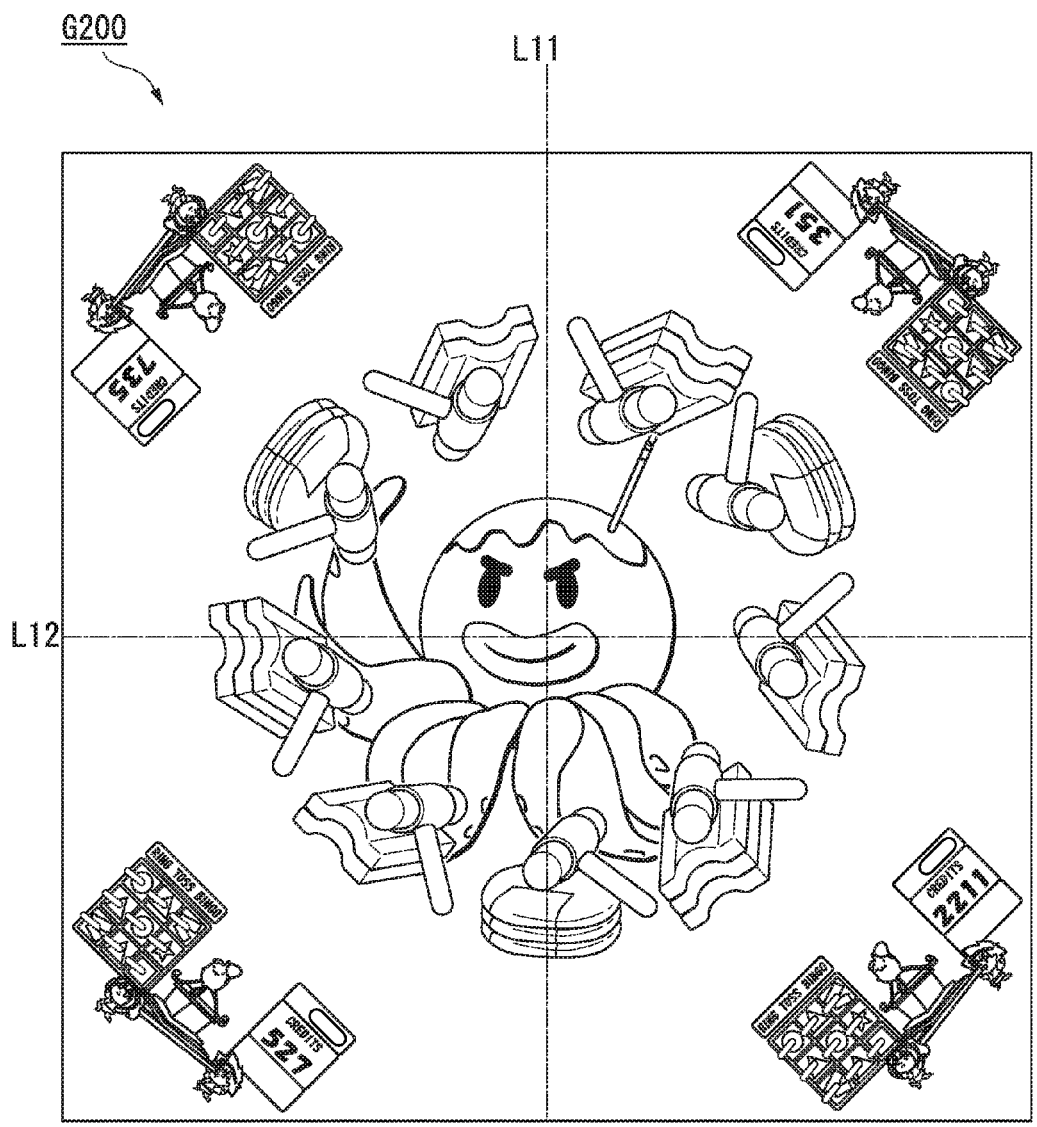
FIG. 4 is a third drawing showing a game screen of a timing game according to the same embodiment.

FIG. 4 shows one example of the game screen display in the group play mode.

As in the game screen G200 shown in FIG. 4, in the group play mode, the touch panel 12 can integrate the entire display region and display a game screen that is common to all the units 11. In the group play mode, the game screen may be displayed continuously connected, as in the game screen G100 shown in FIG. 3 between neighboring units 11. By doing this, the game machine 10 can provide a so-called group play mode timing game, which advances simultaneously in a plurality of units 11.

Next, the hardware constitution of the unit 11 will be described. The units 11-1, 11-2, 11-3, and 11-4 have the same hardware constitution. The units 11 are installed at positions that correspond to the corners of the game screen G110 in the touch panel 12. The unit 11 has a drum 13, an operating button 15, a speaker 16, a medal payout unit 17, and a medal inserter unit 18.

The drum 13 has a structure with a skin drawn across a cylindrically shaped body. The film forms a striking surface of the drum 13, and game operation is done by a player striking (hitting) the film of the drum 13 to play the drum with a pair of sticks 14 or the hands. On the rear side of the striking surface of the drum 13 is provided a shock sensor that detects a shock imparted to the striking surface, enabling acceptance of a game operation of a player striking the striking surface. The shock sensor, for example, can detect and distinguish between at least a shock imparted to a left-side region and a shock imparted to the right-side of the striking surface as seen from the player. The detection mechanism of the shock sensor is arbitrary. In this case, as one example, the case will be described in which a plurality of pushbuttons are provided as shock sensors on the rear side of the striking surface, enabling identification of a region that has been struck by a player by the position of a pushbutton that is depressed by a shock to the striking surface. In the following, a game operation with respect to the drum 13 will be referred to as a "striking operation." A different sensor that detects a physical quantity may be used in place of the shock sensor. An example of another sensor that may be used is a touch sensor.

The height from the installation surface on which the game machine 10 is installed to the striking surface is substantially the same as the height from the installation surface to the upper surface of the touch panel 12. By doing this, the players making game operations at each playing position can observe the presence of other players, the play situations, and expressions and the like while making game operations, without having their vision blocked by the touch panel 12 or the drum 13 or the like.

The striking surface of the drum 13, in addition to facing upward, forms a gradual incline that lowers with movement toward the outside, away from the touch panel 12. By doing this, compared with providing the striking surfaces of the drums 13 so that they face the players, the players making game operations can easily strike the striking surface of the drum 13, without a restriction on player height or the like. Therefore, in addition to being easy to use, the game machine 10 enables game operations to be made by players of diverse heights.

The unit 11-1 is provided with an operating button 15 on the right side of the drum 13 as seen from a player making game operations. The operating button 15 is a pushbutton that accepts an operation by a player. By pushing the operating button 15 the player can, for example, use an item gotten in a timing game or select the game mode or the like.

A speaker 16 is provided on the touch panel 12 side of the operating button 15. The speaker 16 plays back a timing game melody, sound effects, or a voice.

The medal payout unit 17 is a member for paying out medals M obtained by the player playing the timing game.

The medal inserter unit 18 is a member for inserting medals that are consumed as credit in the timing game. The structure of the medal inserter unit 18 will now be described.

Figure 5:
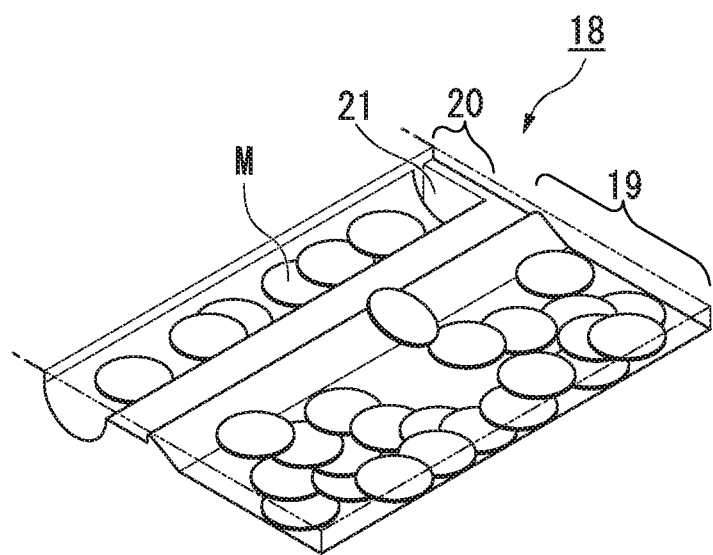
FIG. 5 is an enlarged view of the medal inserter unit of a game machine according to the same embodiment.

FIG. 5 is an enlarged view of the medal inserter unit 18 of the game machine 10 according to the present embodiment.

The medal inserter unit 18 is provided to the outside of the touch panel 12, on the other side from the operating button 15 and the speaker 16, with the drum therebetween (on the left side of the drum 13 as seen from the player operating the game at the unit 11-1). As shown in FIG. 5, the medal inserter unit 18 has a medal holder 19, a medal locating groove 20, and a metal inserting port 21.

The medal holder 19 has rectangular planar shape having its longitudinal direction in the direction along the line segment L11 and has a depression formed in the bottom thereof. A plurality of medals M are held in medal holder 19.

The medal locating groove 20 is provided on the side opposite from the drum 13, with the medal holder 19 therebetween (on the left side of the medal holder 19 as seen from the player operating the game at the unit 11-1). The medal locating groove 20 extends along the line segment L11. Both end faces of the medal locating groove 20 are flat, and are disposed along the vertical direction.

The medal locating groove 20 has a semicircular cross-sectional shape. The radius of curvature of the inner surface of the medal locating groove 20 is substantially the same as or slightly larger than the radius of a medal M. The radius of curvature of the inner surface of the medal locating groove 20 is larger than the radius of the stick 14. This enables the player to slide end tip of the stick 14 in the inner surface of the medal locating groove 20 while moving it along the medal locating groove 20.

The medal inserting port 21 is formed in the end part of the touch panel 12 side of the medal locating groove 20. The medal inserting port 21 is a slit that communicates between the inside and outside of the medal locating groove 20 and is formed along the end face of the touch panel 12 side of the medal locating groove 20. The width of the medal inserting port 21 is made sufficiently wider than the thickness of a medal M.

In this case, it is preferable that, of the inside surface of the medal holder 19, the inside surface on the medal locating groove 20 side is an inclined surface that is inclined gradually upward moving toward the medal locating groove 20. By doing this, a player can operate the stick 14 to easily move a required number of medals M to the medal locating groove 20 from among the medals M inside the medal holder 19.

Regarding the medal inserter unit 18 constituted as described above, a player inserts a medal M into the game machine 10 as follows.

First, the player manipulates the stick 14 to move a prescribed number of medals M from inside the medal holder 19 to the medal locating groove 20, using the end of the stick 14.

Then, the player manipulates the stick 14 to slide the end thereof on the inner surface of the medal locating groove 20 while moving it toward to the touch panel 12. When that is done, a plurality of medals M in the medal locating groove 20 are stood upright in the medal locating groove 20 and move toward the touch panel 12 side end face of the medal locating groove 20 in the condition in which they mutually overlap. By doing this, of the plurality of medals M, a medal M that has reached the end face of the touch panel 12 side of the medal locating groove 20 is inserted into the game machine 10 via the medal inserting port 21. In this manner, by manipulating the stick 14, medals M can be successively inserted into the game machine 10 via the medal inserting port 21. The length of the medal locating groove 20 is, for example, preferably 50% that of the stick 14 or longer. By doing this, because a player can move the end of the stick 14 along the medal locating groove 20 in the condition in which the stick is sufficiently horizontal, a plurality of medals M can be easily stood upright in the medal locating groove 20, and the medals M can be inserted from the medal inserting port 21.

(Game Overview)

Next, referring to FIG. 1 and FIG. 6 to FIG. 9, an overview of the game executed by the game machine 10 will be described.

First, the game screen of the timing game according to the present embodiment will be described. The game screen G110 shown in FIG. 1 is an example of the game screen of a timing game that advances at the unit 11-1. In addition to the above-described instructing objects IO10-1, IO10-2, IO10-3, and IO10-4, the game screen G110 displays the player object PO10, the credit display object CR10, the instructing object IO20, and the bingo game sheet G310.

The player object PO10 indicates that the player has made a game operation by changing its position in response to a striking operation by the player. Although in this case an example of only one player object PO10 being displayed is described, a plurality of player objects PO10 may be displayed. For example, a display may be made of player object PO10 that corresponds to a striking operation in the left-side region of the drum 13 and a player object PO10 that corresponds to a striking operation in the right-side region of the drum 13.

As one example, in the present embodiment, the player object PO10 is displayed close to the operating positions of players playing the game at the units 11, in the vicinities of the four corners of the touch panel 12. By doing this, a player can verify at a nearly position the change in the position of the player object PO10, which moves based on the player's own striking operations.

The instructing object IO instructs the timing for a player to make a striking operation by movement along the movement path AR11 and has a region indicating a reward that can be obtained by a drawing. In this case, a striking operation that satisfies a prescribed skill condition is executed as a trigger. That is, if a striking operation satisfies a skill condition, in addition to credit being consumed, a drawing is executed. The reward corresponding to the instructing object IO can be obtained by winning in the drawing. For example, in the reward display region IO11-1 of the instructing object IO10-1 shown in FIG. 1, character string "10 medals" is displayed. The reward, for example, is a prescribed amount of credit, an item that can be used in the timing game, an item corresponding to a square in a bingo game, to be described layer, the right to receive a secondary drawing, or the right to play an addition game. The addition of a game object having a high expected value or an addition amount of game time, for example, may be made as a reward. The game reward, for example, may differ depending upon the type of the instructing object TO, or may be fixed, without regard to the type of the instructing object IO.

The relationship of a striking operation of a player in the timing game and the obtaining of the reward displayed by the instructing object will now be specifically described.

Figure 6:
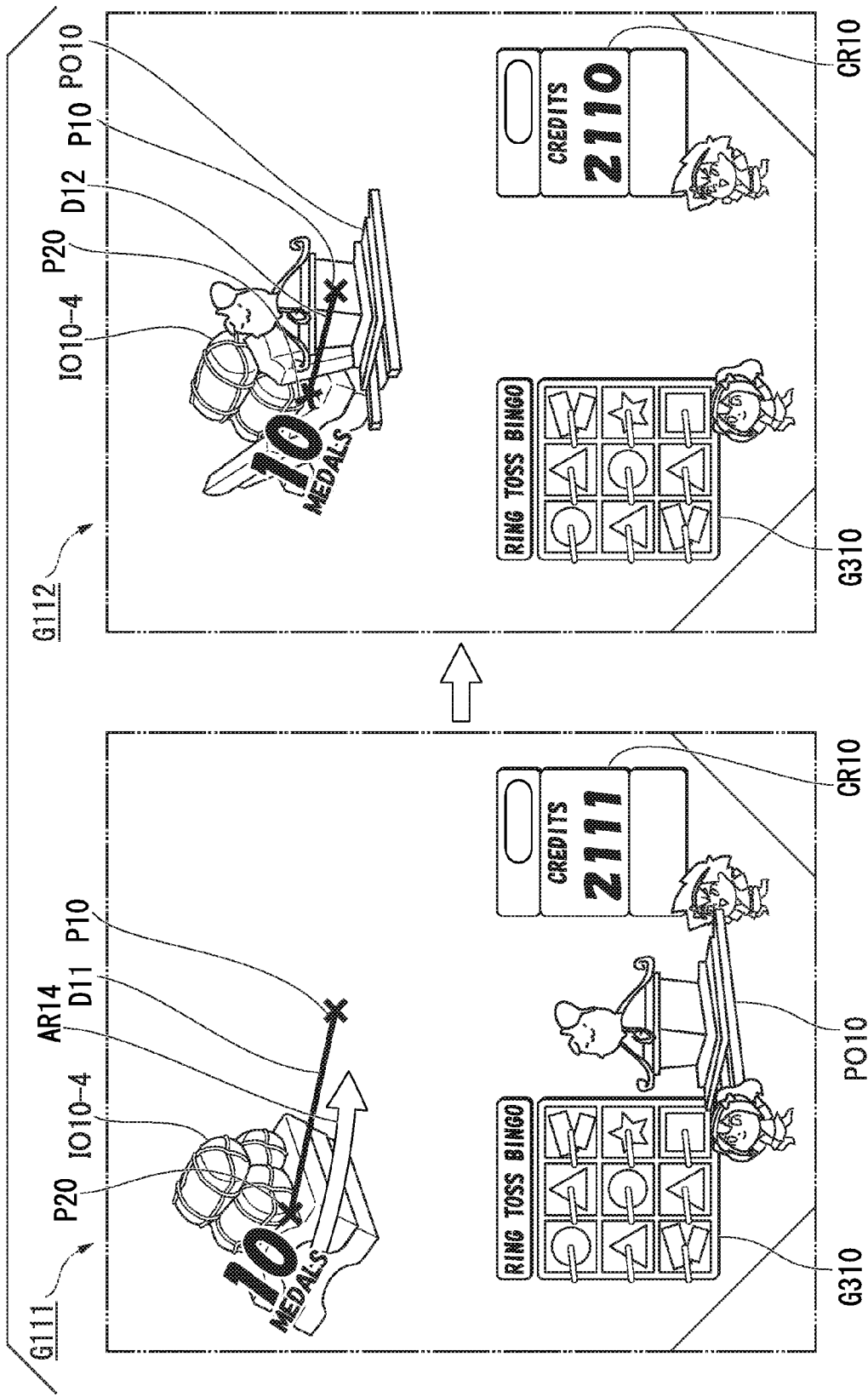
FIG. 6 is a drawing for describing the advancement of a timing game according to the same embodiment.

FIG. 6 is for describing the advancement of a timing game according to the present embodiment.

In the example shown in FIG. 6, the game machine 10 transitions the display from the game screen G111 to the game screen G112. Specifically, the instructing object IO10-4 is moved in accordance with the elapse of time, and the player object PO10 is moved in response to a striking operation. In the game screens G111 and G112, the instructing object IO10-4 is displayed at the upper side of the player object PO10 (that is, from the center of the display surface of the touch panel 12).

If the player strikes the drum 13 when the instructing object IO10-4 passes the top part of the player object PO10, the player object PO10 moves so as to jump up. The player object PO10 then approaches the instructing object IO10-4. When this is done, if the distance D12 between the reference position P10 of the player object PO10 (the position of the intersection between the movement path of the player object PO10 and the movement path of the instructing object OI10-4) and the center position P20 of the instructing object IO10-4 is a value within a prescribed range, that is, if a prescribed skill condition is satisfied, a prescribed amount of credit is consumed. If a prescribed skill condition is satisfied, a drawing is also made. By winning in the drawing, a player can obtain credit corresponding to the "10 medals" represented by the instructing object IO10-4. If there is a win in the above-noted drawing, the instructing object IO10-4 displayed as being broken.

If there was no win in the above-noted drawing, there is no payout of credits corresponding to "10 medals" M, and the prescribed number of credits are merely consumed. However, even if there is no win in the above-noted drawing, a part of the instructing object IO10-4 may be displayed as being broken. Whether or not a part of the instructing object IO10-4 is displayed as being broken may be determined by a drawing separate from the above-noted drawing. If the distance between the player object PO10 and the instructing object IO10-4 is not a value between the prescribed range, as shown by D11 in the game screen G111, the prescribed amount of credit is not consumed, and a drawing to determine whether or not to grant the player the credit reward indicated by the instructing object IO10-4 is also not made.

Next, the types of instructing objects according to the present embodiment will be described.

The instructing objects in the present embodiment include two types, a normal instructing object and a special instructing object.

The normal instructing object instructs the timing for a striking operation at a normal time in a timing game (when not in the special game mode), for example, as the instructing object IO10 shown in FIG. 3.

The special instructing object is an instructing object that instructs the timing for a striking operation in a timing game when a special game mode has been enabled, for example, as the instructing object IO20 shown in FIG. 3. The special instructing object is associated with a reward having a higher value than a normal instructing object. Specifically, a special instructing object may be associated with it a credit that is ten or more times the amount of a payout in the case of a normal instructing object. The striking operation for obtaining the reward represented by a special instructing object can be made only when a prescribed game mode has been reached in the timing game. The special instructing object may be displayed even in a mode that is not the prescribed game mode. By doing this, because the player can verify a reward that is of a higher value being associated with the special instructing object, the game machine 10 can heighten the desire of the player to play the game.

In the example of the game screen G100 shown in FIG. 3, the display positions in the game screen differ between the normal instructing object and the special instructing object. Specifically, the normal instructing object IO10 appears on, moves along, and disappears from the circuit path orbit AR12. The special instructing object IO20 appears on, moves along, and disappears from the circular orbit AR13, which shares its center with the circular orbit AR12, and is positioned closer to the center of the touch panel 12 than the normal instructing object IO10. In this manner, at neighboring units 11, by continuously moving various instructing objects, each player of the units 11 not only can verify the screen allocated to that player, but also can verify a neighboring unit 11 and verify an instructing object that will subsequently be moving into the screen region. However, an instructing object may be made to move only within each of the units 11.

In this case, in the game machine 10, if an instructing object is moved between units 11, the results of a striking operation with respect to the instructing object may be inherited and moved. Specifically, an instructing object displayed as being partially broken by a striking operation at a previous unit 11 may be inherited by the next unit 11 with the display remaining as is. By doing this, because the game machine 10 shows at least on the display an instructing object that is partially broken, it is able to impart a feeling of expectation on the part of the player of soon being able to obtain a reward, thereby heightening the desire to play. In the group play mode, in which a plurality of players cooperate to get a reward from a specific instructing object, by making a display indicating that, by striking operations at each unit 11, a gradual approach is made to obtaining a reward, the feeling of unity between the players in the group play mode can be heightened.

The game mode for enabling operation of a special instructing object will now be described.

Figure 7:
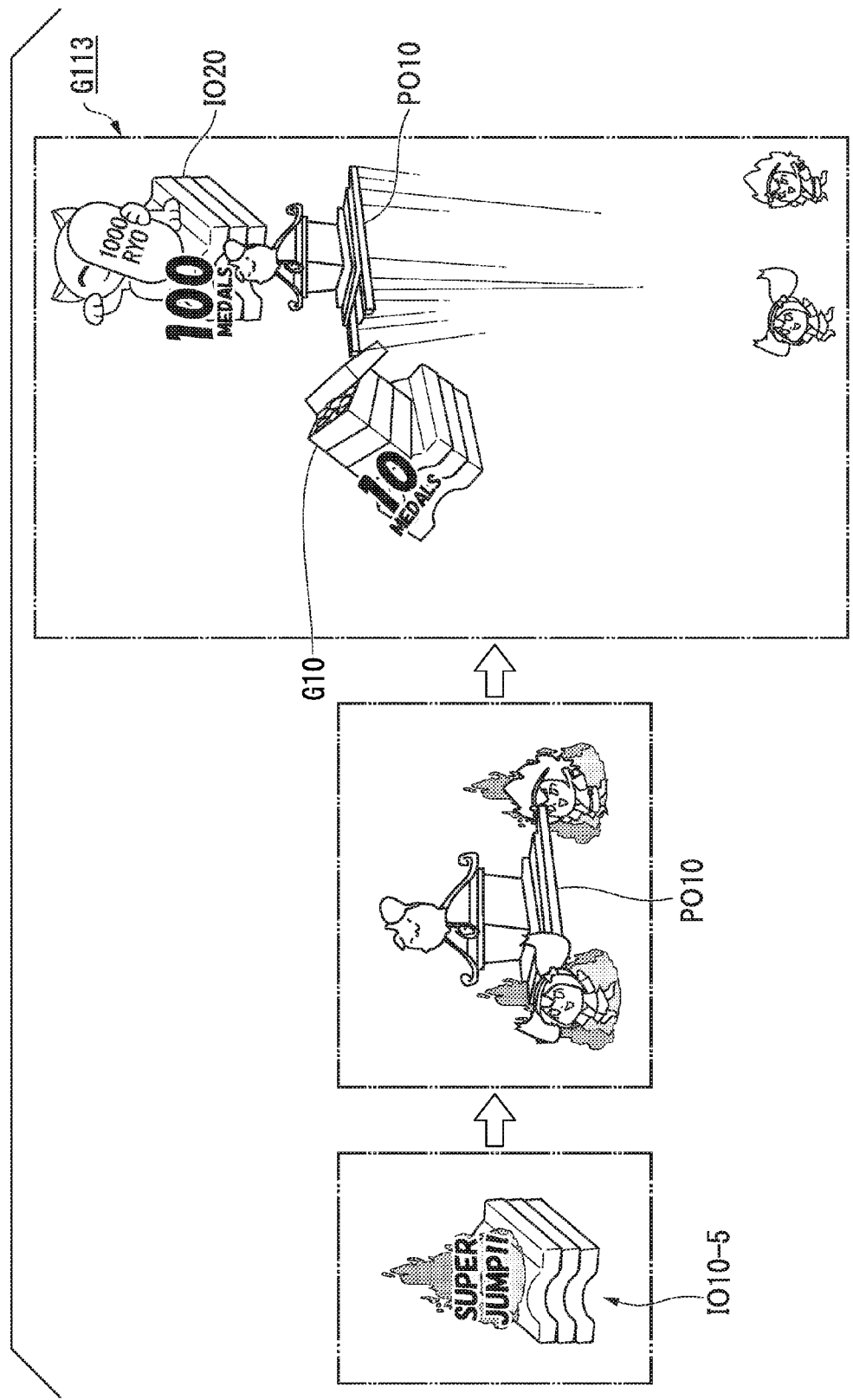
FIG. 7 is a drawing for describing the operation of a special instructing object according to the same embodiment.

FIG. 7 is for describing the operation of a special instructing object according to the present embodiment.

For example, if a player has obtained a specific item displayed by the instructing object IO10-5 shown in FIG. 7, the player object PO10 can be made to collide with the special instructing object. When this game mode is enabled, it is subsequently referred to as the special game mode. When the special game mode is enabled, the picture of the player object PO10 changes. Additionally, when a striking operation is made in this condition, as shown in the game screen G113, the jumping up of the player object PO10 is greater than normal. By doing this, the player object PO10 can collide with the special instructing object IO20. In the present embodiment, drums 13 are disposed at the four corners of the touch panel 12. For that reason, even if the display region of the touch panel 12 is rectangular, at each unit 11, the distance from the player object PO10 displayed in the vicinity of the drum 13 to the instructing object is uniform, and it is not necessary to change the movement distance of the player object PO10 for each unit 11. That is, by disposing the drums 13 at the four corners of the touch panel 12, it is possible to achieve the same operational feel at any of the units 11.

When a player makes a striking operation with respect to a drum 13, the game machine 10 outputs an evaluation of the skill of that striking operation.

Figure 8:
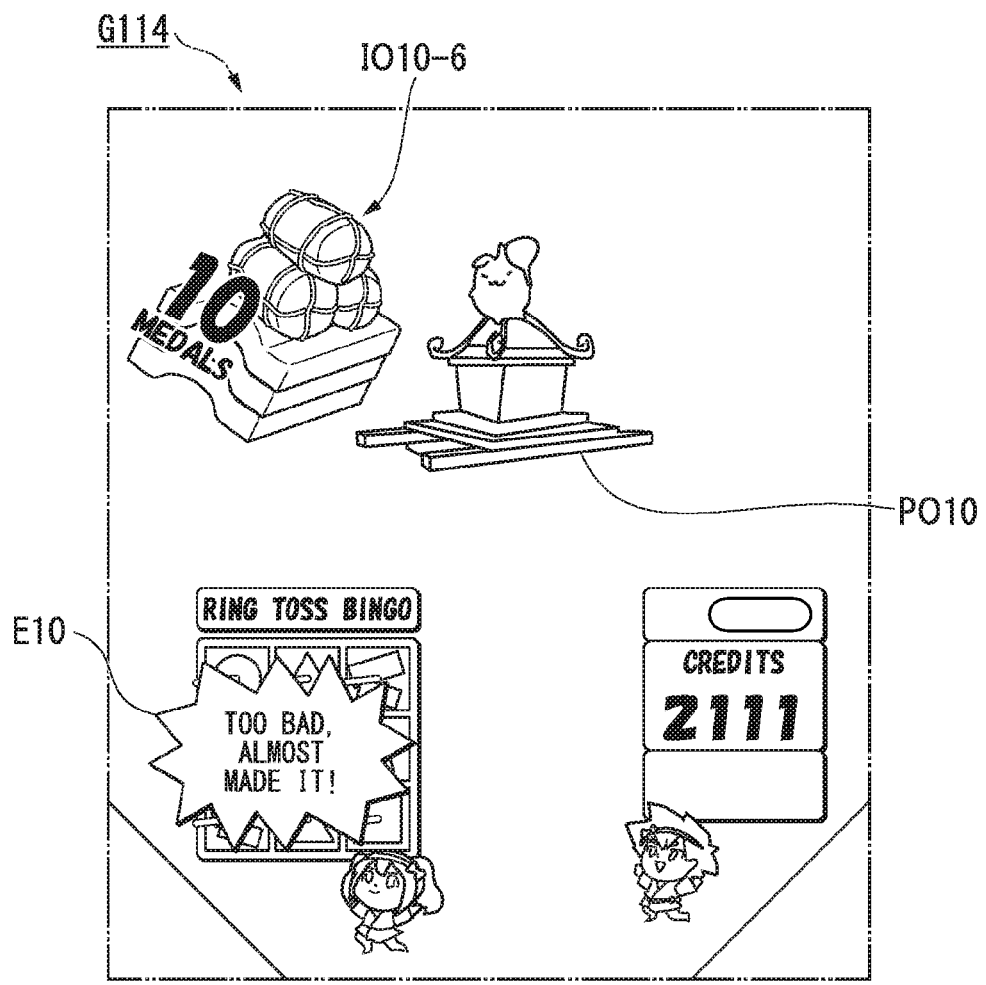
FIG. 8 is a drawing for describing the output of the skill evaluation by the game machine of the same embodiment.

FIG. 8 is for describing the output of the skill evaluation by the game machine 10 according to the present embodiment.

In the example shown in FIG. 8, the game screen G114 displays a skill evaluation object E10 representing the game operation skill of the player. The player game operation skill evaluation may be displayed as character information such as numbers (a score) or symbols and the like, or may be displayed as graphic information such as a gauge or graph. The skill evaluation may also be output as a sound or light presentation.

The displayed content of the skill evaluation object E10, for example, differs between the cases of satisfying and not satisfying a prescribed skill condition. In the example shown in FIG. 8, because the player object PO10 did not collide with the instructing object IO10-6 even though a striking operation was made, an evaluation is output indicating that the striking operation was not a well-timed operation. In contrast, for example, if the player object PO10 collides with the instructing object IO10-6 as a result of a striking operation, an evaluation is output indicating that the striking operation was a well-timed operation. In this manner, the game machine 10 outputs a skill evaluation regardless of whether a prescribed skill condition is satisfied. By doing this, the player can judge whether or not his or her striking operation was made with good timing. As a result, because striking operations that satisfy the skill condition increase, the game machine 10 can cause the player to play the game with good efficiency.

The credit display object CR10 represents the amount of credit held by the player. The amount of credit held by the player increases, for example, by the player inserting medals M, and by obtaining credit as a reward by playing the timing game. In contrast, the amount of credit held by the player decreases, for example, by a payout of medals M to the player and by consumption of credit by satisfying a prescribed skill condition by a player striking operation.

The bingo game sheet G310 is a game object used when advancing a bingo game.

The bingo game will now be described.

Figure 9:
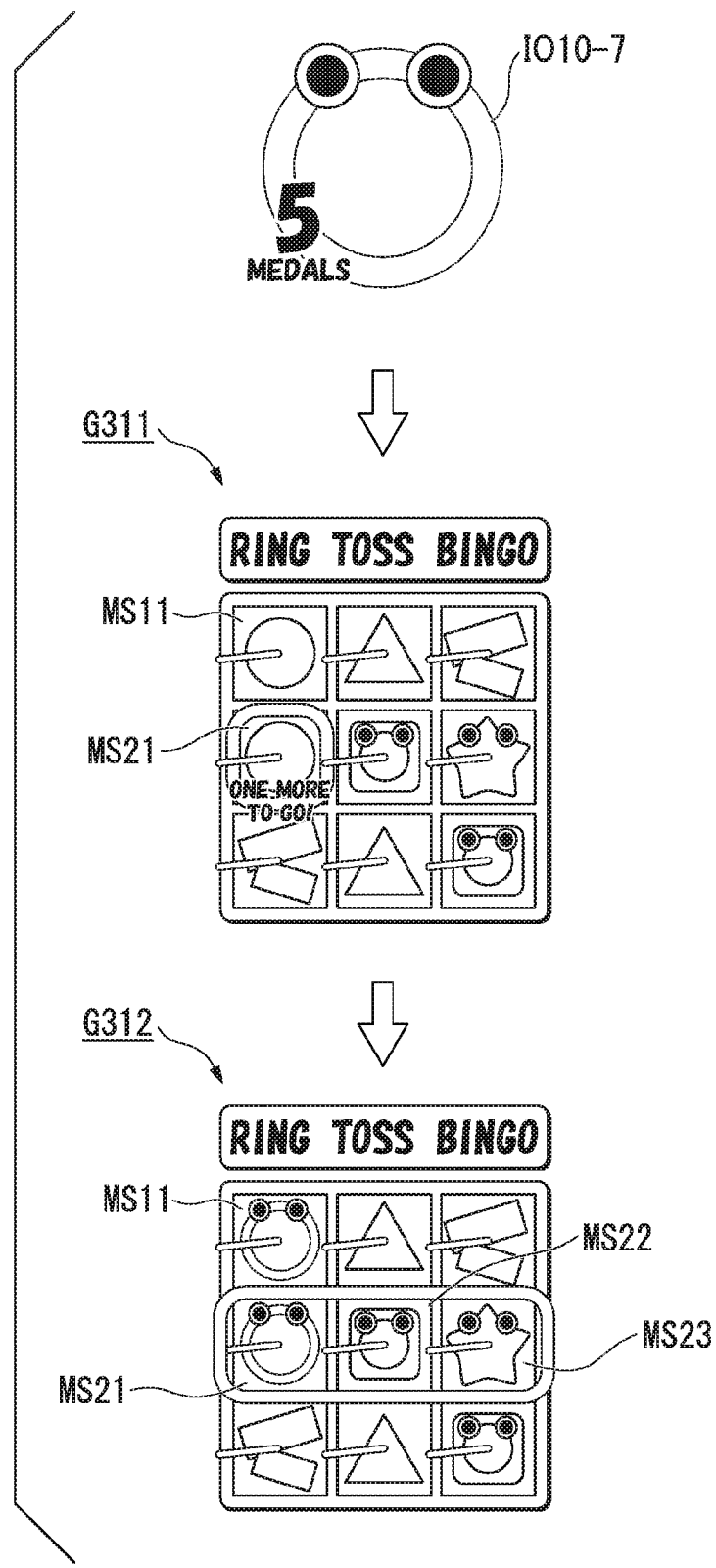
FIG. 9 is a drawing for describing the advancement of a bingo game according to the same embodiment.

FIG. 9 is for describing the game object used when advancing a bingo game in the game machine 10 according to the present embodiment.

The bingo game sheet G311 shown in FIG. 9 has a total of nine squares, three vertically and three horizontally. When bingo items are obtained from instructing objects, the game machine 10 enables squares of the bingo game sheet corresponding to the bingo game items. Specifically, the instructing object IO10-7 shown in FIG. 9 corresponds to the square MS11 and the square MS21 of the bingo game sheet G311. If a player obtains a bingo item associated with the instructing object IO10-7, the game machine 10 enables the square MS11 and the square MS21. If any vertical, horizontal, or diagonal row is enabled, such as the squares MS21, MS22, and MS23 shown in the bingo game sheet G312, that is, when so-called bingo is made, the game machine 10 pays out a reward of a prescribed amount of credit to the player.

(Functional Constitution of the Game Machine 10)

Next, the functional constitution of the game machine 10 will be described.

Figure 10:
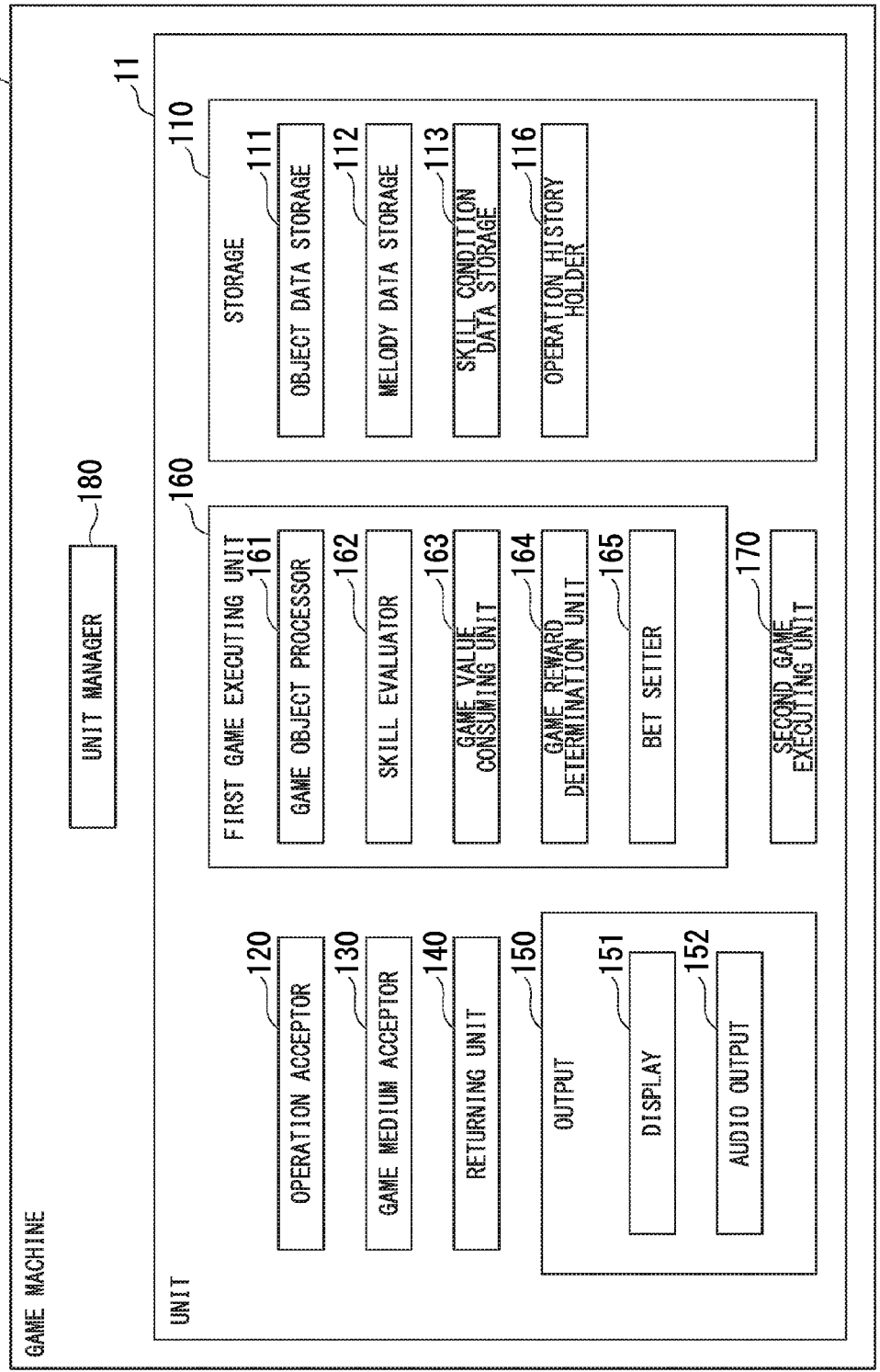
FIG. 10 shows the functional constitution of a game machine according to the same embodiment.

FIG. 10 shows the functional constitution of the game machine 10 according to the present embodiment.

The game machine 10 has a storage 110, an operation acceptor 120, a game medium acceptor 130, a returning unit 140, an output 150, a first game executing unit 160, a second game executing unit 170, and a unit manager 180. Of these elements, the storage 110, the operation acceptor 120, the game medium acceptor 130, the returning unit 140, the output 150, the first game executing unit 160, and the second game executing unit 170 are provided for each unit 11.

The unit manager 180 controls, for example, the operation of each unit 11 provided in the game machine 10. Specifically, the unit manager 180, for example, allocates a display area of the touch panel 12 for each unit 11, integrates the display regions allocated to each unit 11, and controls each unit 11.

The storage 110 has, for example, a ROM (read-only memory), a RAM (random-access memory), or the like. The storage 110 may have a HD (hard-disk) drive, an EEPROM (electrically erasable programmable read-only memory), or a flash memory or the like. The storage 110 stores various programs executed by a CPU (central processing unit, not shown) of the game machine 10 and the results of processing executed by the CPU. The first game executing unit 160, the second game executing unit 170, and the unit manager 180 operate by the CPU of the game machine 10 executing game programs and control programs stored in the storage 110.

The storage 110 has an object data storage 111 that stores object data, a melody data storage 112 that stores melody data, a skill condition data storage 113 that stores skill condition data, and an operation history holder 116 that holds and operation history of game operation. The operation history, for example, has coded therein, for example, the timing at which game operations have been made, in association with game operation skill evaluations.

Object data represents rewards for each instructing object and the relationship of correspondence between obtaining the rewards and result of a drawing. The object data will now be described by an example.

FIG. 11 shows an example of object data according to the present embodiment.

In the example shown in FIG. 11, the object data D111 is constituted by drawing reward information (drawing rewards) and drawing probability information (winning probabilities), in association with instructing object IDs.

The instructing object ID (identifier) is unique identification information for identifying an instructing object. An instructing object ID may be unique identification information for each individual instructing object, or may be unique identification information for each type of instructing object. In this case, the type of the instructing object is, for example, the picture of an instructing object, or classification of an instructing object by an arbitrary criterion, such as the reward corresponding to the instructing object.

The drawing reward information represents the reward corresponding to an instructing object. The drawing reward information has coded therein, for example, a combination of the amount of credit payout and one or more of the identification information unique to an item. The content of the reward represented by the drawing reward information is displayed in the reward display region of the instructing object.

The winning probability information represents the probability of winning a drawing that is made if a player's striking operation satisfies a prescribe skill condition. The winning probability information is coded, for example, as a value from 0% to 100%.

That is, the method of determining the reward corresponding to an instructing object is coded in the object data D111. In this case, the method of determining the reward is a combination of one or more of determining whether or not to pay out a reward, the content of the reward, and a reward amount. In the present embodiment, although as an example of the reward determination method, the game machine 10 executes a drawing with the winning probability established for each instructing object for whether or not to pay out a reward for that instructing object, this is not a restriction. For example, the winning probably for a drawing for determining the amount and content of a reward corresponding to an instructing object may be coded in the object data, or an arbitrary reward determination method by a reward payout condition or the like using a method other than a drawing may be coded in the object data. The game machine 10 references the information representing the drawing determination method corresponding to the instructing object ID in the object data (for example, the winning probability) and, to determine the reward using the method established by that information, can change the reward determination method in accordance with the instructing object.

The skill condition data represents the skill condition established as a criterion for evaluating the skill of a striking operation made by a player. In the present embodiment, as described above, the difference between a reference position of a player object (position of the intersection of the movement path of the instructing object and the movement path of the player object) and the position of the instructing object being within a prescribed range is established as the skill condition. In this case, the value of the reference distance is coded in the skill condition data. If a player striking operation moves the player object up to the reference position so that the distance between the player object and the instructing object is within the reference distance, the skill condition is determined to have been satisfied.

The operation acceptor 120 has a touch sensor of the touch panel 12, a shock sensor of the drum 13, and a button sensor of the operating button 15. The operation acceptor 120 detects a game operation by a player with respect to the touch panel 12, the drum 13, and the operating button 15. The game operations include an operation of striking the drum 13. The game operation acceptor 120 outputs to the first game executing unit 160 game operation information representing a detected game operation. If the credit held by the player is less than a prescribed amount, however, the operation acceptor 120 does not output game operation information. In this manner, the game operation acceptor 120 may be made to accept a game operation if the credit required for advancing a game is accumulated in a timing game. Also, the operation acceptor 120 may be made to accept a game operation regardless of the amount of credit held by player, and the first game executing unit 160 may be made not to accept a game operation from the game operation acceptor 120 if the credit is less than a prescribed amount. The operation acceptor 120 is not restricted to accepting a game operation and may accept an operation representing an arbitrary instruction by the player. In the present embodiment, the region of the operation acceptor 120 accepting a game operation, such as the touch position in the touch panel 12, or the right-side region or left-side region of the drum 13 is sometimes called the operation acceptance region.

The game medium acceptor 130 has a medal inserter unit 18. The game medium acceptor detects insertion of a medal M into the medal inserter unit 18. The game medium acceptor 130 outputs insertion information of detected medals M to the first game executing unit 160. The first game executing unit 160 adds credit, based on the insertion information from the game medium acceptor 130.

The returning unit 140 has a medal payout unit 17. Upon receiving payout information from the first game executing unit 160 instructing the payout of a prescribed amount of medals M, the returning unit 140 pays out to the medal payout unit 17 the indicated amount of medals M.

The output 150 outputs information regarding the game executed by the game machine 10. The output 150 has a display 151 and an audio output 152.

The display 151 has a display device of the touch panel 12. The display device is, for example, a liquid crystal display or an organic EL (electroluminescence) display or the like. The display 151, based on image data acquired from the first game executing unit 160 or the second game executing unit 170, displays game screens for a timing game and a bingo game.

The audio output 132 has a speaker 16. The audio output 132, based on speech data acquired from the first game executing unit 160 or the second game executing unit 170, reproduces game melodies, sound effects, and speech.

The first game executing unit 160 executes a timing game. The first game executing unit 160 has a game object processor 161, a skill evaluator 162, a game value consuming unit 163, a game reward determination unit 164, and a bet setter 165.

The game object processor 161 controls the disposing and change of the presentation of various game objects on the game screen. Specifically, for example, the game object processor 161 periodically displays each of the various instruction objects one at a time, based on the pre-established appearance probability of each, at a prescribed display starting position for each on the game screen. The game object processor 161 then moves the game object along a prescribed movement path toward the display ending position on the game screen at a prescribed speed. In this process, if a reward corresponding to an instructing object has been paid out or if the instructing object has moved up to the display ending position, the game object processor 161 removes the instructing object from the game screen. The present embodiment, the description is for the example in which the display starting position and the display ending position are the same position and are on the above-described movement path of the instructing object. That is, in the present embodiment, the instructing object travels around a circular orbit and disappears when it returns to the original position.

The game object processor 161, for example, changes the display of a player object or an instructing object in response to a game operation such as a striking operation. The game object processor 161, for example, disposes on the game screen a skill evaluation object representing the result of the skill evaluator 162 determining the skill of a game operation. The game object processor 161 outputs image data representing the game screen to the display 151, causing the display 151 to display the game screen.

The skill evaluator 162, evaluates the skill of a player's game operation, based on whether or not a prescribed skill condition is satisfied. The game operation evaluation made by the skill evaluator 162 regarding an instructing object will now be described.

In the skill evaluation, the skill evaluator 162 first acquires game operation information representing the game operation from the operation acceptor 120. Next, the skill evaluator 162 acquires the center coordinates of each instructing object at the point in time at which the player object has moved up to the movement path of the instructing object. Next, the skill evaluator 162 calculates the difference between the center coordinates of each instructing object and the reference position coordinates of the player object, and identifies the instructing object that is at a position that is closest to the reference position. Next, the skill evaluator 162 determines whether or not the distance from the reference position to the closest instructing object is within a prescribed distance. If the distance from the reference position to the instructing object is within the prescribed distance, the skill evaluator 162 determines that the game operation satisfies the skill condition and allocates a game operation regarding the instructing object. If the distance from the reference position to the instructing object is not within the prescribed distance, the skill evaluator 162 determines that the game operation does not satisfy the skill condition. The skill evaluator 162 outputs the determination result to the game object processor 161, the game value consuming unit 163, and the game reward determination unit 164. The determination result does not necessarily need to be output to the game reward determination unit 164, and information indicating the consumption of a prescribed amount of game value by the game value consuming unit 163 can be output to the game reward determination unit 164 from the game value consuming unit 163. The above processing is executed each time a game operation is accepted.

In this case, if a game operation is accepted in a special game mode, the allocations of game operations to a normal instructing object positioned between a special instructing object and a player object is divided into three processing types, from the first processing type to the third processing type, which are described below. The skill evaluator 162 may allocate a game operation by any one of the first processing type to the third processing type. The first to the third processing types will now be described, with reference made to FIG. 7.

In the first processing type, when a game operation is accepted in the special game mode, the game operation is not allocated to a normal instructing object. In this case, when a game operation is made by a player, the game object processor 161 moves the player object PO10 so that it slips past instructing object IO10 so that it is displayed as approaching or colliding with the special instructing object IO20. When this occurs, the skill evaluator 162 determines whether or not the game operation satisfies the skill condition with regard to the special instructing object IO20. Specifically, it determines whether or not the distance between the special reference position of the player object PO10 (the point of intersection between the movement path of the special instructing object IO20 and the movement path of the special game mode player object PO10) and the special instructing object IO20 is within a prescribed range. In contrast, the skill evaluator 162 does not perform a determination of whether or not the skill condition is satisfied with respect to the normal instructing object IO10.

In the second processing type, when a game operation is accepted in the special game mode, the game operation is allocated to a special instruction object only if no normal instructing object exists between a special instructing object and the player object. In this case, when a game operation is made by a player, the game object processor 161, in addition to moving the player object PO10 so that it is displayed as approaching or colliding with the special instructing object IO20, if a normal instructing object IO10 exists on the movement path thereof, it displays it as colliding with the normal instructing object IO10 and either passing therethrough or changing path. When this occurs, the skill evaluator 162 not only allocates a game operation regarding the normal instructing object IO10 that was collided with, but also determines whether or not the game operation regarding the special instructing object IO20 satisfies the skill condition. If there is no normal instructing object IO10 on the movement path of the player object PO10, the player object PO10 moves up to the movement path of the special instructing object IO20. When this occurs, the skill evaluator 162 determines whether or not the game operation satisfies the skill condition with respect to the special instructing object IO20.

In the third processing type, when a game operation is accepted in the special game mode, the game operation is allocated to a special instructing object only in the case in which no normal instructing object exists between the special instructing object and the player object. In this case when a game operation is made by a player, if moving the player object PO10 causes it to collide with a normal instructing object (the case in which the distance between the reference position of the player object PO10 and the normal instructing object IO10 is within a prescribed distance), that is, if the game operation satisfies the skill condition regarding the normal instructing object IO10, the game object processor 161 allocates the game operation to the instructing object and determines whether or not the skill condition is satisfied with regard to the special instructing object IO20. In contrast, if moving the player object PO10 does not cause a collision with the instructing object IO10 (the case in which the distance between the reference position of the player object PO10 and the normal instructing object IO10 is not within the prescribed distance), that is, if the game operation does not satisfy the skill condition regarding the normal instructing object, the skill evaluator 162 determines whether or not the game operation satisfies a prescribed skill condition regarding the special instructing object IO20. If the game operation satisfies the prescribed skill condition regarding the special instructing object IO20, the game operation is allocated regarding the special instructing object IO20.

The skill evaluator 162 may make an evaluation not of each individual game operation, but rather of a plurality of game operations or of one set of game operations made within a prescribed period of time. For example, the skill evaluator 162 may count the number of times a prescribed number of game operations satisfy the skill condition and may evaluate the skill based on the proportion of game operations that satisfied the skill condition.

The better setter 165 sets a bet amount in response to a prescribed bet amount specifying operation by a player. The bet amount is the unit amount of credit that is consumed for one operation. The bet specifying operation may be an arbitrary operation. For example, it is a button operation, a screen touch operation, or a timed stick striking operation. The game machine 10 may be enabled by a bet amount specifying operation by a player to make settings for each operation acceptance region or instructing object. A value of zero or greater is set as the bet amount. In the following, a value greater than zero as the bet amount will be referred to as a "bet made." A value of zero set as the bet amount will sometimes be referred to as "bet not made." The game object processor 161 need not display on the game screen an instructing object for which a bet is not made. If a game object is displayed for each operation acceptance region, the game object processor 161, for example, may be made not to display a game object corresponding to an operation acceptance region in which a bet has not been made.

The bet setter 165 may set different types of betting methods, in accordance with a prescribed betting method specifying operation by the player. The betting methods include, for example, a normal bet and a side bet. A normal bet is a betting method whereby there is a possibility of being granted only a normal game reward. A side bet is a betting method whereby there is a possibility of being granted a special game reward that differs from a normal game reward. Special game rewards include a free game, a bonus game having a high expected value, a high-amount, fixed-value reward, and a progressive reward that is accumulated by bets by a plurality of players. The bet amount specifying operation may be an arbitrary operation. For example, it is a button operation, a screen touch operation, or a timed stick striking operation. If a player game operation satisfies a prescribed skill condition, the game machine 10 consumes a prescribed amount of credit, based on the betting method specified by the player.

Specifying another type of bet operation (for example a normal bet) may be made an essential condition in order to specify a specific type of bet operation (for example, a side bet), or may not be made an essential condition.

If skill evaluator 162 has determined that a game operation satisfies a prescribed skill condition, the game value consuming unit 163 consumes a prescribed amount of credit. In this case, the prescribed amount of credit is, for example, an amount that is calculated using the value of the bet amount set by the betting setter 165. The prescribed amount may be uniquely established by the bet amount, or may be calculated using a pre-established value with respect to the operation acceptance region in which the operation was made. In the following, the case in which the prescribed amount is a bet amount set by the bet setter 165 will be described as one example.

If the skill evaluator 162 has determined that a game operation does not satisfy the prescribed skill condition, the game value consuming unit 163 does not consume the prescribed amount of credit. When this occurs, the game value consuming unit 163 may be made to consume an amount of credit that is less than the amount of credit that is consumed in the case in which the prescribed skill condition was satisfied. For example, if prescribed skill condition is not satisfied, the game value consuming unit 163 may be made to consume one-half of the credit consumed in the case of satisfying the prescribed skill condition, or may be made to consume absolutely no credit. By doing this, if the game operation skill level of a player is low, because either no credit or only a small amount of credit is consumed, the game machine 10 can avoid consumption of an extremely large amount of credit by a player with a low skill level.

If the bet amount is zero, that is, if a bet was not made, even if a game operation was made that satisfies the prescribed skill condition, the game value consuming unit 163 does not consume credit. Specifically, for example, of the two operation acceptance regions of the drum 13, the left-side region and the right-side region, if a bet is made on only the left-side region, even if a game operation is made with respect to the right-side region, credit is not consumed by the game value consuming unit 163. The game value consuming unit 163, for example, does not consume game value regarding an instructing object on which a bet has not been made, even if a game operation has been with respect thereto.

If the skill evaluator 162 determines that a game operation satisfies a prescribed skill condition, the game reward determination unit 164 determines the reward with respect to the game operation. In this case, determining the reward includes determining whether or not to pay out a reward and determining the content of the reward. If the skill evaluator 162 determines that a game operation satisfies a prescribed skill condition, the game reward determination unit 164 reads out from the object data storage 111 the object data D111 of the instructing object corresponding to the game operation. Next, the game reward determination unit 164 references the winning probability information of the object data D111 and executes a drawing with the referenced probability. If a win occurs in the drawing, the game reward determination unit 164 pays out to the player the reward represented by the drawing reward information. The game reward determination unit 164 notifies the game object processor 161 of the processing results. If the reward is a bingo item with respect to a square of a bingo game, the second game executing unit 170 is notified of the reward. If there is no win in the drawing, the game object processor 161 performs no particular processing.

The second game executing unit 170 executes a bingo game. The second game executing unit 170 enables a square corresponding to the reward of which it was notified from the game reward determination unit 164 of the first game executing unit 160. In the bingo game, if all squares in one row have been enabled, that is, if so-called bingo has been reached, the second game executing unit 170 pays out to the player a reward in accordance with the bingo win.

(Operation of Game Machine 10)

Next, the operation of the game machine 10 will be described.

Figure 12:
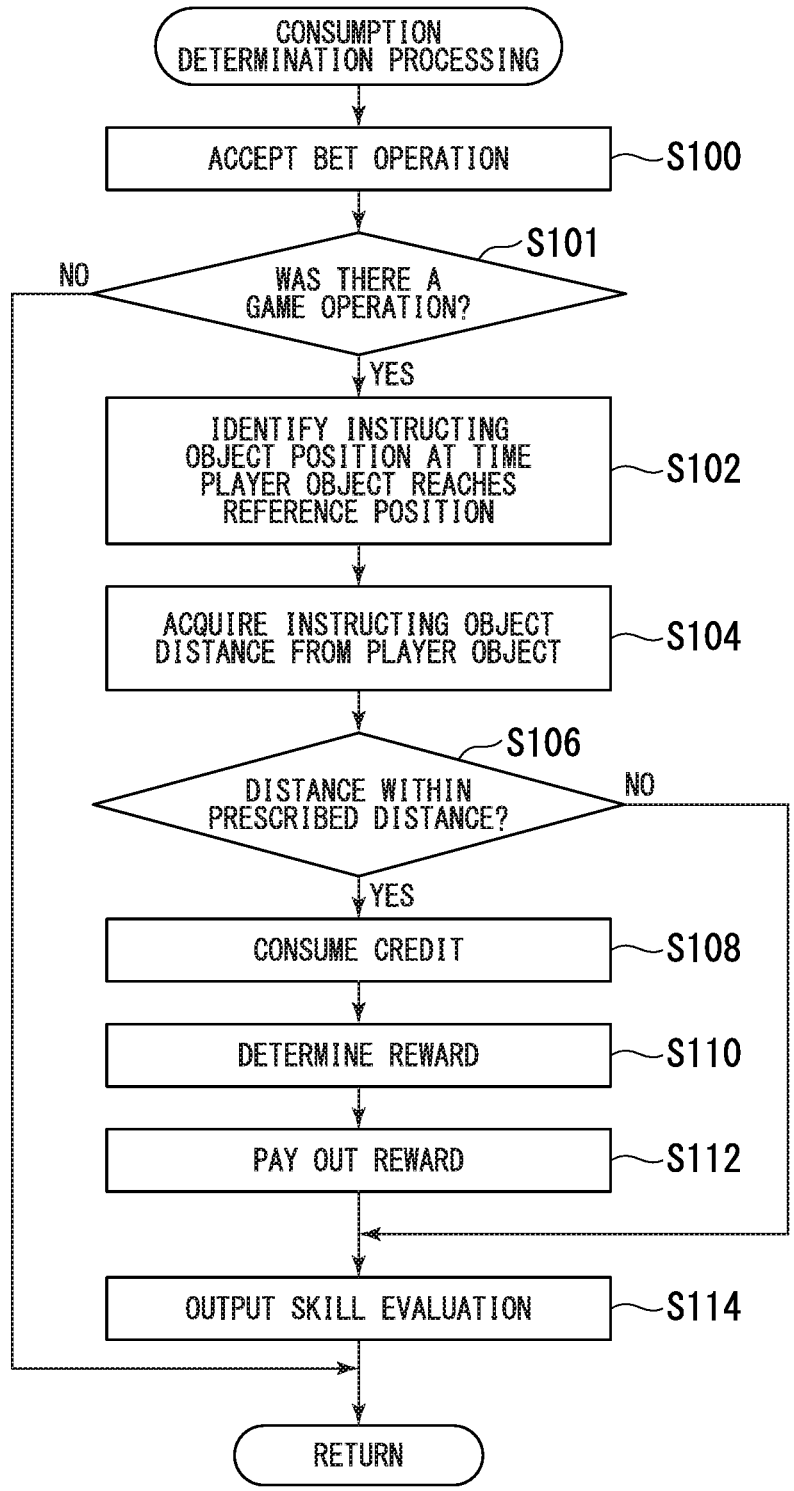
FIG. 12 is a flowchart showing an example of the flow of consumption determination processing by the game machine according to the same embodiment.

FIG. 12 is a flowchart showing an example of the flow of credit consumption determination processing by the game machine 10 according to the present embodiment.

(Step 100) The first game executing unit 160, via the operation acceptor 120, accepts a bet operation made by a player. After that, the first game executing unit 160 proceeds to the processing of step S101.

(Step S101) The first game executing unit 160 determines whether or not a game operation accepted by the operation acceptor 120 (for example, a striking operation) has been accepted from the player. Specifically, the first game executing unit 160 waits for operation information output from the operation acceptor 120 and, by acquiring the operation information, identifies the timing at which a game operation was made. If there was a game operation (YES at step S101), the first game executing unit 160 proceeds to the processing of step S102. If there is no game operation (NO at step S101), the first game executing unit 160 returns to the processing of step S100.

(Step S102) The first game executing unit 160, based on the timing information of when the game operation was made, identifies the position of each instructing object at the point in time at which the player object moves to the height of the movement path of the instructing object. After that, the first game executing unit 160 proceeds to the processing of step S104.

(Step S104) The first game executing unit 160 acquires the distance between the position of the instructing object and the reference position of the player object (the position of the intersection between the movement path of the instructing object and the movement path of the player object). After that, the first game executing unit 160 proceeds to the processing of step S106).

(Step S106) The first game executing unit 160 determines whether or not the distance from the reference position of the player object to the instructing object is shorter than a prescribed distance. That is, the first game executing unit 160 determines whether or not the difference between the reference position of the player object and the position of the instructing object is a value within a prescribed distance (whether or not the skill condition is satisfied). If the value is within the prescribed distance (YES at step S106), the first game executing unit 160 proceeds to the processing of step S108. If the value is not within the prescribed distance (NO at step S106), the first game executing unit 160 proceeds to the processing of step S114.

(Step S108) The first game executing unit 160 consumes the amount of credit bet at step S100. After that, the first game executing unit 160 proceeds to the processing of step S110.

(Step S110) The first game executing unit 160 references the object data D111 of the instructing object corresponding to the game operation and determines by a drawing whether or not to pay out a reward. After that, the first game executing unit 160 proceeds to the processing of step S112.

(Step S112) If a reward is to be paid out, the first game executing unit 160 pays out the reward determined by the processing of step S110. After that, the first game executing unit 160 proceeds to the processing of step S114. In the case of not winning in the drawing, in which case a reward is not to be paid out, the first game executing unit 160 proceeds to the processing of step S114.

(Step S114) The first game executing unit 160 displays on the display 151 the skill evaluation result, based on the determination processing at step S106. After that, the first game executing unit 160 returns to the processing of step S100.

The processing of the above-described steps S108, S110, and S112 may be executed in a different sequence.

Although the above-noted embodiment is described for the case in which drawing reward and winning probability attributes are associated with each instructing object ID attribute, this is not a restriction. For example, as shown in the object data D112 of FIG. 13, an attribute of the required number of wins and an attribute of the operation credit amount may be associated. That is, a plurality of wins can be made a requirement for obtaining a drawing reward, depending upon the type of instructing object. A player can be made to grasp information of the required number of wins, by the picture or the like of an instructing object. The amount of credit can be varied, depending upon the type of instructing object, in which case the sum or product of the operation credit amount and the bet amount may be taken as the consumed credit amount.

Summary of the First Embodiment

As described above, the game machine 10 according to the present embodiment has an operation acceptor 120, which accepts one or more game operations by a player (for example a striking operation), and a game value consuming unit 163 that consumes a prescribed amount of game value (for example, credit) if the one or more game operations by the player accepted by the operation acceptor 120 satisfy a prescribed skill condition.

By doing this, the game machine 10 consumes game value after evaluating the skill of a game operation. The game machine 10 can therefore change the amount of game value consumed in accordance with the game skill. Also, by doing this, the game machine can, for example, reduce the amount of game value consumed regarding a game operation that is not involved in determining a reward. That is, because the game machine 10 can suppress the variation of the amount of game value consumed in accordance with a player's skill, it can easily adjust the payout rate.

If a game operation does not satisfy a prescribed skill condition, the game value consuming unit 163 may not consume the prescribed amount of game value or may consume an amount of game value less than the amount of game value consumed determined by the skill evaluator 162.

By doing this, the game machine 10 can reduce the amount of game value consumed by a player with a low skill level.

If the game value consuming unit 163 accumulates a prescribed amount of game value, the operation acceptor 120 accepts a game operation.

By doing this, the game machine 10 can cause game operations not to be accepted if a player does not hold a sufficient amount of game value.

An output 150 (an example of a skill evaluation output) is further provided that outputs a skill evaluation of a game operation based on a game operation by a player accepted by the operation acceptor 120, and the output 150 outputs a skill evaluation even if the game operation does not satisfy a prescribed skill condition.

By doing this, because the player can be notified of the skill even if the prescribed skill condition is not satisfied, the game machine 10 can have the player to improve his or her skill.

If a game operation by a player accepted by the operation acceptor 120 satisfies a prescribed skill condition, the game reward determination unit 164 determines a reward with respect to the game operation.

By doing this, because a reward is determined in conjunction with the consumption of a prescribed amount of game value, the game machine 10 can maintain a proper balance between the consumption of game value and the payout of a reward.

If a prescribed amount of game value is consumed by the game value consuming unit 163 by a game operation satisfying a prescribed skill condition, the game reward determination unit 164 determines a reward with respect to the game operation.

By doing this, because a reward is determined in exchange for the consumption of a prescribed amount of game value, the game machine 10 can maintain a proper balance between the consumption of game value and the payout of a reward.

The game reward determination unit 164 determines the reward with respect to a game operation by a drawing.

By doing this, because there is a possibility that even a player with a low skill level will obtain a reward greater than a player with a high skill level, the game machine 10 can heighten the desire of a player with a low skill level to play.

The game reward determination unit 164 determines by a drawing whether or not to pay out game value as a reward with respect to a game operation and/or the amount of game value to be paid out as a reward with respect to a game operation.

By doing this, because there is a possibility that even a player with a low skill level will obtain a reward greater than a player with a high skill level, the game machine 10 can heighten the desire of a player with a low skill level to play.

The game machine 10 further has a display 151 (an example of a display) that displays a game object (for example, an instructing object) that moves within the screen. In this case, there is a plurality of types of game objects. If a game operation accepted by the game operation acceptor satisfies a prescribed skill condition, the game reward determination unit 164 changes the reward determination method in accordance with the type of game object corresponding to the game operation.

By doing this, because the method of determining the reward can be changed by individual instructing objects, the game machine 10 can heighten the interest of a game.

The game machine 10 further has a display 151 (an example of a display) that displays a game object that moves within the screen. In this case, the prescribed skill condition is, for example, that the difference between the position of the game object (for example, an instructing object) and the position specified based on a game operation made by the player and accepted by the operation acceptor 120 (for example, the position of a player object) is a value within a prescribed range.

By doing this, the game machine 10, for example, determines whether or not the skill condition is satisfied, based on the positional relationship between the position of the player object and the instructing object, thereby enabling the game machine 10 to make a visual instruction of the timing with which an operation should be made.

The game machine 10 further has a display 151 (an example of a display) that displays a game object (for example, an instructing object) that moves within the screen. The game objects include a plurality of types, and if the player's game operation accepted by the operation acceptor 120 satisfies a prescribed skill condition, the game value consuming unit 163 consumes a prescribed amount of game value that is different, in accordance with the type of game object corresponding to the game operation.

By doing this, because the amount of consumption of game value can be changed for each individual instructing object, the game machine 10 can heighten the interest of a game.

A game program according to the present embodiment is a program for causing the game machine 10 (an example of a computer) to execute a first step (S100) of accepting a player's game operation and a second step (S108) of consuming a prescribed amount of game value if the game operation accepted by the first step satisfies a prescribed skill condition.

By doing this, the game machine 10 that executes the game program consumes game value after evaluating the skill of a game operation, thereby enabling the game machine 10 to change the amount of game value consumed in accordance with the skill of a game operation.

The game machine 10 further includes an operation acceptor 120 that accepts a bet operation specifying an amount of game value, wherein the game value consuming unit 163 uses the game value specified by a bet operation accepted by the operation acceptor 120 to determine the amount of game value to be consumed.

By doing this, the game machine 10 can specify the amount of game value consumed by the player. For that reason, for example, a player not familiar with the operation of the game can play with a small bet amount, thereby enabling the game machine 10 to maintain the desire on the part of the player to play, regardless of the relative game operation skill.

The game machine 10 further includes an operation acceptor 120 (an example of a bet operation acceptor) that accepts a bet operation specifying an amount of game value. As a game operation acceptor, the operation acceptor 120 can accept a game operation with respect to at least one of a plurality of different types of game operations and, as a bet operation acceptor, the operation acceptor 120 can accept an operation specifying an amount of game value to be consumed for each type of game object. The game value consuming unit 163, by a bet operation accepted as a game operation by the operation acceptor 120 as a bet operation acceptor, uses the value of the amount of game value specified with respect to a game object that is the target of the game operation accepted by the operation acceptor 120 as a game operation acceptor to determine the amount of game value to be consumed.

By doing this, in the game machine 10 a player can specify the amount of game value consumed for each type of game object. For that reason, for example, a player can specify a large bet with respect to an easy-to-operate game object and can specify a small bet with respect to a difficult-to-operate game object, thereby enabling the game machine 10 to maintain the desire on the part of the player to play the game.

In the game machine 10, the operation acceptor 120 as a game operation acceptor can accept one or more game operations with respect to two or more operation acceptance regions, and the operation acceptor 120 as a bet operation acceptor can accept an operation specifying the amount of game value to be consumed for each of two or more operation acceptance regions. The game value consuming unit 163, by a bet operation accepted by the operation acceptor 120 as a bet operation acceptor, uses a value of the amount of game value specified with respect to the operation region that accepted one or more game operation by the operation acceptor 120 as a game operation acceptor to determine the amount of game value to be consumed.

By doing this, the game machine 10 a player can specify the amount of game value consumed for each operation acceptance region. For that reason, for example, a player can specify a large bet with respect to an operation acceptance region in which operation is easy and can specify a small bet with respect to an operation acceptance region in which operation is difficult, thereby enabling the game machine 10 to maintain the desire on the part of the player to play the game.

The game machine 10 further includes an operation acceptor 120 (an example of a bet operation acceptor) that accepts a bet operation specifying an amount of game value and also includes a game reward determination unit 164 that, if a game operation accepted by the operation acceptor 120 as a game operation acceptor satisfies a prescribed skill condition, determines at least one of the amount and type of a reward with respect to the game operation. Bet operations include a plurality of types corresponding to at least one of the amount and type of reward, and the game reward determination unit 164, based on a bet operation accepted by the operation acceptor 120, determines at least one of the amount and type of reward with respect to a bet operation.

By doing this, the game machine 10 can specify a plurality of types of betting method, thereby enabling a player, for example, to strategically specify the betting method. The game machine 10, therefore, can maintain the desire on the part of the player to play the game.

Second Embodiment (Game Machine 10A Overview)

The second embodiment of the present invention will now be described. In the following, the same reference symbols will be assigned to elements that are the same as in the above-described embodiment, and the descriptions thereof will be incorporated herein.

The game machine 10A according to the present embodiment has the same hardware constitution as the game machine 10 according to the first embodiment and executes a timing game. However, the content of the executed timing game differs between the game machine 10 and the game machine 10A. Specifically, in contrast to the game machine 10, in which a determination is made as to whether or not credit is to be consumed is made based on a prescribed skill condition regarding the difference between the position of an instructing object and the position of a player object, in the game machine 10A, a determination is made as to whether or not credit is to be consumed is made based on a prescribed skill condition regarding the difference between the timing of the arrival of an instructing object at a prescribed position and the timing of a striking operation by a player.

Figures 13, 14:
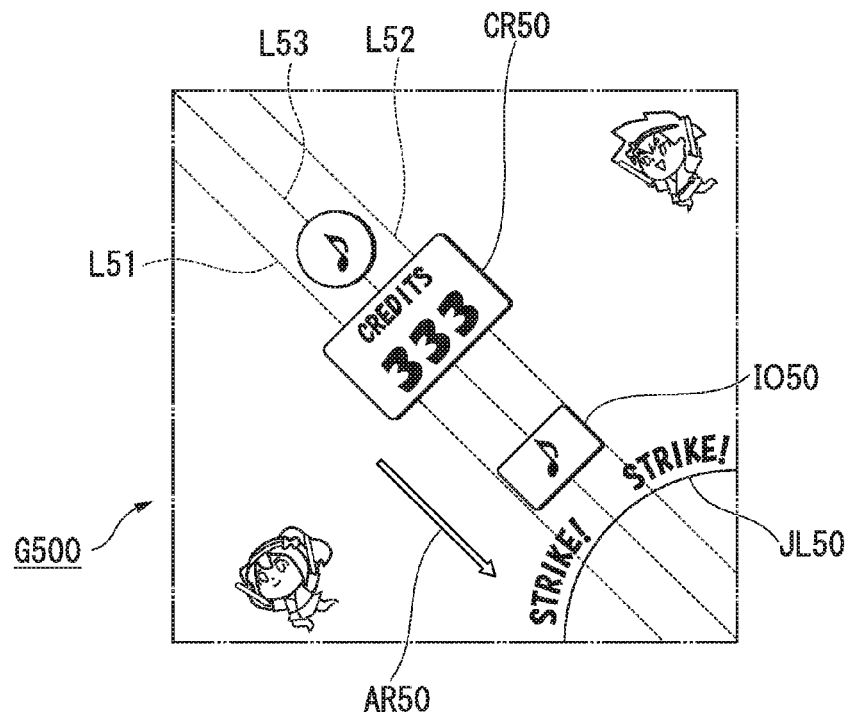
FIG. 13 shows a variation example of object data according to the same embodiment.
FIG. 14 shows a game screen according to a second embodiment of the present invention.

FIG. 14 shows a game screen of a timing game according to the present embodiment.

In the timing game according to the present embodiment, the timing of a striking operation is adjusted to the timing of the arrival of an instructing object at a prescribed position, and the skill of the striking operation is evaluated in accordance with the time offset between the instructed timing and the timing of the striking operation, in a so-called music game. In the example shown in FIG. 14, on the game screen G500 of the timing game are displayed a credit display object CR50 representing the amount of credit held by the player, three lanes, L51, L52, and L53, and an instructing object IO50. The lanes L51, L52, and L53 are movement paths of the instructing object IO50, which instructs the player regarding the timing for a striking operation. The left lane L51 corresponds to a striking operation in the left-side region of the operation acceptance regions of the drum 13, and the right lane L53 corresponds to a striking operation in the right-side region of the operation acceptance regions of the drum 13. The center lane L53 corresponds to a striking operation in either the left-side region or the right-side region of the operation acceptance regions of the drum 13.

The instructing object IO50 appears from the top edge of the game screen G500 with the advancement of a melody and moves along one of the lanes L51, L52, and L53 in the direction indicated by the arrow AR50. A player makes a striking operation with respect to the operation acceptance region of the drum 13 corresponding to each lane, adjusting the timing to the arrival of the instructing object IO50 at the judgment line M50. If the striking operation satisfies a prescribed skill condition, the game machine 10A consumes a prescribed amount of credit held by the player and determines a reward to be paid out to the player.

Next, the types of instructing objects in the present embodiment will be described.

FIG. 15 to FIG. 18 are provided to describe the instructing objects and operations made with respect to these game objects according to the present embodiment.

There are two types of instructing objects in the present embodiment, a single-shot operation object and a continuous operation object, depending upon the striking operation instructed by the instructing object.

The single-shot operation object is an instructing object corresponding to striking the drum 13 one time or the like. In the present embodiment, the single-shot operation object is displayed as a circular image and instructs the timing of a striking operation at the point at which center thereof reaches the judgment line JL50.

A continuous operation object is an instructing object corresponding to striking the drum 13 continuously more than one time or the like. In the present embodiment, the continuous operation object is displayed as a rectangular graphic and instructs the timing of a striking operation during the time in which a part of the rectangle is overlapped with the judgment line JL50.

Figure 15:
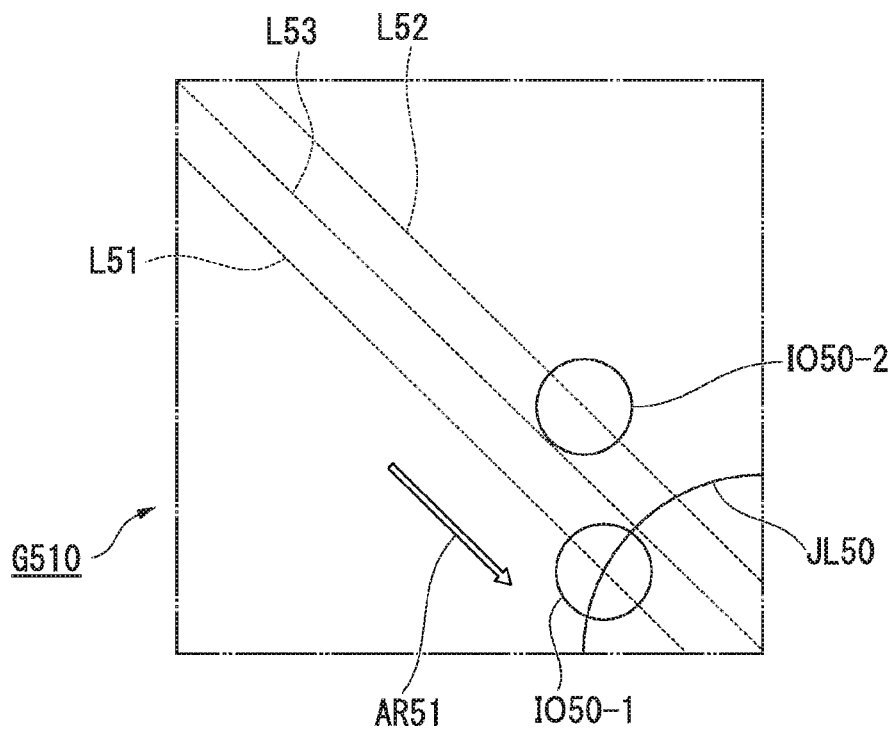
FIG. 15 is a first drawing for describing a game object and operation with respect to the game object according to the same embodiment.

Specifically, on the game screen G510 shown in FIG. 15, the single-shot operation object IO50-1 moves on the left lane L51 in the direction of the arrow AR51. That is, the single-shot operation object IO50-1 instructs the player to strike the left-side region of the operation acceptance regions of the drum 13 at the timing of the center position of the single-shot operation object IO50-1 reaching the judgment line JL50. The single-shot operation object IO50-2 moves on the right line L52 in the direction of the arrow AR51. That is, the single-shot operation object IO50-2 instructs the player to strike the right-side region of the operation acceptance regions of the drum 13 at the timing of the center position of the single-shot operation object IO50-2 reaching the judgment line JL50.

Figure 16:
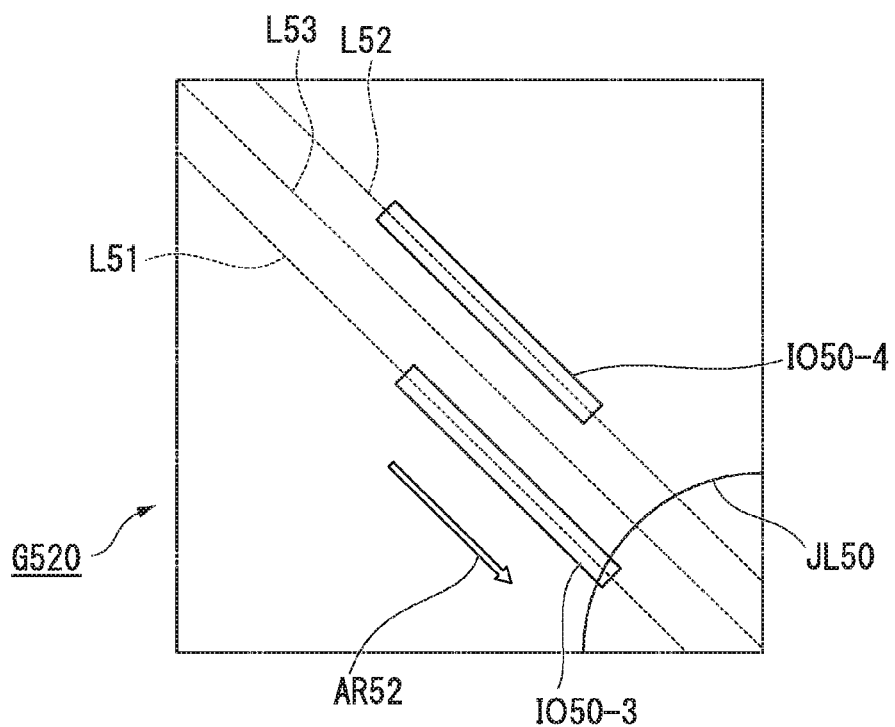
FIG. 16 is a second drawing for describing a game object and operation with respect to the game object according to the same embodiment.

On the game screen G520 shown in FIG. 16, the continuous operation object IO50-3 moves on the left lane in the direction of the arrow AR52. That is, the continuous operation object IO50-3 instructs the player to continue to strike the left-side region of the operation acceptance regions of the drum 13 from the time that the leading end of the continuous operation object IO50-3 reaches the judgment line JL50 until the trailing end thereof passes the judgment line JL50. The continuous operation object IO50-4 moves on the right lane L52 in the direction of the arrow AR52. That is, the continuous operation object IO50-4 instructs the player to strike the right-side region of the operation acceptance regions of the drum 13 from the time that the leading end of the continuous operation object IO50-4 reaches the judgment line JL50 until the trailing end thereof passes the judgment line M50.

Figure 17:
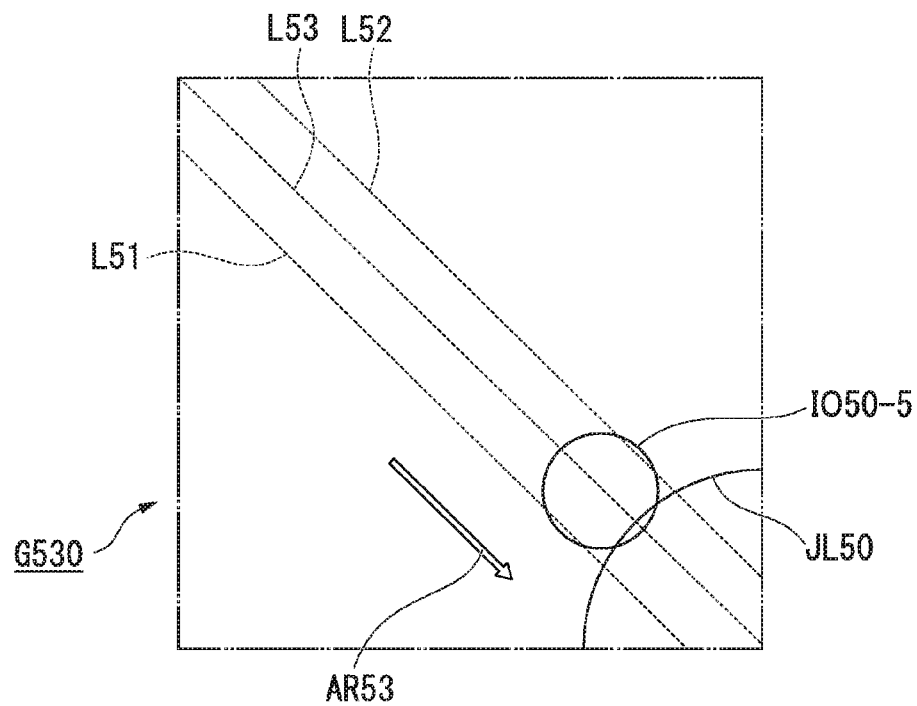
FIG. 17 is a third drawing for describing a game object and operation with respect to the game object according to the same embodiment.

On the game screen G530 shown in FIG. 17, a single-shot operation object IO50-5 moves along the center lane L53 in the direction of the arrow AR53. That is, the single-shot operation object IO50-5 instructs the player to strike at least one of the left-side and right-side regions of the operation acceptance regions of the drum 13 at the timing at which the center position of the single-shot operation object IO50-5 reaches the judgment line M50.

Figure 18:
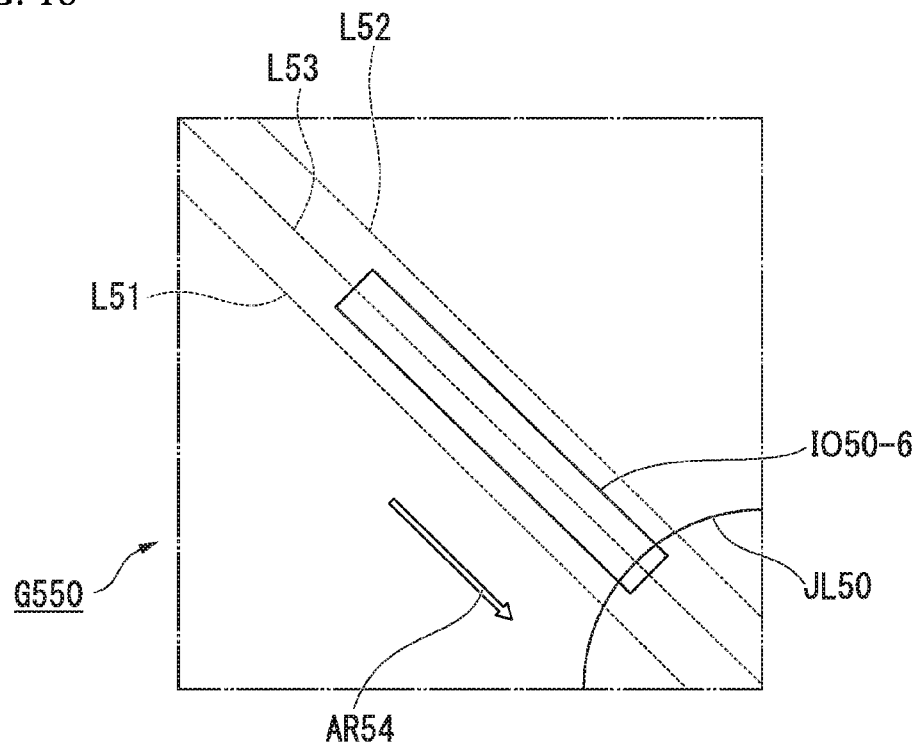
FIG. 18 is a fourth drawing for describing a game object and operation with respect to the game object according to the same embodiment.

On the game screen G540 shown in FIG. 18, a continuous operation object IO50-6 moves on the center lane L53 in the direction of the arrow AR54. That is, the continuous operation object IO50-6 instructs the player to continue to strike at least one of the left-side or the right-side region of the operation acceptance regions of the drum from the time that the leading end of the continuous operation object IO50-6 reaches the judgment line JL50 until the trailing end thereof passes the judgment line M50.

The operation acceptance regions indicated by each of the lanes are not restricted to the above. For example, the center lane L53 may correspond to simultaneously striking the left-side and the right-side regions of the drum 13. Each lane may provide instructions, for example, to press the operating button 15 or to make a touch operation on an instructing object or lane on the touch panel 12.

(Functional Constitution of the Game Machine 10A)

Next, the functional constitution of the game machine 10A will be described.

Figure 19:
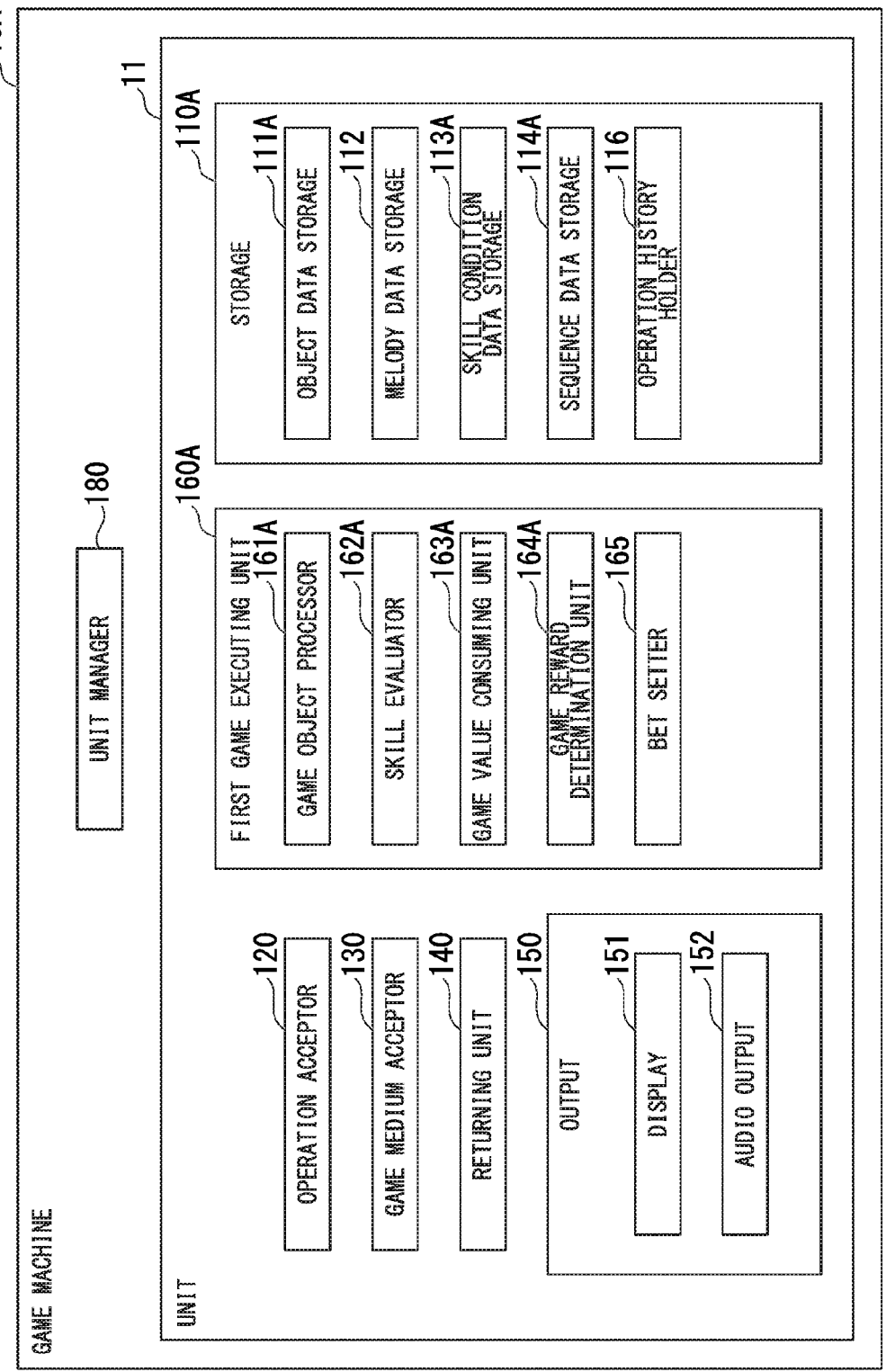
FIG. 19 shows the functional constitution of a game machine according to the same embodiment.

FIG. 19 shows the functional constitution of the game machine 10A according to the present embodiment.

The game machine 10A has a storage 110A and a first game executing unit 160A in place of the storage 110 and the first game executing unit 160 of the game machine 10.

The storage 110A has an object data storage 111A and a skill condition data storage 113A in place of, respectively, the object data storage 111 and the skill condition data storage 113 of the storage 110. The storage 110A further has a sequence data storage 114A.

The object data storage 111A, similar to the object data storage 111, stores object data. In the present embodiment, however, the form of the object data differs from the first embodiment.

FIG. 20 shows an example of the object data according to the present embodiment.

In the example shown in FIG. 20, the object data D111A is constituted by drawing reward information (drawing rewards) and drawing probability (winning probability), associated with instructing object IDs. Association can also be made of the operation credit with each of the instructing object IDs.

The instructing object ID according to the present embodiment, similar to the instructing objects in the first embodiment, is unique identification information for instructing objects. The instructing object IDs in the present embodiment, however, differ from those of the first embodiment in that they include information of the lane in which the instructing object is to be displayed.

For example, the value of an instructing object ID is constituted by combining the lane position on the game screen and an identification number. Specifically, in the object data D111A, the instructing objects having the instructing object IDs L1 and L2 are displayed in the left lane L51. The instructing objects having the instructing object IDs R1 and R2 are displayed in the right lane L52. The instructing objects having the instructing object IDs C1 and C2 are displayed in the center lane L53.

The instructing object ID need not include lane information, and the lane information may be included in the object data D111A as an attribute indicating the lane information that is separate from the instructing object ID.

The skill condition data storage 113A, similar to the skill condition storage 113, stores skill condition data. In the present embodiment, however, the form of the skill condition data differs from the first embodiment. In the present embodiment, the difference between the operation timing of accepting a striking operation and an instructed timing instructed by an instructing object being a value within a prescribed range is established as the skill condition. In this case, the reference value of the time offset between the operation timing and the instructed timing is coded in the skill condition data. The reference value may be coded individually for each lane, for each instructing object, or may be a value that differs depending upon the melody. By doing this, the game machine 10A can vary the level of difficulty for each lane, for each instructing object, and for each melody.

The sequence data storage 114A stores sequence data. Sequence data includes a condition definition part and an operation sequence part. The condition definition part has coded therein, for example, information specifying execution of games that differ for each melody, such as information specifying the tempo, beat, and track of a melody, and the sound effects to be played back when each of the instructing objects is operated. The condition definition part may be provided only at the start of the sequence data, or the condition definition part may be added at an appropriate part midway in the operation sequence part. By doing this, processing such as changing the melody tempo or applying sound effects can be implemented.

In the operation sequence part is coded the timing that operations should be made with respect to each instructing object. That is, the operation sequence part is constituted as a set of a plurality of records in which the timing at which operations should be made during a melody is coded.

FIG. 21 shows an example of the operation sequence part of sequence data according to the present embodiment.

In the example shown in FIG. 21, the operation sequence data part of the sequence data D113A is constituted by operation start timing information ("operation start instruction timing" in FIG. 21), operation end instruction timing ("operation end instruction timing" in FIG. 21), and instructing object IDs ("instructing object ID" in FIG. 21), in association with each other.

The operation start timing information represents the start timing of a striking operation.

The operation end instruction timing information represents the end timing of a striking operation. In the case of a single-shot operation object, only the operation start instruction timing information is coded, and the operation end instruction timing information is not coded.

The operation start instruction timing information and the operation end instruction timing information, for example, are coded using the bar number, beat number, and time within a beat of the melody. The time within a beat is the elapsed time from the start of the beat and is expressed by dividing the beat uniformly into n time units and representing the time as the number of units (hereinafter sometimes referred to as frames) from the start of the beat. For example, if n=100, to refer to an operation timing that is ¼ past the start of the second beat in the first bar of a melody, "01, 2, 025" is coded. Regarding the operation start instruction timing and the operation end instruction timing, it is not necessary to code referenced to a beat, and another unit, such as seconds, may be used in coding.

In the example shown in FIG. 21, the operation start instruction timing t1 does not have an associated operation end instruction timing and has L1 associated with it as the instructing object ID. That is, the record on the operation start instruction timing t1 line indicates that a single-shot operation object having the instruction object ID L1 instructs the timing t1 as the operation timing. In the example shown in FIG. 21, the operation end instruction timing information t6 and L2 as the instructing object ID are associated with the operation start instruction timing information t5. That is, the record on the operation start instruction timing t5 line indicates that the continuous operation object having the instructing object ID L2 instructs the time from t5 to t6 as the timing of an operation.

The first game executing unit 160A has a game object processor 161A, a skill evaluator 162A, a game value consuming unit 163A, and a game reward determination unit 164A in place of the object processor 161, the skill evaluator 162, the game value consuming unit 163, and the game reward determination unit 164 of the first game executing unit 160.

The game object processor 161A, similar to the game object processor 161, controls the disposition and change of the presentation of various game objects on the game screen. However, the game object processor 161A is different from the first embodiment with regard to the point of controlling the display of game objects based on sequence data. The control of the display of instructing objects by the game object processor 161A, that is, so-called sequence processing, will now be described.

First, the game object processor 161A acquires the current time in the melody. The game object processor 161A, for example, with the playback starting time of the melody as a reference, starts keeping time by an internal clock of the game machine 10A, and acquires the current time from the value of the internal clock. Next, the game object processor 161A, of the sequence data, acquires sequence data in which at least the operation start instruction timing information and the operation end instruction timing information are included within the time period corresponding to the display range. In this case, the display range, for example, corresponds to a time range from the current time until two bars into the future.

Next, the game object processor 161A acquires the coordinates within the game screen of all the instructing objects to be displayed on each lane. Specifically, the game object processor 161A first distinguishes on which of the lanes each instructing object is to be disposed. Then, the game object processor 161A, distinguishes the position from the judgment line in the time-axis direction (that is, the direction of movement of the instructing object) of each instructing object, in accordance with the time difference between the instructed timing of each instructing object and the current time. By doing this, the game object processor 161A can acquire the coordinates of each instructing object required for disposing the instructing objects on each lane along the time axis. The game object processor 161A then, based on the acquired coordinates of each instructing object, disposes the instructing objects on the game screen.

The skill evaluator 162A, similar to the skill evaluator 162, evaluates the skill of a striking operation by a player, based on whether or not a prescribed skill condition is satisfied. As noted above, however, the skill condition is different from the first embodiment. The evaluation of skill by the skill evaluator 162A will now be described.

The skill evaluator 162A first acquires from the operation acceptor 120 game operation information representing a striking operation. Next, the skill evaluator 162A, based on the game operation information, determines the operation acceptance region in which the operation was made and the operation timing (time within the melody). Next, the skill evaluator 162A identifies, from among the instructed timings coded in the sequence data, instructed timings regarding the operation acceptance region in which the operation was made. Next, the skill evaluator 162A, of the identified instructed timings, extracts the instructed timing from among the identified instructing timings that is the closest to the operation timing and acquires the time offset between the extracted instructed timing and the operation timing.

Next, the skill evaluator 162A determines the evaluation with respect to the player operation, based on the acquired time offset. Specifically, the skill evaluator 162A determines whether or not the acquired time offset is smaller than the reference value coded in the skill condition data. If the time offset is smaller than the reference value, the skill evaluator 162A determines that the striking operation satisfies the skill condition. If the time offset is not smaller than the reference value, the skill evaluator 162A determines that the striking operation does not satisfy the skill condition. The skill evaluator 162A outputs the determination result to the game object processor 161A, the game value consuming unit 163A, and the game reward determination unit 164A. The skill evaluator 162A need not output the determination result to the game reward determination unit 164A, in which case, for example, the game value consuming unit 163A outputs to the game reward determination unit 164A information indicating that the game value consuming unit 163A has consumed a prescribed amount of game value.

If reference values are coded in the skill condition data that differ for each lane, for each instructing object, and for each melody, the skill evaluator 162A reads out from the skill condition data the reference values corresponding to each lane, each instructing object, and each melody for each striking operation to be evaluated and compares these with the time offsets. By doing this, the skill evaluator 162A can evaluate the skill of a striking operation using a criterion that differs for each lane, instructing object, and melody. A lane, for example, corresponds to an operation acceptance region of the drum 13. Therefore, the skill evaluator 162A, by comparing the time offset with a reference value that differs for each lane, can vary the skill condition in accordance with which of the operation acceptance regions accepted the striking operation, enabling it to change the level of difficult of a striking operation for each operation acceptance region.

The game value consuming unit 163A, similar to the game value consuming unit 163, consumes credit, based on the result of the striking operation skill determination by the skill evaluator 162A.

The game reward determination unit 164A, similar to the game reward determination unit 164, determines a reward, based on the result of the striking operation skill determination by the skill evaluator 162A.

(Game Machine 10A Operation)

Next, the operation of the game machine 10A will be described.

Figure 22:
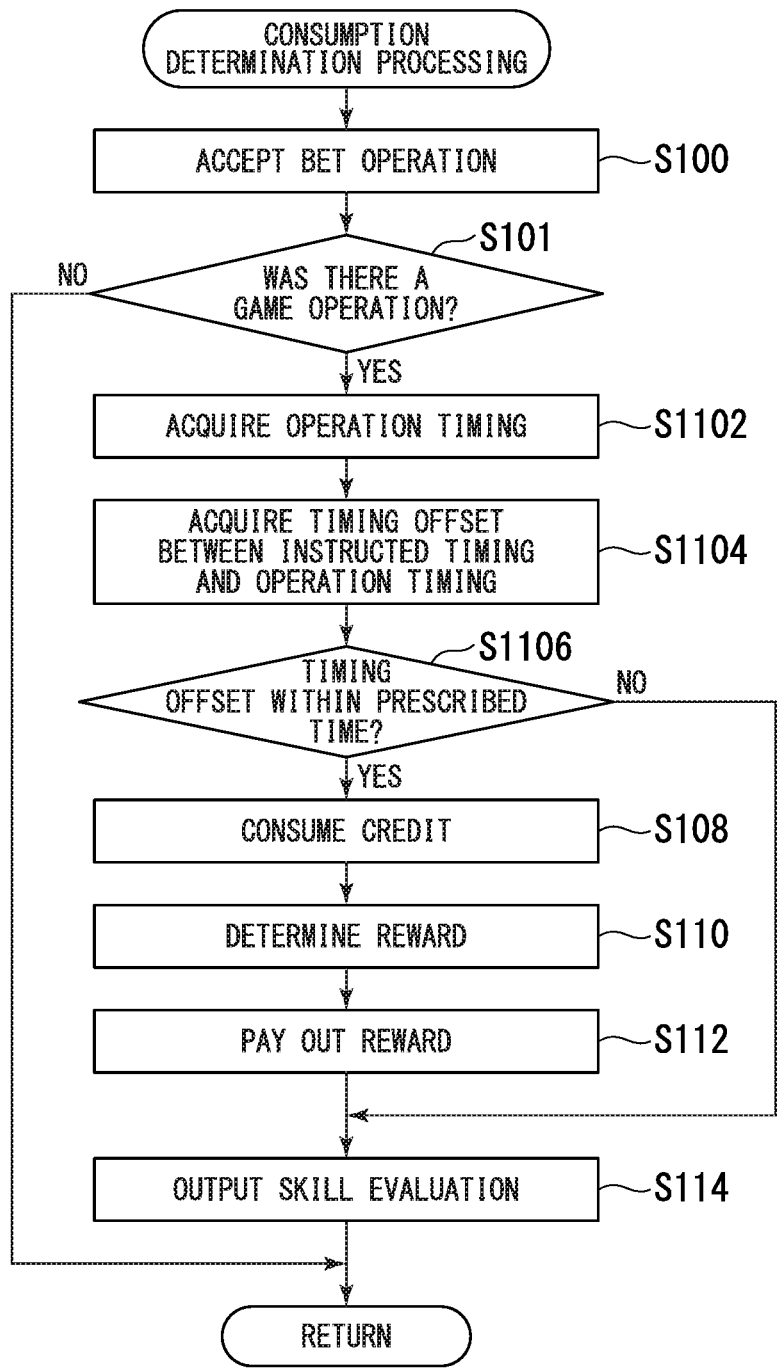
FIG. 22 is a flowchart showing an example of the flow of consumption determination processing by the game machine according to the same embodiment.

FIG. 22 is a flowchart showing an example of the consumption determination processing by the game machine 10A according to the present embodiment.

Of the processing shown in FIG. 22, because processing of steps S100, S101, and S108 to S114 is the same as processing shown in FIG. 12, the description thereof will be omitted.

(Step S1102) If the result of the determination processing at step S101 is YES, the first game executing unit 160A, of the instructing objects, identifies the instructing object that is the closest to the timing at which the game operation was made. After that, the game object processor 160A proceeds to the processing of step S1104.

(Step 1104) The first game executing unit 160A acquires the timing offset between the operation timing instructed by the identified instructing object and the operation timing. After that, the first game executing unit 160A proceeds to the processing of step S1106.

(Step S1106) The first game executing unit 160A, by determining whether or not the acquired time offset is within a prescribed amount of time, determines whether or not the skill condition is satisfied. If the time offset is within the prescribed amount of time (YES at step S1106), the first game executing unit 160A proceeds to the processing of step S108. If the time offset is not within the prescribed amount of time (NO at step S1106), the first game executing unit 160A proceeds to the processing of step S114.

Figure 23:
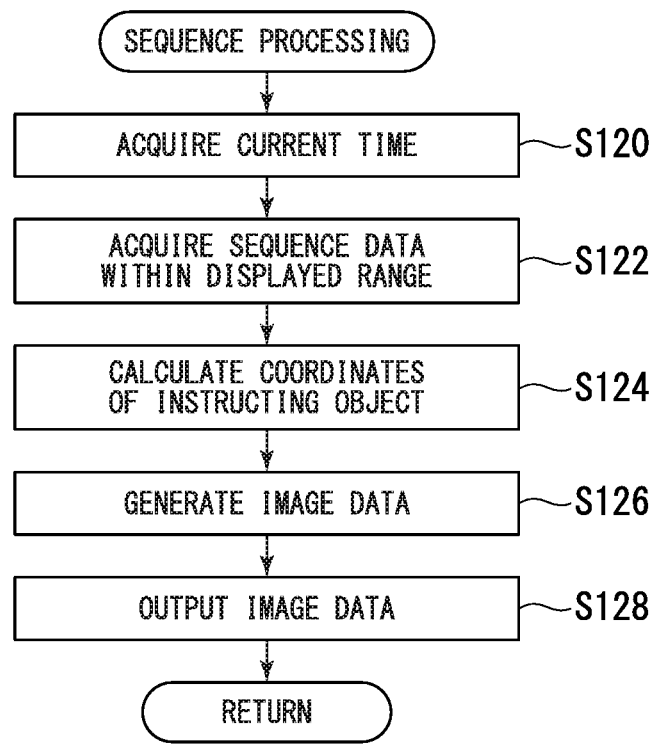
FIG. 23 is a flowchart showing an example of the flow of sequence processing by the game machine according to the same embodiment.

FIG. 23 is a flowchart showing an example of the flow of sequence processing by the game machine 10A according to the present embodiment.

(Step S120) The first game executing unit 160A acquires the current time. After that, the first game executing unit 160A proceeds to the processing of step S122.

(Step S122) The first game executing unit 160A acquires the sequence data within the displayed range. After that, the first game executing unit 160A proceeds to the processing of step S124.

(Step S124) The first game executing unit 160A, based on the acquired sequence data, calculates the coordinates of the position at which the instructing object is disposed in the game screen. After that, the first game executing unit 160A proceeds to the processing of step S126.

(Step S126) The first game executing unit 160A, based on the calculated coordinates, generates image data of a game screen on which the instructing object is disposed. After that, the first game executing unit 160A proceeds to the processing of step S128.

(Step S128) The first game executing unit 160A outputs the generated image data to the display 151, causing it to display the game screen on the touch panel 12. After that, the first game executing unit 160A returns to the processing of step S120.

In the present embodiment, two or more operation acceptance regions are provided, and the amount of credit consumed may be changed, depending upon which operation acceptance region has accepted a player operation. For example, the left-side region can consume a relatively large amount of credit when it accepts an operation by a player, and the right-side region can consume a relatively small amount of credit when it accepts an operation by a player. Also, if an operation acceptance region differing from the operation acceptance region specified by an instructing object is operated, the prescribed amount of credit may be made not to be consumed.

The reward determination method may change, depending upon which operation acceptance region of two or more operation acceptance regions has accepted an operation by a player. Specifically, for example, if the left-side region has accepted a player operation, a drawing may be executed that has a relatively low winning probability but a relatively high reward value, and if the right-side region has accepted a player operation, a drawing may be executed that has a relatively high winning probability but a relatively low reward value.

Summary of the Second Embodiment

As described above, the game machine 10A of the present invention has an operation acceptor 120 that accepts a game operations by a player (for example, striking operations) and a game value consuming unit 163A that consumes a prescribed amount of game value (for example, credit) if a game operation (for example, a striking operation) satisfies a prescribed skill condition.

By doing this, the game machine 10A consumes game value after evaluating the skill of a game operation. The game machine 10A, therefore, can change the amount of game value consumed in accordance with the skill of a game operation.

The game machine 10A according to the present embodiment further has a display 151 that displays game objects (for example, instructing objects) that move within the screen. The prescribed skill condition is the difference between the timing at which the game object reaches a prescribed position and the operation timing of a player accepted by the operation acceptor 120 being within a prescribed range.

That is, the game machine 10A can determine whether or not a skill condition has been satisfied based on the time difference between the instructed timing instructed by an instructing object and the operation timing of a game operation.

The operation acceptor 120 accepts game operations from a player with respect to two or more operation acceptance regions, and the game value consuming unit 163A (an example of a game value consuming unit) changes the prescribed skill condition in accordance with which of the two or more operation acceptance regions accepted the player operation.

By doing this, the game machine 10A, for example, can make the criteria for determining whether to consume game value different between the left-side region and the right-side region of the striking surface of the drum 13.

The operation acceptor 120 accepts game operations from a player with respect to two or more operation acceptance regions, and the game reward determination unit 164A (an example of a game reward determination unit) changes the reward determination method in accordance with which operation acceptance region of the two operation acceptance regions accepted an operation by a player.

By doing this, because the game machine 10A can change the reward determination method for a striking operation for each of the right-side and left-side regions of the drum 13, it can achieve diversity in the form of the payout of game value.

Third Embodiment (Game Machine 10B Overview)

The third embodiment of the present invention will now be described. In the following the same reference symbols will be assigned to elements that are the same as in the above-described embodiments, and the descriptions thereof will be incorporated herein.

Figure 24:
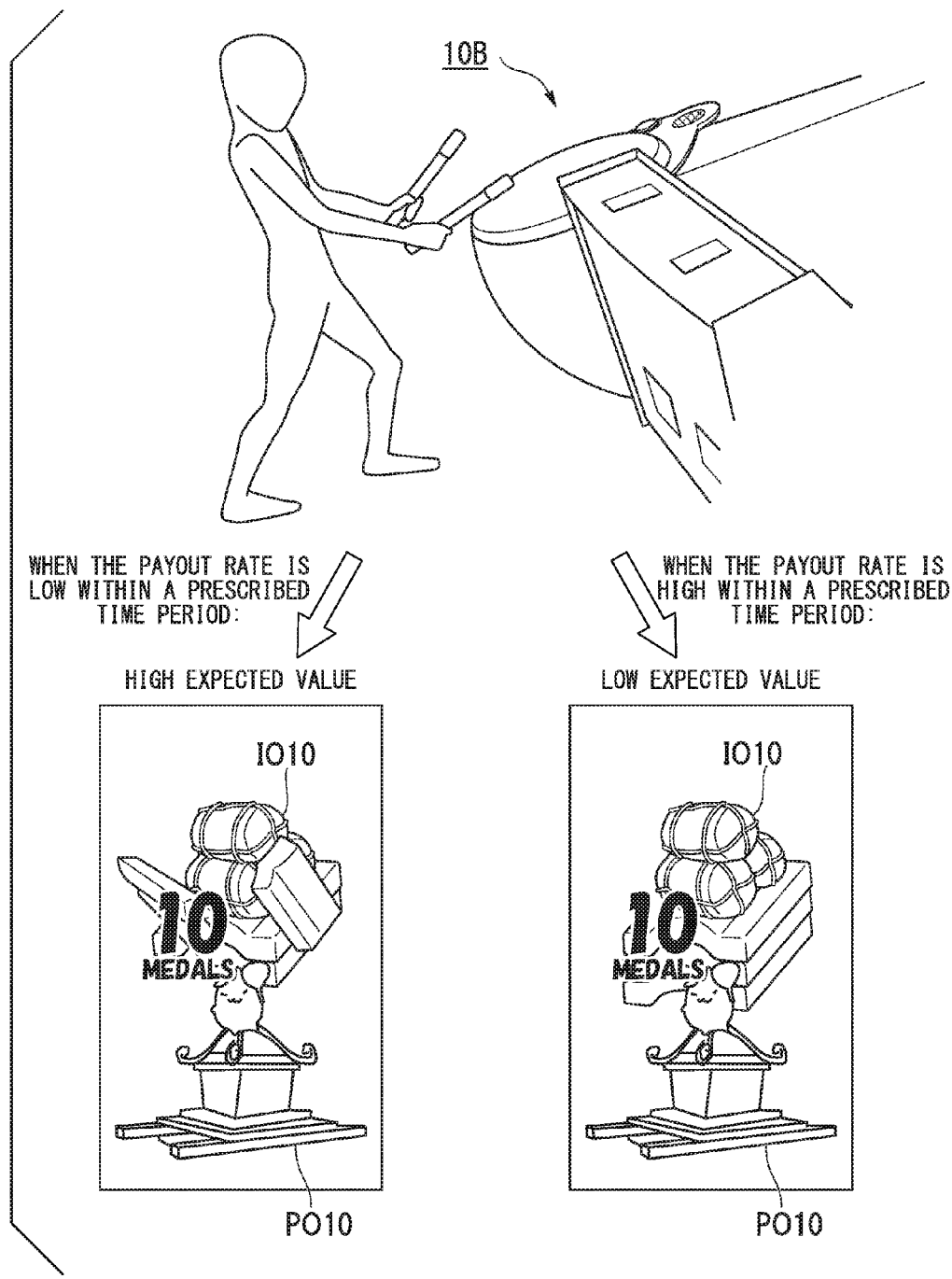
FIG. 24 shows an overview of a game machine according to a third embodiment of the present invention.

FIG. 24 shows an overview of a game machine 10B of the present invention.

The game machine 10B according to the present embodiment has the same hardware constitution as the game machine 10 according to the first embodiment and executes a timing game. However, the game machine 10B differs from the game machine 10 according to the first embodiment with regard to varying the reward determination method in accordance with the amount of credit (hereinafter called "consumed credit") that was consumed in a prescribed period of time and the amount of credit (hereinafter called "reward credit") paid out during the prescribed period of time. Specifically, for example, if the ratio of the reward credit with respect to the consumed credit in a prescribed period of time is lower than a prescribed reference value, that is, if the payout rate is lower than the reference value, the game machine 10B increases the winning probability in a reward drawing or the reward value in the case of winning in a drawing. In contrast, if the ratio of the reward credit with respect to the consumed credit in a prescribed period time is higher than a prescribed reference value, that is, if the payout rate is higher than the reference value, the game machine 10B decreases the winning probability in a reward drawing or the reward value in the case of winning in a drawing. By doing this, because the future payout rate can be adjusted based on the past payout rate, the game machine 10B can avoid having the payout rate diverge greatly from a prescribed reference value.

(Functional Constitution of the Game Machine 10B)

Next, the functional constitution of the game machine 10B will be described.

Figure 25:
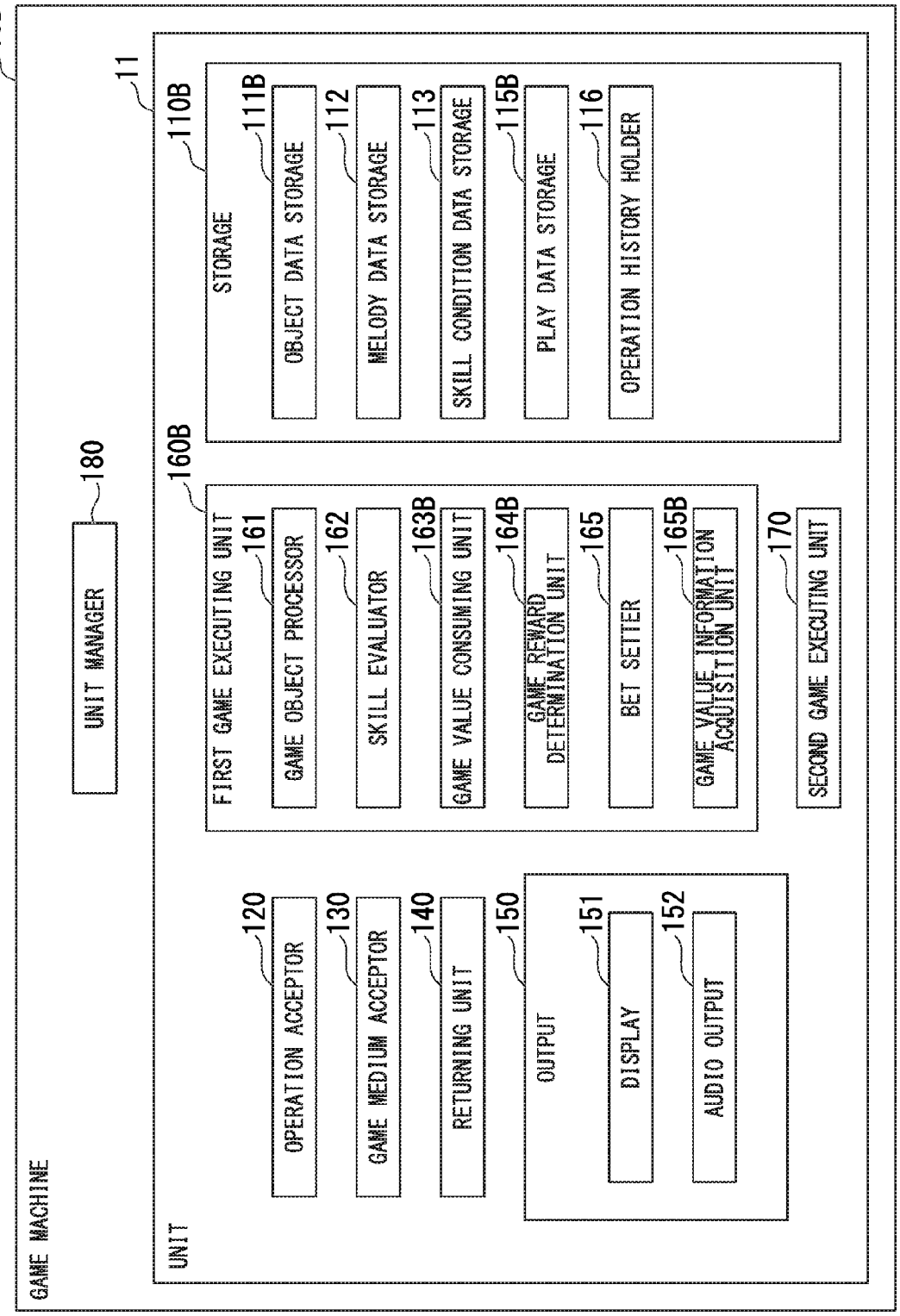
FIG. 25 shows the functional constitution of the game machine according to the same embodiment.

FIG. 25 shows the functional constitution of the game machine 10B according to the present embodiment.

The game machine 10B has, a storage 110B and a first game executing unit 160B in place of the storage 110 and the first game executing unit 160 of the game machine 10 according to the first embodiment.

The storage 110B has an object data storage 111B in place of the object data storage 111 of the storage 110 according to the first embodiment. The storage 110B further has a play data storage 115B.

The object data storage 111B, similar to the object data storage 111, stores object data. In the present embodiment, however, the object data storage 111B is different with regard to the point of storing two or more object data having different expected values of paid out reward with respect to a player. In this case, object data having a high reward expected value is associated with a relatively low numerical range of payout ratio, and object data having a low reward expected value is associated with a relatively high numerical range of payout ratio. As an example, the difference between object data having a low reward expected value and object data having a high reward expected value is described below.

In the case of object data having a low reward expected value, a drawing reward having a low value or a low winning probability is associated with each instructing object ID. In contrast, in the case of object data having a high reward expected value, even for an object data ID included in object data having a low reward expected value, a drawing reward having a high value or a high winning probability is associated therewith. In this manner, with object data having a low reward expected value, a reward having a relatively low expected value is associated with each instructing object. In contrast, with object data having a high reward expected value, a reward having a relatively high expected value is associated with each instructing object.

The play data storage 115B stores play data representing the consumed credit amount and the reward credit amount. The consumed credit amount and the reward credit amount are coded in the play data, associated with, for example, time information. By doing this, by the game machine 10B referencing the play data, it can acquire the consumed credit amount and the reward credit amount in an arbitrary period of time. As long as the consumed credit amount and the reward credit amount can be acquired for a prescribed period of time, the coding format of the play data may be arbitrary. For example, the sum of the consumed credit amount and the reward credit amount for each prescribed period may be coded in the play data.

The first game executing unit 160B has a game value consuming unit 163B and a game reward determination unit 164B in place of the game value consuming unit 163 and the game reward determination unit 164, respectively, of the first game executing unit 160. The first game executing unit 160B further has a game value information acquisition unit 165B.

Upon acceptance of game value information acquisition request from the game reward determination unit 164B, the game value information acquisition unit 165B references the play data stored in the play data storage 115B. Next, the game value information acquisition unit 165B, based on the referenced play data, acquires the consumed credit amount and reward credit amount in a prescribed time period. The game value information acquisition unit 165B then outputs game value information representing the acquired consumed credit amount and reward credit amount to the game reward determination unit 164B.

In this case, the prescribed period of time is, for example, a period of time from a prescribed amount of time ago to the present. The length of the prescribed period of time may be of an arbitrary length, such as one hour, three hours, or one day. If the length of the prescribed period of time is short, it is easy to maintain a constant payout ratio for each play, regardless of the timing of the play. If the length of the prescribed period of time is long, it is easy to vary the payout ratio for each play by the timing of play, while maintaining the long-term payout ratio.

Similar to the game value consuming unit 163 according to the first embodiment, the game value consuming unit 163B consumes credit if a striking operation accepted from a player satisfies a prescribed skill condition. However, the game value consuming unit 163B differs from the game value consuming unit 163 according the first embodiment in that the consumed credit is coded into the play data in association with date and time information.

The game reward determination unit 164B, similar to the game reward determination unit 164 according to the first embodiment, determines a reward if a striking operation accepted from a player satisfies a prescribed skill condition. The game reward determination unit 164B, however, differs from the game reward determination unit 164 according to the first embodiment in that it changes the reward determination method based on the game value information. If the skill evaluator 162 determines that a striking operation satisfies the prescribed skill condition, the game reward determination unit 164B makes a game value information acquisition request with respect to the game value information acquisition unit 165B and acquires the game value information.

Next, the game reward determination unit 164B acquires the payout rate, based on the consumed credit amount and the reward credit amount in the prescribed time period represented by the game value information acquired from the game value information acquisition unit 165B. The payout rate, for example, can be acquired by dividing the reward credit amount by the consumed credit amount. Next, the game reward determination unit 164B identifies one object data from two or more object data stored in the object data storage 111B in accordance with the acquired payout ratio. Next, the game reward determination unit 164B, from the identified object data, extracts object data regarding an instructing object to which the striking operation was allocated. Next, the game reward determination unit 164B determines the reward, based on the extracted object data. By doing this, the game reward determination unit 164B can change the reward determination method in accordance with the payout rate in a prescribed period of time. If credit is to be paid out as the reward by the game reward determination unit 164B, the credit amount to be paid out is coded in the play data in association with the date and time.

The information of the payout rate in a prescribed period of time is one example of game value information and is not a restriction. For example, the difference value between the reward credit amount and consumed credit amount in a prescribed period of time may be calculated from the game value information and the reward determination method may be changed using this difference value. Although in the above when determining the reward one object data is identified from two or more object data in accordance with the payout rate, this is not a restriction. For example, the reward may be determined by multiplying the object data taken as the reference by a coefficient in accordance with the payout rate. Specifically, if the payout rate is relatively low, the drawing reward value or the winning probability is multiplied by a relatively high coefficient (for example, 1.2), and if the payout rate is relatively high, the drawing reward value or the winning probability is multiplied by a relatively low coefficient (for example 0.8).

(Operation of Game Machine 10B)

Next, the operation of the game machine 10B will be described.

Figure 26:
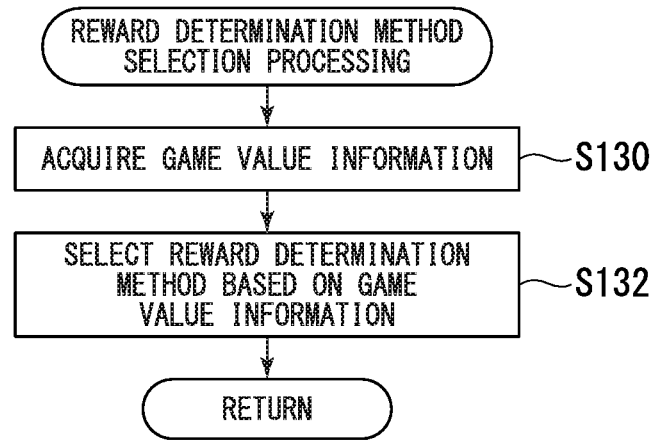
FIG. 26 is a flowchart showing an example of the flow of reward determination method selection processing according to the same embodiment.

FIG. 26 is a flowchart showing an example of the flow of reward determination method selection processing according to the present embodiment.

The processing shown in FIG. 26 corresponds to the processing of step S110 shown in FIG. 12.

(Step S130) The first game executing unit 160B references the play data stored in the play data storage 115B and acquires game value information representing the consumed credit amount and reward credit amount in a prescribed period of time. After that, the first game executing unit 160B proceeds to the processing of step S132.

(Step S132) The first game executing unit 160B selects the reward determination method, based on the acquired game value information. Specifically, the first game executing unit 160B calculates the payout rate during the prescribed period of time, based on the consumed credit amount and reward credit amount represented by the game value information. Next, the first game executing unit 160B identifies the object data corresponding to the calculated payout rate. Next, the first game executing unit 160B, of the identified object data, extracts the object data regarding the instructing object to which the striking operation was allocated. The first game executing unit 160B makes a drawing based on the extracted object data and, if there is a win, pays out a drawing reward. After that, the first game executing unit 160B ends the processing shown in FIG. 26.

Summary of the Third Embodiment

As described above, the game machine 10B according to the present embodiment further has a game value information acquisition unit that acquires game value information that represents the amount of game value consumed in a prescribed period of time and the game value paid out in the prescribed period of time, and the game reward determination unit changes the method of determining the reward based on the game value information.

Because the reward content and winning probability can be changed in accordance with the game value consumed and game value paid out in a prescribed period of time, the game machine 10B can grant a reward to a player in a form in which the game value consumed amount and payout amount do not exhibit a large unbalance.

Fourth Embodiment

The fourth embodiment of the present invention will now be described. In the following, the same reference symbols will be assigned to elements that are the same as in the above-described embodiments, and the descriptions thereof will be incorporated herein.

The game machine 10C according to the present embodiment has the same hardware constitution as the game machine 10 according to the first embodiment and executes a timing game. However, the game machine 10C differs from the game machine 10 in that it consumes credit if a game operation does not satisfy skill evaluation and later returns credit that was consumed.

The overview of the game machine 10C is described below.

(Functional Constitution of the Game Machine 10C)

Figure 27:
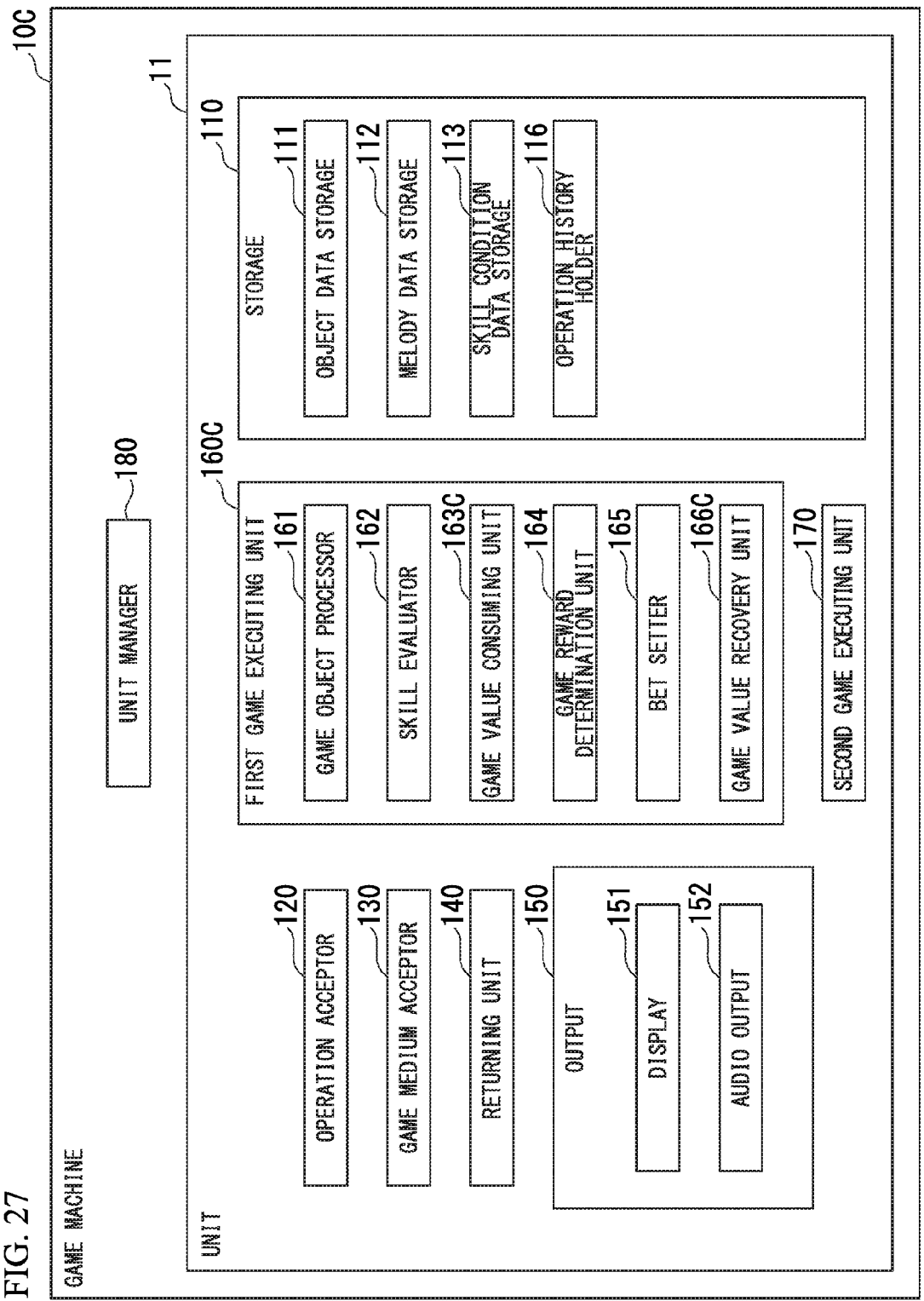
FIG. 27 shows the functional constitution of a game machine according to a fourth embodiment of the present invention.

FIG. 27 shows the functional constitution of the game machine according to the fourth embodiment.

The game machine 10C has a first game executing unit 160C in place of the first game executing unit 160 of the game machine 10.

The first game executing unit 160C has a game value consuming unit 163C in place of the game value consuming unit 163 of the first game executing unit 160. The first game executing unit 160C further has, in addition to the various elements of the first game executing unit 160, a game value recovery unit 166C.

The game value recovery unit 166C recovers a prescribed amount of credit if the operation acceptor 120 has accepted a prescribed game operation. In this case, the prescribed game operation is, for example, a game operation, such as a striking operation, that consumes credit. Also, for example, the game value recovery unit 166C may recover a prescribed amount of credit only if a prescribed skill condition is not satisfied, and the game value recovery unit 166C may recover all or a part of a prescribed amount of credit. The medals M that correspond to all or a part of the recovered credit are returned via the returning unit 140 at a prescribed time, in which case the upper limit of the credit amount to be returned is, for example, the amount of credit that was consumed.

If the operation acceptor 120 has accepted a game operation, the game value consuming unit 163C consumes a prescribed amount of credit, regardless of whether or not the game operation satisfies a skill condition. The timing of consuming the credit may be before the game operation is accepted or may be after the game operation is accepted.

The returning unit 140 may return the credit in a form other than the medals M. For example, the returning unit 140 may, rather than return credit, grant an arbitrary reward, such as an item or a free game. For example, the first game executing unit 160C or the second game executing unit 170 may function as a returning game executing unit that executes a game that makes all or part of the recovered game value a reward. The returning unit 140 may grant an arbitrary reward, such as an item or a free game, based on the number of times a game operation did not satisfy a skill condition.

Although the case in which the returning unit 140 performs return in accordance with the recovery of credit by the game value recovery unit 166C has been described, the returning unit 140 may perform return in accordance with the consumption of credit by the game value consuming unit 163C, in which case the game value recovery unit 165C need not recover credit. That is, the game machine 10C need not have a game value recovery unit 165C. The returning unit 140 may grant more credit than was recovered or consumed.

The above completes the description of the constitution of the game machine 10C.

(Operation of Game Machine 10C)

Next, the operation of the game machine 10C will be described.

Figure 28:
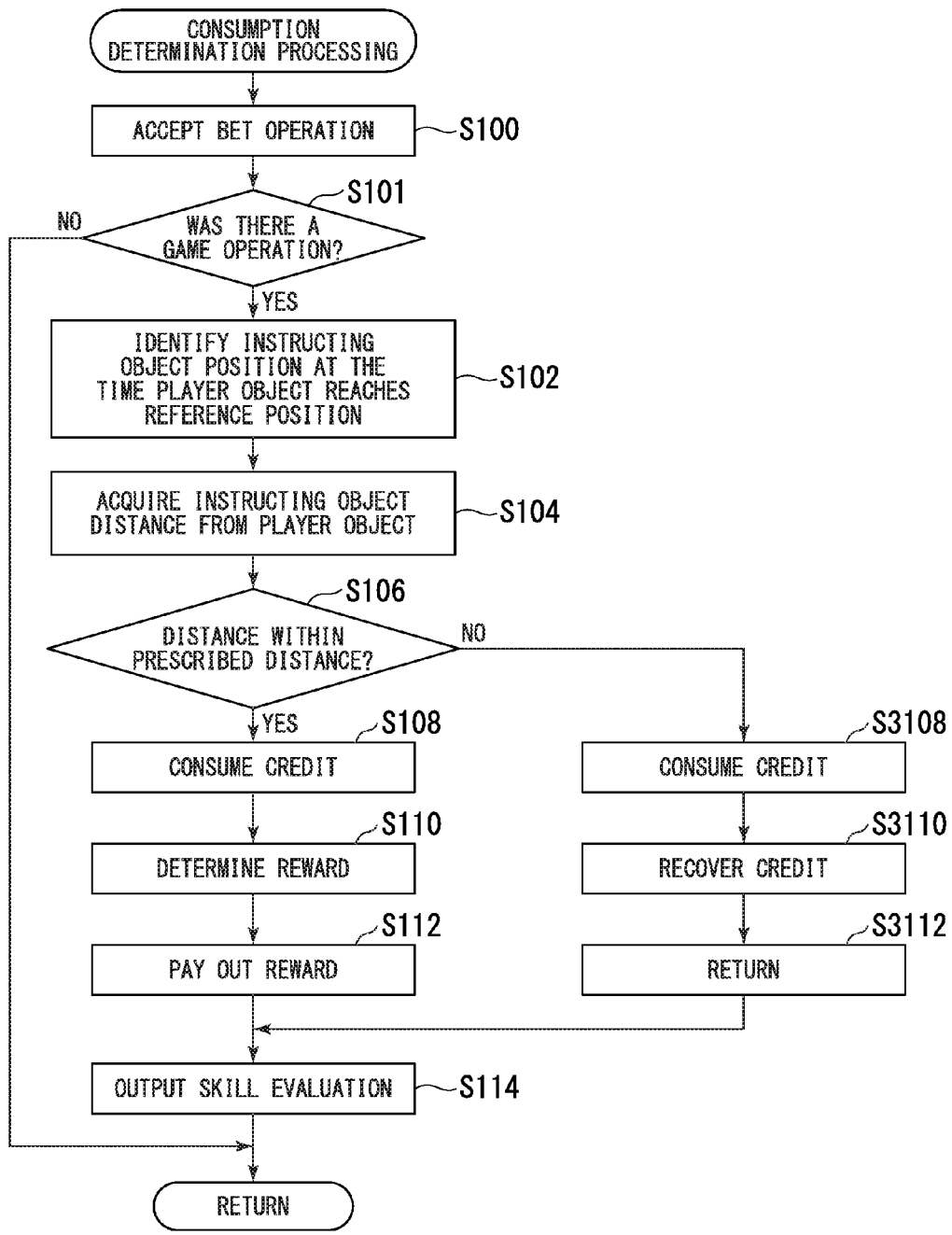
FIG. 28 is a flowchart showing an example of the flow of consumption determination processing according to the same embodiment.

FIG. 28 is a flowchart showing an example of the flow of consumption determination processing by the game machine 10C according to the present embodiment.

Of the processing shown in FIG. 28, because the processing of steps S100 to S114 is the same as processing shown in FIG. 12, the description thereof will be omitted. Here, as one example, the case will be described in which, if a skill condition is not satisfied, the consumed credit is recovered, and medals M corresponding to all of the recovered credit are returned.

(Step S3108) If the determination result at step S106 is NO, the first game executing unit 160C consumes the amount of credit bet at step S100. After that, the first game executing unit 160C proceeds to the processing of step S3110.

(Step S3110) The first game executing unit 160C recovers the amount of credit consumed at step S3108. After that, the first game executing unit 160C proceeds to the processing of step S3112.

(Step S3112) The first game executing unit 160C returns an amount of medals M corresponding to the credit recovered at step S3110. After that, the first game executing unit 160C proceeds to the processing of step S114.

If, for example, the processing of step S3112 may be made to be executed with a prescribed timing, such as when an amount of credit exceeding a reference amount is recovered or credit is recovered a number exceeding a reference number of times.

The above completes the description of the operation of the game machine 10C.

Summary of the Fourth Embodiment

As described above, the game machine 10C according to the present embodiment has an operation acceptor 120 (an example of a game operation acceptance unit) that accepts one or more game operations, a game value consuming unit 163C that consumes game value either before or after the acceptance of one or more game operations by the operation acceptor 120, a skill evaluator 162 that determines whether or not the one or more game operations accepted by the operation acceptor 120 satisfy a prescribed skill condition, and a returning unit 140 that, if the skill evaluator 162 has determined that the one or more game operations accepted by the operation acceptor 120 do not satisfy the prescribed skill condition, returns all or a part of the game value consumed by the game value consuming unit 163C.

By doing this, the game machine 10C returns all or a part of the game value consumed regarding a game operation that did not satisfy the skill condition. For that reason, it is possible to prevent a player with a low game operation skill level from not obtaining rewards and experiencing an increase in the amount of game value consumed. The game machine 10C, therefore, can easily adjust the payout rate, while maintaining the desire of the player to continue playing the game.

The game machine 10C includes an operation acceptor 120 that accepts game operations, a game value consuming unit 163C that consumes game value either before or after the acceptance of one or more game operations by the operation acceptor 120, a skill evaluator 162 that determines whether or not the one or more game operations accepted by the operation acceptor 120 satisfy a prescribed skill condition, and a first game executing unit 160C or a second game executing unit 170 that, if the skill evaluator 162 determines that the one or more game operations accepted by the operation acceptor 120 satisfy the prescribed skill condition, executes a game in which all or a part of the game value consumed by the game value consuming unit 163C is made a reward.

By doing this, the game machine 10C grants a reward with respect to a consumed game value regarding a game operation that did not satisfy the skill condition. For that reason, the game machine 10C can make it easy to obtain a reward, even for a player with a low game operation skill level. The game machine 10C, therefore, can easily adjust the payout rate, while maintaining the desire of the player to continue playing the game.

In the game machine 10C, either the first game executing unit 160C or the second game executing unit 170 (an example of a returning game executing unit), executes a game wherein, after accepted of a plurality of game operations by the game operation acceptor, an amount of game value that differs according to the number of game operations that did not satisfy the prescribed skill condition is made a reward.

By doing this, the game machine 10C can change the expected value of the amount of the reward, in accordance with the number of game operations that did not satisfy the skill condition. For that reason, obtaining a reward is made easy, even for a player with a low game operation skill level. The game machine 10C, therefore, can easily adjust the payout rate, while maintaining the desire of the player to continue playing the game.

In the game machine 10C, the first game executing unit 160C or the second game executing unit 170 (an example of a returning game executing unit), after acceptance of a plurality of game operations by the operation acceptor 120, executes a game in which the reward differs, depending upon the number of game operations that did not satisfy a prescribed skill condition.

By doing this, the game machine 10C can vary the expected value of the reward, in accordance with the number of game operations that did not satisfy the skill condition. For that reason, even a player with a low game operation skill level can possibly obtain a good reward. The game machine 10C, therefore, can easily adjust the payout rate, while maintaining the desire of the player to continue playing the game.

Fifth Embodiment (Overview of Game Machine 10D)

The fifth embodiment of the present invention will now be described. In the following, the same reference symbols will be assigned to elements that are the same as in the above-described embodiments, and the descriptions thereof will be incorporated herein.

The game machine 10D according to the present embodiment has the same hardware constitution as the game machine 10 according to the first embodiment and executes a timing game. However, the game machine 10D differs from the game machine 10 in that it can change or select the amount of credit consumed.

One background for making it possible to change or select the amount of consumed credit will now be described.

For example, immediately after the start of a game, because a player is not accustomed to game operation, it can be imagined that the player will often fail in making game operations. In contrast, when some amount of time has elapsed after the start of the game, because the player becomes accustomed to game operation, it can be imagined that failures in making game operations will be reduced. For that reason, it can be envisioned that, until a player becomes accustomed to game operation, even if a game operation fails, the consumption of credit is made difficult, and at the point at which the player becomes accustomed to game operation, credit is consumed when a game operation fails. By doing this, the game machine 10D can maintain the desire of the player to play the game, while being made to consume more credit.

Given this, the game machine 10D, for example, changes the amount of consumed credit in accordance with the game playing time. Specifically, if a game operation made by a player does not satisfy a skill condition, the game machine 10D is made not to consume credit immediately after the start of the game. In contrast, even if a game operation made by a player does not satisfy the skill condition, if time has elapsed from the start of the game, credit is made to be consumed. The amount of consumed credit may be gradually increased as the game playing time advances. Then, at the point at which a prescribed playing time is reached, the amount of consumed credit, for example, can be made a prescribed amount, such as the bet amount. Although the following is a description of the case of changing the amount of reduction of credit consumed by the game machine 10D as one example, the game machine 10D may directly change the consumed amount of credit itself.

The above completes the description of the overview of the game machine 10D.

(Functional Constitution of the Game Machine 10D)

Figure 29:
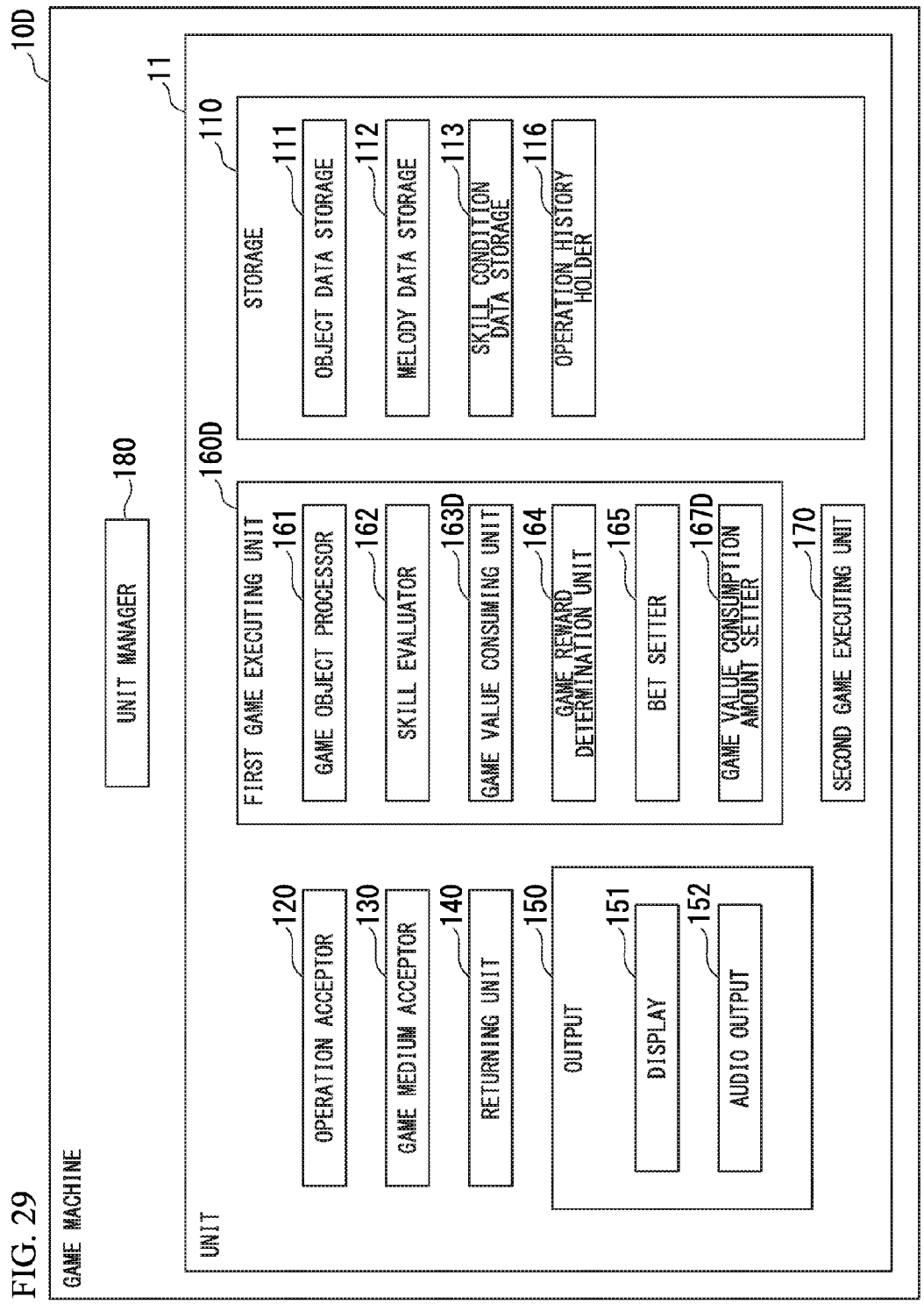
FIG. 29 shows the functional constitution of a game machine according to a fifth embodiment of the present invention.

FIG. 29 shows the functional constitution off a game machine according to the fifth embodiment.

The game machine 10D has a first game executing unit 160D in place of the first game executing unit 160 of the game machine 10.

The first game executing unit 160D has a game value consuming unit 163D in place of the game value consuming unit 163 of the first game executing unit 160. The game machine 10D further has, in addition to the various elements of the first game executing unit 160, a game value consumption amount setter 167D.

The game value consumption amount setter 167D sets the amount of reduction of credit consumed if a game operation has not satisfied a skill condition. In this case, "sets" includes setting, changing, and selecting. The amount of reduction, for example, may be established as a proportion from 0 to 100%. In this case, as one example, the case is described in which there are a plurality of amounts of reduction established beforehand, and the game value consumption amount setter 167D, in setting the amount of reduction, selects one of the plurality of reduction amounts. The setting of the amount of reduction may be performed when the game is not in progress or while the game is in progress. The setting of the amount of reduction may be performed for each game object, or for each operation acceptance region.

If, for example, the playing time is relatively short (for example, immediately after the start of the game), the game value consumption amount setter 167D makes the degree of reduction of the consumed credit amount large. If the playing time is relatively long, the game value consumption amount setter 167D makes the degree of reduction of the consumed credit amount small. The game value consumption amount setter 167D may reduce the amount of credit consumed in only the case in which, for example, a prescribed reduction condition is satisfied.

In this case, the prescribed reduction condition is, for example, being within a bonus time period in the game, being within a grace period immediately after the start of the game, using a prescribed item, or being in a prescribed game mode. The game value consumption amount setter 167D may set the reduction amount of the consumed credit based on, for example, the number of times a game operation is made or the number of times the skill condition has been satisfied. In that case, for example, the greater is the number of times a game operation is made or the number of times the skill condition is satisfied, the more the reduction amount is reduced. The above-noted bonus time period and grace period immediately after the start of the game are examples of a prescribed time period that starts with a prescribed event as the trigger. In the case of a bonus time period, the prescribed event is, for example, a player operation that starts the bonus time period. In the case of the grace period immediately after the start of the game, the prescribed event is, for example, a game starting operation. The game starting operation is, for example, an operation whereby the game machine 10D is made to authorize a player, or the first game operation made after a player is authorized.

The game value consumption amount setter 167D calculates the credit amount to be consumed, based on the bet amount set by the bet setter 165 and the credit reduction amount set by the game value consumption amount setter 167D. The calculated amount of credit is then consumed.

The above completes the description of the constitution of the game machine 10D.

(Operation of Game Machine 10D)

Next, the operation of the game machine 10D will be described.

Figure 30:
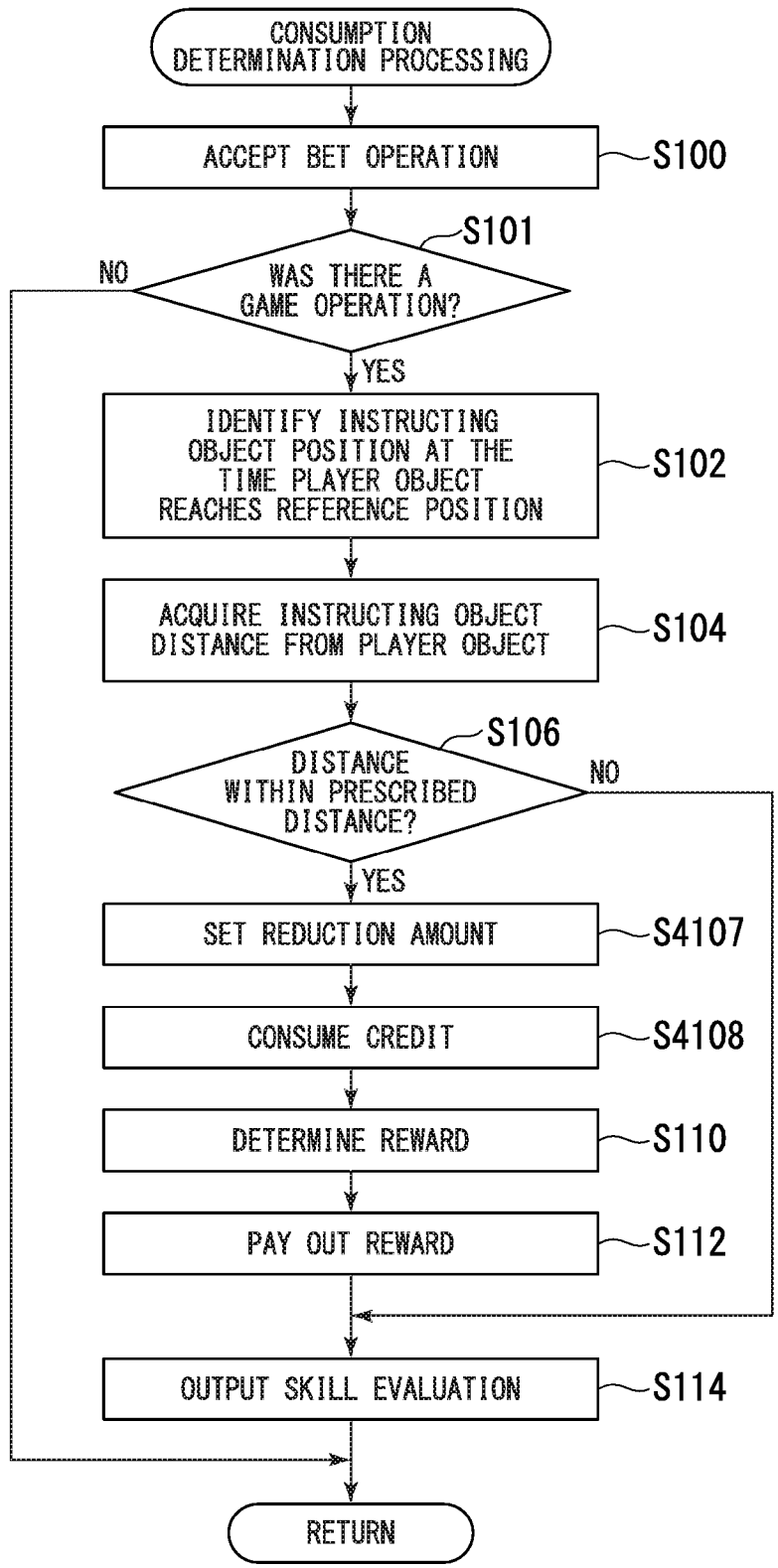
FIG. 30 is a flowchart showing an example of the flow of consumption determination processing according to the same embodiment.

FIG. 30 is a flowchart showing an example of the flow of consumption determination processing by the game machine 10D according to the present embodiment.

Of the processing shown in FIG. 30, because the processing of steps S100 to S106 and S110 to S114 are the same as processing shown in FIG. 12, the description thereof will be omitted. The case in which the amount of reduction of the consumed amount of credit is set based on the playing time will be described as one example. In this case, for example, information associating the reduction amount and the playing time is stored beforehand in the storage 110.

(Step S4107) If the determination result at step S106 is NO, the first game executing unit 160D sets the amount of consumed credit. When this is done, the first game executing unit 160D references an internal timer and acquires information of the playing time. The first game executing unit 160D acquires information of the reduction amount corresponding to the playing time from the storage 110. The first game executing unit 160D sets the acquired reduction amount as the credit reduction amount of credit consumed regarding a game operation accepted at step S101. After that, the first game executing unit 160D proceeds to the processing of step S4108.

(Step S4108) The first game executing unit 160D calculates an amount that is the amount of credit bet at step S100 minus the amount of reduction set at step S4107. The first game executing unit 160D then consumes the calculated amount of credit. After that, the first game executing unit 160D proceeds to the processing of step S110.

The processing of step S4108 may be performed with arbitrary timing.

The above completes the description of the operation of the game machine 10D.

Summary of the Fifth Embodiment

As described above, in the game machine 10D, the game value consuming unit 163D uses information indicating the progress situation of the game to determine the amount of game value to consume.

By doing this, the game machine 10D can change the amount of game value that is consumed in accordance with the progress situation in the game. For that reason, for example, a relatively small amount of game value can be consumed if the player skill level is low, and a relatively large amount of game value can be consumed if the player skill level is high. The game machine 10D, therefore, can maintain the desire of the player to continue playing the game. Because the consumed amount of game value can be maintained as constant, regardless of the player's skill level, the game machine 10D can easily adjust the payout rate.

In the game machine 10D, if the determination is made, using information of the game progress, that a prescribed game condition (reduction condition) has occurred, the game value consuming unit 163D reduces the amount of game value to be consumed.

By doing this, the game machine 10D can reduce the amount of consumed game value if a prescribed game condition occurs. For that reason, the game machine 10D can motivate a player to play so that the prescribed game condition occurs and can maintain the desire on the part of the player to play the game.

In the game machine 10D, if a determination is made that a prescribed event that serves as a trigger occurs within a prescribed period of time, the game value consuming unit 163D reduces the amount of game value to be consumed.

By doing this, the game machine 10D can reduce the amount of game value consumed within a prescribed period of time. For that reason, for example, because a period of time during which game value is not consumed can be provided at the start of the game or the like, the game machine 10D can maintain the desire of the player to play the game.

Sixth Embodiment (Game Machine Overview)

The sixth embodiment of the present invention will now be described. In the following, the same reference symbols will be assigned to elements that are the same as in the above-described embodiments, and the descriptions thereof will be incorporated herein.

The game machine 10E according to the present embodiment has the same hardware constitution as the game machine 10 according to the first embodiment and executes a timing game. The game machine 10E, however, differs from the game machine 10 in that it can change or select the skill condition.

One background for making it possible to change or select the skill condition will now be described.

For example, immediately after the start of a game, because a player is not accustomed to game operation, it can be imagined that the player will often fail in making game operations. In contrast, when some amount of time has elapsed after the start of the game, because the player becomes accustomed to game operation, it can be imagined that failures in making game operations will be reduced. For that reason, it can be envisioned that, until a player becomes accustomed to game operation, the skill condition is made a condition that is relatively easy to achieve and, at the point at which the player becomes accustomed to game operation, the skill condition is made a condition that is relatively difficult to achieve. By doing this, the game machine 10E can make the speed of the advancement of the game constant, while maintaining the desire of the player to play the game.

Given this, the game machine 10E, for example, changes the skill condition in accordance with the game playing time. As one example, the case will be described of the skill condition being the difference (distance) between the position of an instructing object and a position specified based on a game operation by the player being no greater than a prescribed reference value. In this case, the game machine 10E sets the prescribed reference value to a relative large value immediately after the start of the game. In contrast, if time has elapsed from the start of the game, the game machine 10E sets the prescribed reference value to a relatively small value. The prescribed reference value may be made gradually smaller as the game playing time increases.

The above completes the description of the overview of the game machine 10E.

(Functional Constitution of the Game Machine 10E)

Figure 31:
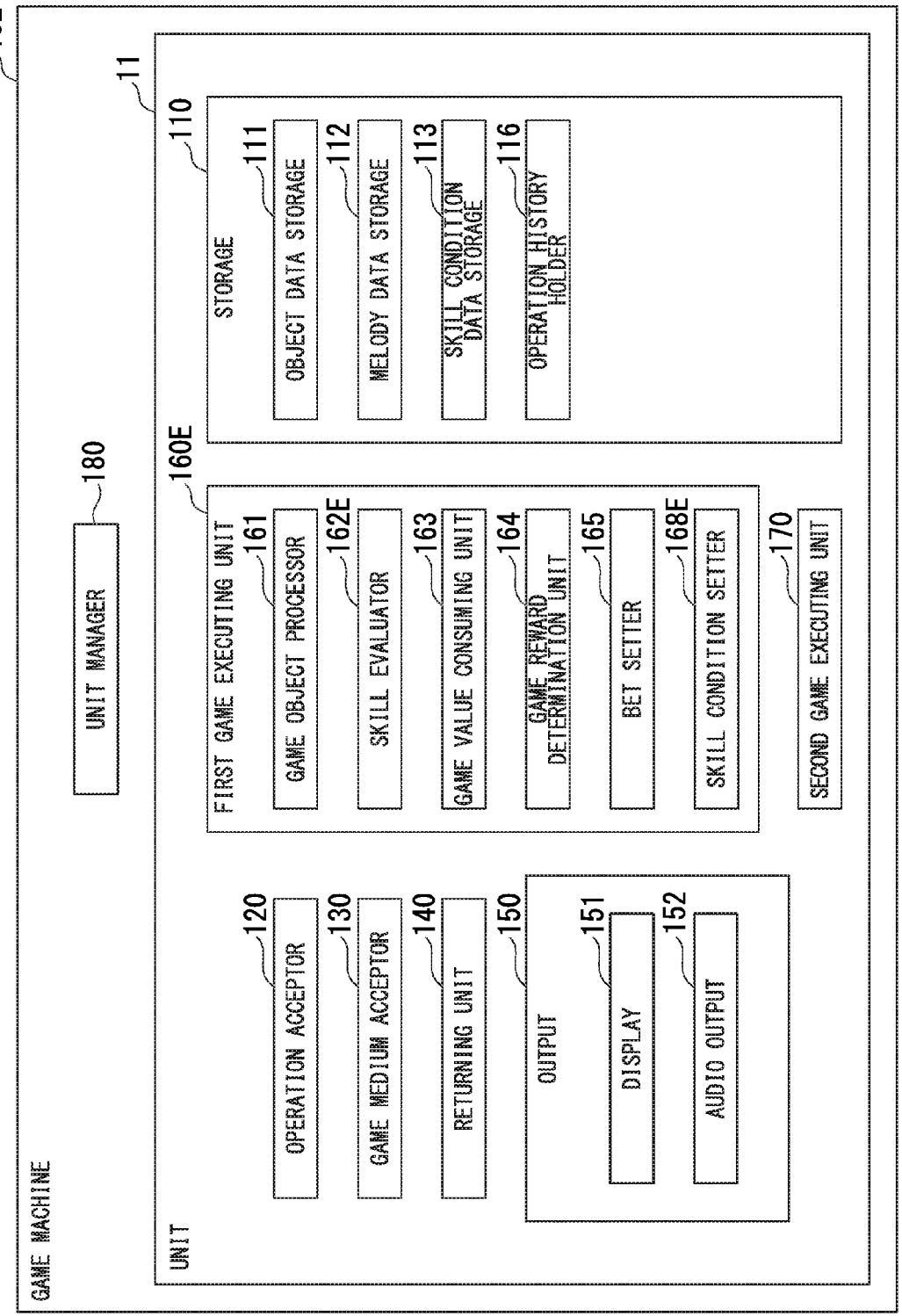
FIG. 31 shows the functional constitution of a game machine according to a sixth embodiment of the present invention.

FIG. 31 shows the functional constitution of the game machine according to the sixth embodiment.

The game machine 10E has a first game executing unit 160E in place of the first game executing unit 160 of the game machine 10.

The first game executing unit 160E has a skill evaluator 162E in place of the skill evaluator 162 of the first game executing unit 160. The first game executing unit 160E has, in addition to the various elements of the first game executing unit 160, a skill condition setter 168E.

The skill condition setter 168E sets the skill condition, based on, for example, the playing time. As an example, the case will be described in which a plurality of skill conditions are established beforehand, and the skill condition setter 168E, in setting the skill condition, selects one of the plurality of skill conditions. The setting of the skill condition may be performed when the game is not in progress or while the game is in progress. The setting of the skill condition may be performed for each game object, or for each operation acceptance region.

If, for example, the playing time is relatively short (for example immediately after the start of the game), the skill condition setter 168E sets a skill condition that is relatively easy to achieve, and if the playing time is relatively long (for example, near the end of the game), it sets a skill condition that is relatively difficult to achieve.

The skill condition setter 168E may change the skill condition only in the case of, for example, a prescribed skill changing condition being satisfied. In this case, the prescribed skill changing condition is, for example, being within a bonus time period in the game, using a prescribed item, or being in a prescribed game mode. The skill condition setter 168E, for example, if in the bonus time period, may set a skill condition that is relatively easy to achieve.

The skill condition may be set based information other than the playing time. For example, the skill condition may be set based on the number of instructing objects displayed on the game screen, the amount of credit consumed with respect to a game operation, the number of times a game operation is made, the number of times a skill condition is satisfied, or a skill condition selection operation by the player. If the skill condition is set based on the number of instructing objects displayed on the game screen, the skill condition setter 168E, for example, sets a skill condition that is relatively easy to achieve if the number of instructing objects is relative large and sets a skill condition that is relatively difficult to achieve if the number of instructing object is relatively small. If the skill condition is set based on the amount of credit consumed with respect to a game operation, the skill condition setter 168E sets a skill condition that is relatively easy to achieve if the amount of credit consumed with respect to a game operation is relatively large and sets a skill condition that is relatively difficult to achieve if the amount of credit consumed with respect to a game operation is relatively small.

If the skill condition is set based on, for example, the number of times a game operation is made or the number of times the skill condition is satisfied, the skill condition setter 168E references the operation history held in the operation history holder 116. The skill condition setter 168E then, for example, sets the skill condition in accordance with the number of game operations made within a prescribed period of time or the number of times the skill condition was satisfied by those game operations, setting the skill condition more difficult to achieve, the greater is the number. If the skill condition is set based on a skill condition selection operation by the player, the skill condition setter 168E sets the skill condition corresponding to the skill condition selection operation accepted by the operation acceptor 120.

The skill evaluator 162E uses the skill condition set by the skill condition setter 168E to evaluate game operations.

The above completes the description of the constitution of the game machine 10E.

(Operation of Game Machine 10E)

Next, the operation of the game machine 10E will be described.

Figure 32:
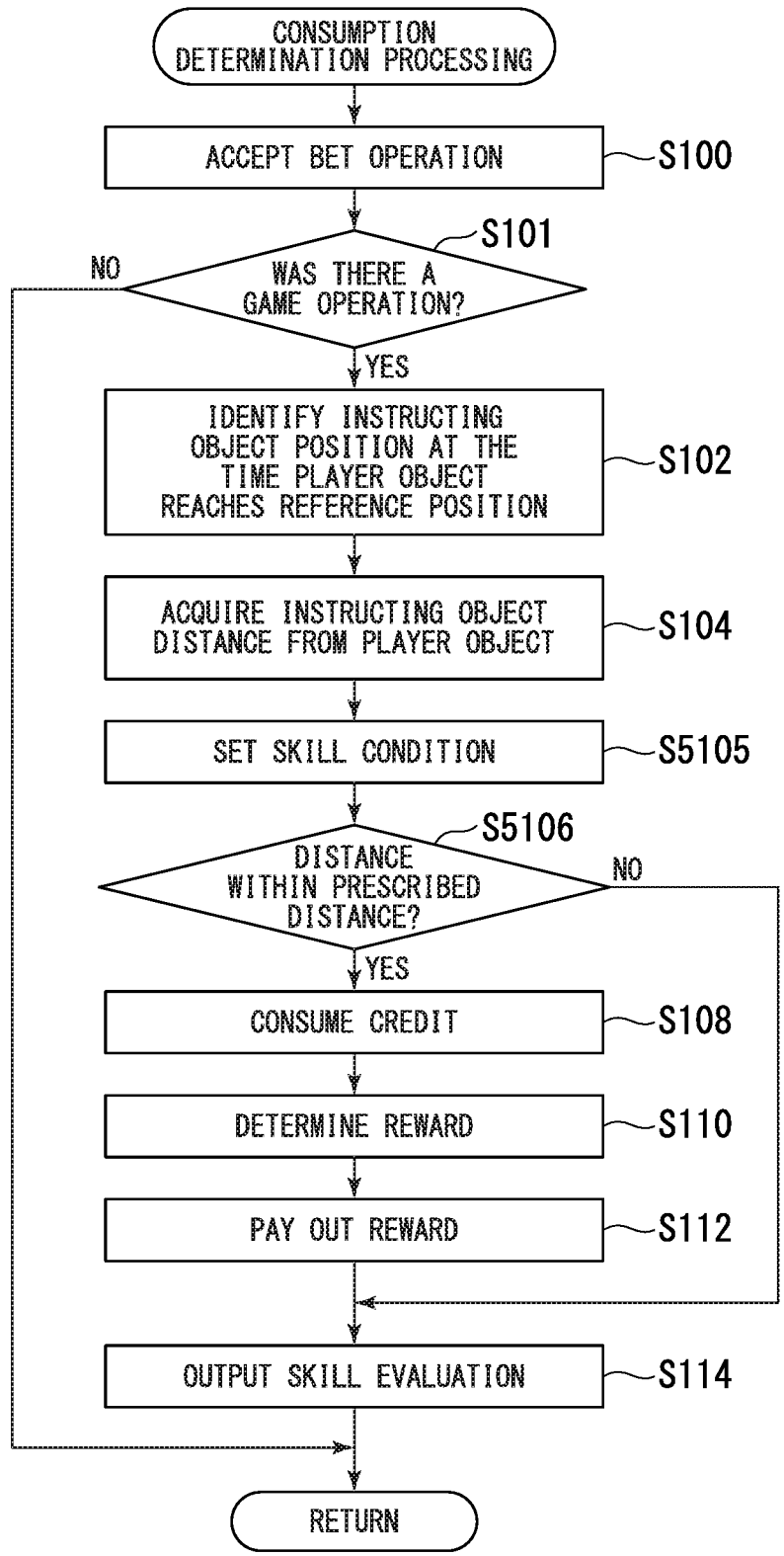
FIG. 32 is a flowchart showing an example of the flow of consumption determination processing according to the same embodiment.

FIG. 32 is a flowchart showing an example of the flow of consumption determination processing by the game machine 10E according to the present embodiment.

Of the processing shown in FIG. 32, because the processing of steps S100 to S104 and S108 to S114 is the same as processing shown in FIG. 12, the description thereof will be omitted. As one example, the case will be described in which the skill condition is set based on the playing time. In this case, for example, information in which the skill conditions and the playing times are associated with each other is stored beforehand in the storage 110. The skill condition has established therein, for example, a reference value of the distance referenced in the skill evaluation.

(Step S5105) After the processing of step S104, the first game executing unit 160E sets the skill condition. When doing this, the first game executing unit 160E references an internal timer and acquires information of the playing time. The first game executing unit 160E acquires from the storage 110 information of the skill condition corresponding to the playing time. The first game executing unit 160E then sets the acquired skill condition as the skill condition used in the evaluation of a game operation accepted at step S101. After that, the first game executing unit 160E proceeds to the processing of step S5106.

(Step S5106) The first game executing unit 160E determines whether or not the distance from the reference position of the player object to the instructing object is shorter than the prescribed distance. In this case, the value of the prescribed distance is the reference value of the distance established in the skill condition acquired at step S5105. If the value is within the prescribed distance (YES at step S5106), the first game executing unit 160E proceeds to the processing of step S108. If the value is not within the prescribed distance (NO at step S5106), the first game executing unit 160E proceeds to the processing of step S114.

The processing of step S5105 may be executed with an arbitrary timing. For example, if the skill condition is set based on a skill condition selection operation, the processing of step S5105 may be performed before step S100. In that case, the first game executing unit 160E accepts the skill condition selection operation in the processing of step S5105 and sets the skill condition based on the accepted skill condition selection operation.

The above completes the description of the operation of the game machine 10E.

Summary of the Sixth Embodiment

As described above, the game machine 10E further includes a skill condition setter 168E that changes a prescribed skill condition, and the skill evaluator 162E determines whether or not one or more game operations accepted by the operation acceptor 120 (an example of a game operation acceptor) satisfy a skill condition that was changed by the skill condition setter 168E.

This enables the game machine 10E to change the skill condition. For that reason, the game machine 10E can, for example, switch the skill condition in accordance with, for example, the playing time or player skill or the game situation. The game machine 10E, therefore, can reset the skill condition suitable to each player, enabling the player to maintain a desire to continue playing the game.

In the game machine 10E, the skill condition setter 168E uses information indicating the game progress situation in changing the prescribed skill condition.

This enables the game machine 10E to change the skill condition in accordance with the game progress situation. For that reason, the game machine 10E, for example, can set a skill condition that is relatively easy to achieve if the player skill level is low and can set a skill condition that is relatively difficult to achieve if the player skill level is high. The game machine 10E, therefore, can maintain the desire of the player to continue playing the game. Because the game machine 10E maintains the frequency of satisfying the skill condition regardless of the skill level of the player, it can easily adjust the payout rate.

In the game machine 10E, the skill condition setter 168E changes the prescribed skill condition in accordance with the type of game object.

Doing this, because the game machine 10E changes the skill condition in accordance with the type of game object, it can change the level of operation difficulty for each type of game object. The game machine 10E, therefore, can heighten interest in the game.

The game machine 10E further includes an operation acceptor 120 (an example of a setting operation unit) that accepts a skill condition selection operation regarding a prescribed skill condition, and the skill condition setter 168E sets a prescribed skill condition based on the skill condition selection operation accepted by the operation acceptor 120 as the setting operation unit.

By doing this, the game machine 10E enables selection of the skill condition by the player. For that reason, for example, a player not accustomed to game operation can play with a skill condition that is relatively easy to achieve. The game machine 10E, therefore, can maintain the desire of the play to continue playing the game.

The game machine 10E further includes an operation history holder 116 that holds the history of game operations accepted by the operation acceptor 120 as a game operation acceptor, and the skill condition setter 168E sets a prescribed skill condition, using the history of one or more game operations held in the operation history holder 116.

The game machine 10E further includes an operation history holder 116 that holds the history of game operations accepted by the operation acceptor 120 as a game operation acceptor, and the skill condition setter 168E, using the history of game operations, sets a prescribed skill condition while the game is not in progress or changes the prescribed skill condition when the game is in progress.

The game machine 10E further includes an operation history holder 116 that holds the history of game operations accepted by the operation acceptor 120 as a game operation acceptor, and the skill condition setter 168E, using the history of game operations, selects one skill condition from a plurality of prescribed skill conditions.

By doing this, the game machine 10E sets the skill condition from the game operation history. The game machine 10E, therefore, can for example set an appropriate skill condition for each player and can easily adjust the payout rate.

In the game machine 10E, the operation acceptor 120 (an example of a game operation acceptor) can accept a plurality of game operations as one group, the skill evaluator 162E determining whether or not the plurality of game operations accepted as a group satisfy a prescribed skill condition, and, if the skill evaluator 162E determines that the plurality of game operations accepted as a group satisfy the prescribed skill condition, the game value consuming unit 163 consumes game value.

By doing this, the game machine 10E evaluates the skill from a plurality of game operations. The game machine 10E, therefore, compared to the case of evaluating skill from one game operation, can evaluate the skill of the player with good accuracy.

Seventh Embodiment (Game Machine 10F Overview)

The seventh embodiment of the present invention will now be described. In the following, elements that are the same as in the above-described embodiments are assigned the same reference symbols, and the descriptions there will be incorporated herein.

The game machine 10F according to the present embodiment has the same hardware constitution as the game machine 10 according to the first embodiment and executes a timing game. The game machine 10F, however, differs from the game machine 10 in that it can change or select the method of determining the reward with respect to a game operation.

The methods of determining the reward that can be used by the game machine 10F will now be described.

The game machine 10F can use one of three methods, the random reward determination method, the skill-dependent reward determination method, and the hybrid reward determination method, to determine the reward with respect game operation.

The random reward determination method is a method of determining a reward based on random selection. Specifically, the random reward determination method is the method of randomly selecting one of a plurality of rewards having different amounts and types. The random selection may, but need not, have a win or a lose, such as in a drawing. A game using the random reward determination method, for example, is a game of chance. In a game of chance, all the game outcomes determined throughout continuous play have randomness.

The skill-dependent reward determination method is a method of determining the reward based on the result of a skill evaluation. Specifically, the skill-dependent reward determination method is the method of granting a reward in accordance with a skill condition with respect to a game operation that satisfies a skill condition. A game using the skill-dependent reward determination method is, for example, a game of skill. In a game of skill, the skill of a player, more than chance, has a dominant influence over the game outcomes determined throughout continuous play.

The hybrid reward determination method is the method of determining the reward based on a skill evaluation result and on random selection. That is, the hybrid reward determination method is a method of determining the reward that combines the random reward determination method and the skill-dependent reward determination method. A game using the hybrid reward determination method is, for example, a hybrid game. In a hybrid game, a combination of player skill and randomness influence the game outcomes determined through continuous play. In the case of the hybrid reward determination method, a plurality of hybrid reward determination methods in which the weighting of the result of a skill evaluation and random selection are different at the time of determining the reward.

The game machine 10F can execute two or more of the three types of reward determination methods, the random reward determination method, the skill-dependent reward determination method, and the hybrid reward determination method. The game machine 10F sets, changes, and selects the reward determination methods based on various conditions. In the following, as one example, the case will be described in which the game machine 10F determines the reward using one of the three method of determining the reward, the random reward determination method, the skill-dependent reward determination method, and the hybrid reward determination method.

The above completes the overview of the game machine 10F.

(Functional Constitution of the Game Machine 10F)

Figure 33:
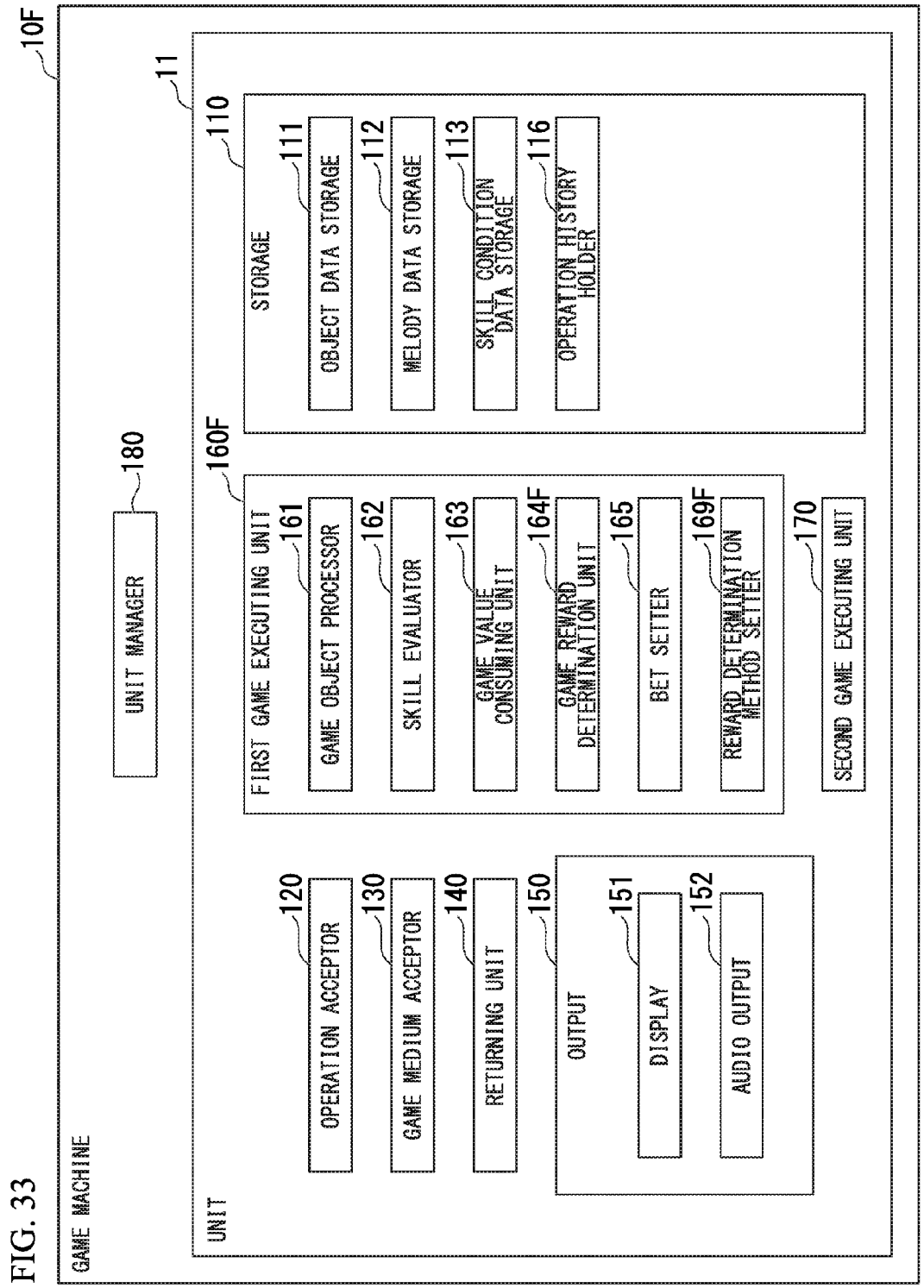
FIG. 33 shows the functional constitution of a game machine according to a seventh embodiment of the present invention.

FIG. 33 shows the functional constitution of a game machine according to the seventh embodiment.

The game machine 10F has a first game executing unit 160F in place of the first game executing unit 160 of the game machine 10.

The first game executing unit 160F has a game reward determination unit 164F in place of the game reward determination unit 164 of the first game executing unit 160. The first game executing unit 160F, in addition to the various elements of the first game executing unit 160, has a reward determination method setter 169F.

The reward determination method setter 169F selects the method of determining the reward, based on a determination method specifying operation by a player. A determination method specifying operation is an operation that specifies the reward determination method. The reward determination specifying operation may be made, for example, for each play in a game, for each game object, or for each operation acceptance region. The reward determination method setter 169F may, for example, select the reward determination method based on a game operation skill evaluation. In that case, if the game object skill evaluation is high, the reward determination method setter 169F selects a reward determination method that has a high distribution (weighting) of skill in the determination of the reward. In contrast, if the game object skill evaluation is low, the reward determination method setter 169F selects a reward determination method that has a high distribution (weighting) of random selection in the determination of the reward.

The game reward determination unit 164F determines the reward with respect to a game operation by the reward determination method selected by the reward determination method setter 169F. As an example, the case in which the reward determination method is established for each operation acceptance region will be described. In this case, if a game operation is made in an operation acceptance region (for example, a chance button) associated with the random reward determination method, the game reward determination unit 164F determines the reward by, for example, making a drawing. The game reward determination unit 164F then grants the determined reward. If a game operation is made in an operation acceptance region (for example, a skill button) associated with the skill-dependent reward determination method, the game reward determination unit 164F determines whether or not the game operation satisfies a skill condition and evaluates the game operation skill. The game reward determination unit 164F then grants a better reward with respect to a game operation having a high skill (for example, satisfying a difficult skill condition).

When a game operation is made in an operation acceptance region (for example, a hybrid button) to which a hybrid reward determination method is associated, the game reward determination unit 164F evaluates the skill of the game operation. The reward is determined based on the evaluated skill and a drawing. For example, the game reward determination unit 164F determines the amount of credit to grant as a reward, by calculating the product of a base value determined by the drawing and a multiplier based on the number of continuous successes. In this case, the number of continuous successes is the number of times in a row an operation that satisfies the skill condition was made. In another example, the amount of credit to grant as a reward is determined by calculating the product of a base value based on the evaluation of operation timing and a multiplier based on a drawing.

The reward determination method may be established beforehand for each game object or each operation acceptance region. For example, in the example shown in FIG. 15, with regard to the single-shot operation object IO50-1, the reward may be determined by the skill-dependent reward determination method, based on the timing at which the game operation was made and, with regard to the single-shot operation object IO50-2, the reward may be determined by the random reward determination method, based on a drawing.

The above completes the description of the constitution of the game machine 10F.

(Operation of Game Machine 10F)

Next, the operation of the game machine 10F will be described.

Figure 34:
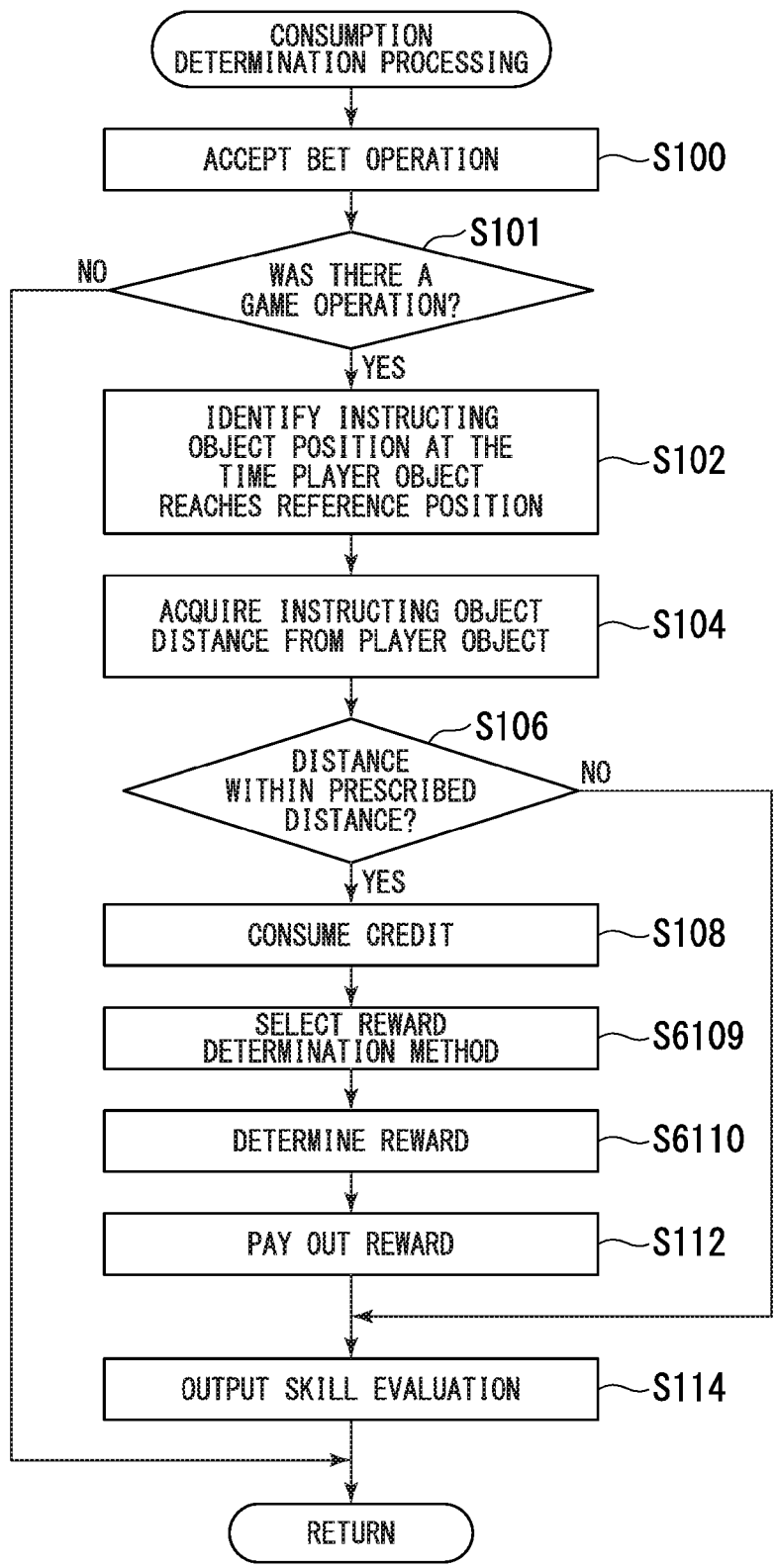
FIG. 34 is a flowchart showing an example of the flow of consumption determination processing according to the same embodiment.

FIG. 34 is a flowchart showing an example of the flow of consumption determination processing by the game machine 10F according to the present embodiment.

Of the processing shown in FIG. 34, because the processing of steps S100 to S108 and S112 to S114 is the same as processing shown in FIG. 12, the description thereof will be omitted. The case in which the reward determination method is established for each operation acceptance region will be described as one example, in which case, for example, information associating the operation acceptance region with a reward determination method is stored in the storage 110 beforehand.

(Step S6109) After the processing of step S108, the first game executing unit 160F identifies the operation acceptance region that accepted a game operation at step S101. The first game executing unit 160F acquires from the storage 110 information corresponding to the identified operation acceptance region. The first game executing unit 160F then, based on the acquired information of the reward determination method, determines the reward determination method corresponding to the game operation accepted at step S101. After that, the first game executing unit 160F proceeds to the processing of step S6110.

(Step S6110) The first game executing unit 160F determines the reward by the reward determination method set at step S6109. After that, the first game executing unit 160F proceeds to the processing of step S112.

The processing of step S6109 may be executed with an arbitrary timing. For example, if the reward determination method is to be selected based on a determination method specifying operation by the player, the processing of step S6109 may be executed before the processing of step S100. In that case, the first game executing unit 160F accepts the determination method specifying operation in the processing of step S6109 and selects the reward determination method based on the accepted determination method specifying operation.

The above completes the description of the operation of the game machine 10F.

Summary of the Seventh Embodiment

As described above, the game machine 10F further has a game reward determination unit 164F that, in the case in which the skill evaluator 162 has determined that one or more game operations accepted by the operation acceptor 120 as a game operation acceptor satisfy a prescribed skill condition, determines the reward with respect to the one or more game operations using a reward determination method based on one or more of the determination result by the skill evaluator 162 and a random selection (for example, a drawing) result.

By doing this, the game machine 10F causes the reward to reflect the skill evaluation result and the random selection result or causes the reward to reflect the skill evaluation result and a drawing result. The game machine 10F, therefore, can determine a reward based simply on the skill alone, and can heighten the interest in the game, compared with the case of determining the reward simply based on randomness alone.

The game machine 10F further has a game reward determination unit 164F that, in the case in which the skill evaluator 162 has determined that a game operation accepted by the operation acceptor 120 satisfies a prescribed skill condition, selects one reward determination method from among a plurality of reward determination methods for determining the reward with respect to the game operation.

By doing this, the game machine 10F sets the method of determining the reward in accordance with the game advancement situation. For that reason, the reward with respect to a player with a low game operation skill level can be determined by a method having a large degree of randomness, and a reward with respect to a player with a high game operation skill level can be determined by a method having a small degree of randomness. The game machine 10F, therefore, can maintain the desire on the part of the player to continue playing the game.

In the game machine 10F, the game reward determination unit 164F determines a reward with respect to one or more game operations by selecting one reward determination method from among a plurality of reward determination methods that include at least a first reward determination method (for example, a hybrid reward determination method) based on the determination result of the skill evaluator 162 and the result of a drawing, a second reward determination method (for example, a random reward determination method) based on a drawing result, and a third reward determination method (for example, a skill-dependent reward determination method) based on the determination result of the skill evaluator 162.

By doing this, the game machine 10F determines a reward by any one reward determination method from among the first reward determination method, the second reward determination method, and the third reward determination method. Therefore, for example, the desire on the part of the player to continue playing the game can therefore be maintained, regardless of the skill level of the player.

The game machine 10F further has an operation acceptor 120 (an example of a determination method acceptor) that accepts a determination method specifying operation that specifies a method of determining the reward with respect to one or more game operations, and the game reward determination unit 164F determines the reward with respect to one or more game operations by the reward determination method specified by a determination specifying operation accepted by the operation acceptor 120 as the determination method acceptor.

By doing this, the game machine 10F can have the player specify the reward determination method. For that reason, the player can, for example, specify a reward determination method suited to the player's own game operation skill. The game machine 10F, therefore, can maintain the desire of the player to continue playing the game.

Eighth Embodiment (Overview of Game Machine 10G)

The eighth embodiment of the present invention will now be described. In the following, elements that are the same as in the above-described embodiments are assigned the same reference symbols, and the descriptions thereof will be incorporated herein.

The game machine 10G according to the present embodiment has the same hardware constitution as the game machine 10 according to the first embodiment and executes a timing game. The game machine 10G, however, differs from the game machine 10 in that it switches the game mode based on the game operation skill.

(Functional Constitution of the Game Machine 10G)

Figure 35:
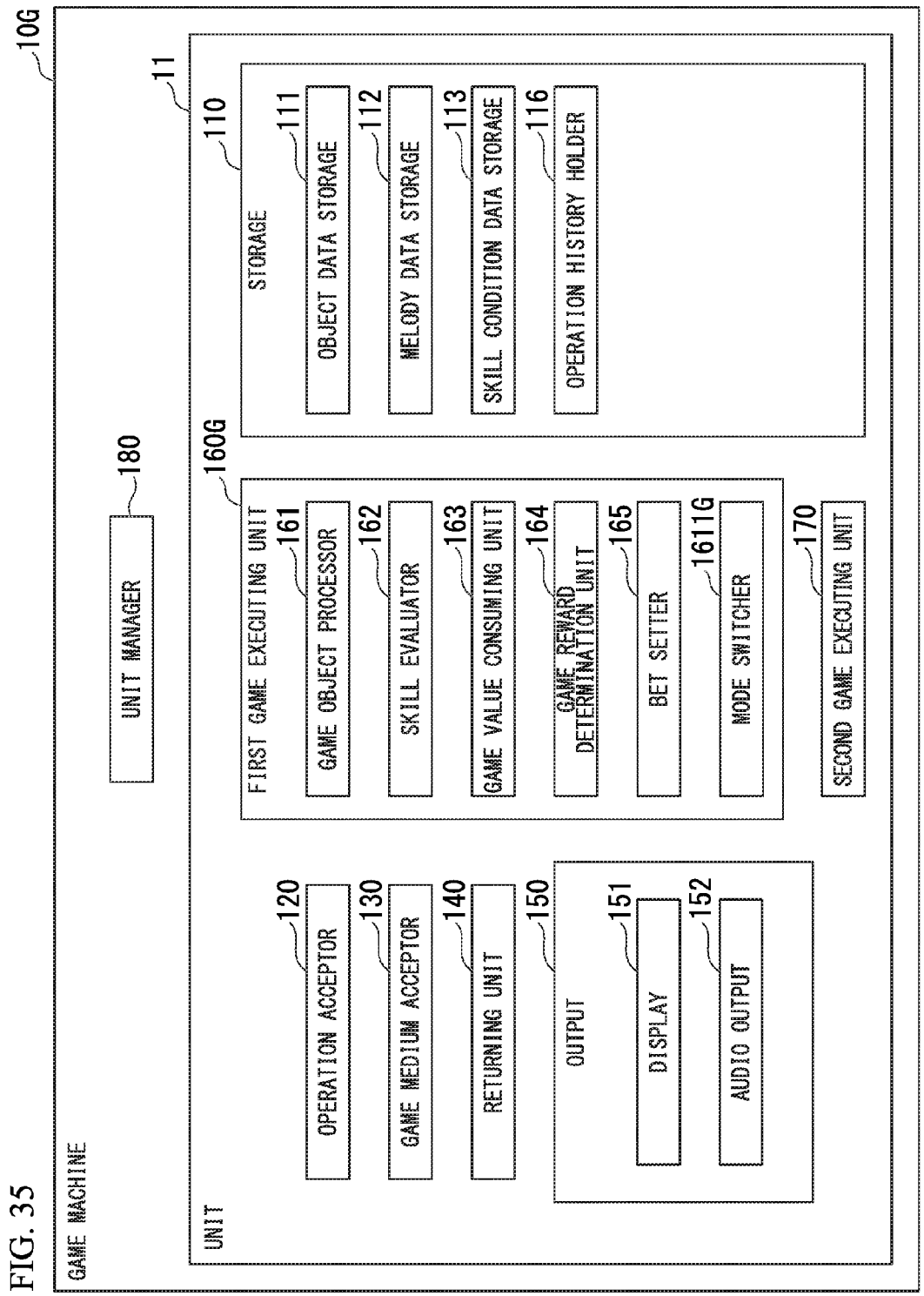
FIG. 35 shows the functional constitution of a game machine according to an eighth embodiment of the present invention.

FIG. 35 shows the functional constitution of a game machine according to the eighth embodiment.

The game machine 10G has a first game executing unit 160G in place of the first game executing unit 160 of the game machine 10.

The first game executing unit 160G, in addition to the various elements of the first game executing unit 160, has a mode switcher 1611G.

The mode switcher 1611G switches the game mode, based on the skill evaluation. For example, if a game operation made in a special game mode has a low skill evaluation, the mode switcher 1611G switches the game mode from the special game mode to the normal game mode. Also, for example, if the skill evaluation is high, the mode switcher 1611G switches to a game mode in which there is a relatively large number of instructing objects displayed on the game screen, and if the skill evaluation is low, it switches to a game mode in which there is a relatively small number of instructing objects displayed on the game screen.

In this manner, the play in a certain mode can be restricted by the skill evaluation. As described above, in the game machine 10, if a game operation does not satisfy a prescribed skill condition, the consumed credit amount is reduced, thereby avoiding a waning of the desire of a player with a low skill level to play. In that case, however, if the player's skill level is low, there is a possibility that the speed of advancement of the game will be slowed down. Given this, if the player's skill level is low, the mode switcher 1611G restricts play in a specific game mode, thereby enabling a player to be motivated to play better. The game machine 10G, therefore, can aim for an improvement in the skill of the player and accelerate the advancement of the game, while avoiding a waning of the desire of a player with a low skill level to play.

Although the case described here is one in which a switch is made from one game mode to another game mode, the game itself may be switched, in which case the unit manager 180 may switch from one game to another game.

The above completes the description of the constitution of the game machine 10G.

(Operation of Game Machine 10G)

Next, the operation of the game machine 10G will be described.

Figure 36:
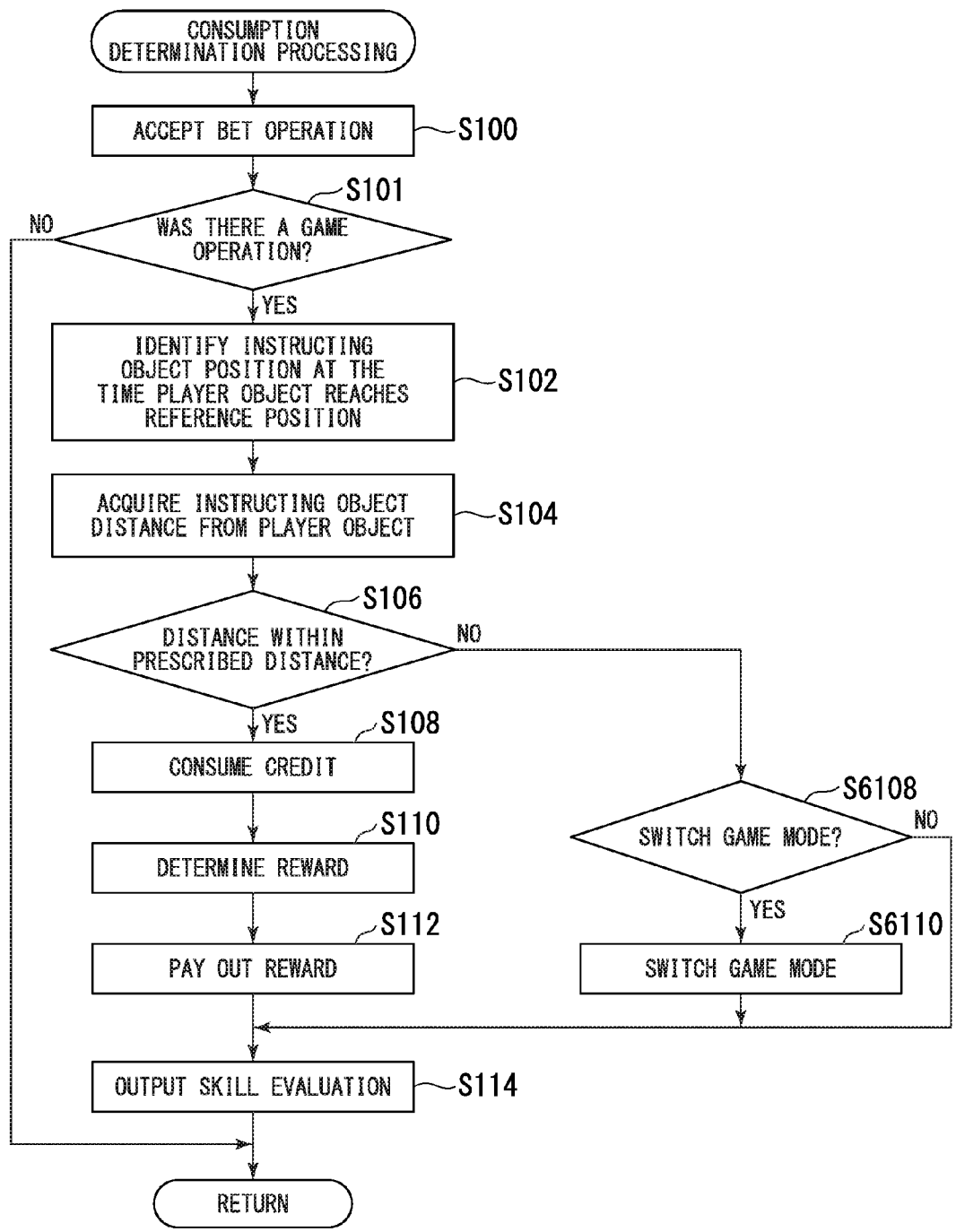
FIG. 36 is a flowchart showing an example of the flow of consumption determination processing according to the same embodiment.

FIG. 36 is a flowchart showing an example of the flow of the consumption determination processing by the game machine 10G according to the present embodiment.

Of the processing shown in FIG. 36, because the processing of steps S100 to S114 is the same as processing shown in FIG. 12, the description thereof will be omitted. The case of switching the game mode if the game operation skill evaluation is low will be described as one example.

(Step S6108) If the determination result at step S106 is NO, the first game executing unit 160G determines whether or not to switch the game mode. Specifically, it determines whether or not the switching destination game mode and the game mode currently being executed are different. If the game modes are different (YES at step S6108), the first game executing unit 160G proceeds to the processing of step S6110. If the game modes are not different (NO at step S6108), the first game executing unit 160G proceeds to the processing of step S114.

(Step S6110) The first game executing unit 160G switches the game mode. After that, the first game executing unit 160G proceeds to the processing of step S114.

Although the case in which the game mode is switched has been described, the game itself may be switched, in which case, in the processing of step S6108, a determination is made as to whether or not the unit manager 180 is to switch the game. In the processing of step S6110, the unit manager 180 switches the game.

The above completes the description of the operation of the game machine 10G.

Summary of the Eighth Embodiment

As described above, the game machine 10G further includes a first game executing unit 160G (an example of a game advancement controller) that controls the advancement of the game. If the skill evaluator 162 has determined that a game operation accepted by the operation acceptor 120 as a game operation acceptor does not satisfy a prescribed skill condition, the first game executing unit 160G changes the game currently in progress. For example, the game machine 10G further includes a mode switcher 1611G that switches between a plurality of modes in one game and, if the skill evaluator 162 determines that a game operation accepted by the operation acceptor 120 does not satisfy a prescribed skill condition, the mode switcher 1611G switches between the plurality of modes.

The game machine 10G further includes a unit manager 180 that switches between a plurality of games and, if the skill evaluator 162 determines that a game operation accepted by the operation acceptor 120 does not satisfy the prescribed skill condition, the unit manager 180 switches between the plurality of games.

By doing this, if a game operation made by a player does not satisfy the skill condition, the game machine 10G can restrict the advancement of, or interrupt the game. The game machine 10G, therefore, motivates a player to improve his or her game operation skills and can maintain the interest of the player to continue playing the game.

Variation Example

Although embodiments of the present invention have been described with references to the drawings, the specific constitution is not restricted to the above-described embodiments, and encompasses designs and the like which are within the scope of the spirit of the present invention. For example, the various elements described in the above-described first to eighth embodiments may be arbitrarily combined.

The present invention is not restricted to the type of games noted in the above-described embodiment, and can be applied as well to other types of games. For example, the present invention can also be applied to a capturing game, a shooting game, a sports game, a slot machine game, a racing game, a placement game, a battle game, a quiz game, a memory game, or a card game.

A capturing game is one in which, for example, a target object displayed as a target is captured. A shooting game is one in which, for example, the target object is shot down. A sports game is one fashioned after a sport in which a target object is hit with a bat, a racket, or the like. A slot machine game is one in which an operation is made to stop each of a plurality of rotating reels, and in which a reward is granted based on the combination of symbols that are displayed stopped. A racing game is one in which, for example, a specific racing item (for example, a car or horse) is operated and in which a race is made to compete for position. A placement game is, for example, one that requires operations to adjust the position or orientation of a plurality objects (for example, blocks). A battle game is, for example, one in which attacks and defense are used to battle with an adversary to decide a win or lose. A quiz game is, for example, one that requires knowledge, calculating ability, graphic understanding or the like. A memory game is, for example, one that tests a player's recollection of information or the like that is temporarily presented to the player. A card game is, for example, one requiring strategy in picking and discarding cards.

In the case of these games, in addition to a condition for determining the accuracy of a single-shot operation timing and operation position, as the prescribed skill condition, conditions that may be adopted include a condition for determining the operation timing and position accuracy of a plurality of continuously made operations (in, for example, a timing game, a shooting game, or a slot machine game), a condition for determining the speed of a game operation and the shortness of the time up until a prescribed game result is obtained (in, for example, a shooting game, a racing game, or a placement game), a condition for determining the accuracy of input and selected information (in, for example, a quiz game or a memory game), and a condition for determining the appropriateness of a strategy (in, for example, a card game).

The present invention may be applied to a game in which a physical object is taken to be a target. For example, the game may be one in which a physical object is moved to a prescribed position using an arm member or the like. In that case, if the arm member or the like did not move to within a prescribed range with respect to the physical object (for example, as determined based on detection by a camera or the amount of movement or the like of the arm member), taking the prescribed skill condition not to have been satisfied, the consumption of game value may be waived or partially reduced. The game may be a pusher game in which medals or the like are inserted and aimed at a prescribed region on a field (for example, the front region on a pusher table). In that case, if a medal or the like was not inserted into a prescribed region of the field (for example, as determined based by detection by a camera), the consumption of game value may be waived or partially reduced.

The present invention is not restricted consuming credit with respect to each game operation, and a period of time may be applied during which game value is consumed, as one time slot (one play) from the start of the game until a prescribed ending condition occurs. In such a game, the prescribed amount of game value (for example, 100 credits) is consumed only in the case in which it is determined that, at the game ending time a game operation satisfies the prescribed skill condition and, if the game operation does not satisfy the prescribed skill condition, the amount of game value consumed can be reduced or none may be consumed, thereby enabling prevention of a waning of the desire on the part of the player to play the game.

The processing executed by the game machines 10 and 10A to 10G of the above-described embodiments can be changed as appropriate to the content of the game. For example, in the game machine 10G, in the case of executing a music game, the player's game operation skill is evaluated for each prescribed period of time (for example, every 20 seconds). If the determination is made that a prescribed skill condition is satisfied, the game machine 10G continues the game based on the continued melody data. In contrast, if the player's game operation is determined to not satisfy the prescribed skill condition, the game machine 10G interrupts the melody and switches to a different game mode. In the game machine 10G, if a racing game is executed, the running course is divided into a plurality of zones, and the game operation skill is evaluated based on the position within each of the zones. If the determination is made that a prescribed skill condition is satisfied, the game machine 10G continues the game in the subsequent zone. In contrast, if the determination is made that the player's game operation does not satisfy the prescribed skill condition, the game machine 10G interrupts the race and switches to a different game mode.

If play is continued until the end of a specific melody or specific course, a bonus (for example, credit or an item) may granted or a title may be granted.

Although in the above-described embodiments the description has been for the case of taking each single game operation alone, the skill evaluation may be made regarding a set of a plurality of game operations. For example, in the game machine 10, if a shooting game is executed, the player skill is evaluated based on the number of hits for each prescribed number of shots fired. If the determination is made that the player skill does not satisfy a prescribed skill condition, the credit consumed for that shooting is reduced or credit is not consumed. Regarding an instructing object that requires a game operation to be made a plurality of times (for example, IO50-3 in FIG. 16), the skill may be evaluated based on one or more game operations made within a prescribed period of time regarding that instructing object. The game machines 10 and 10A to 10G may output the evaluation of skill based on the skill evaluation performed with respect to a set of game operations.

The shape and picture of an instructing object is not restricted to those described above. The method of instructing timing by the instructing object is not restricted to that described above. A variation example of the method of instructing the timing by an instructing object will now be described.

Figure 37:
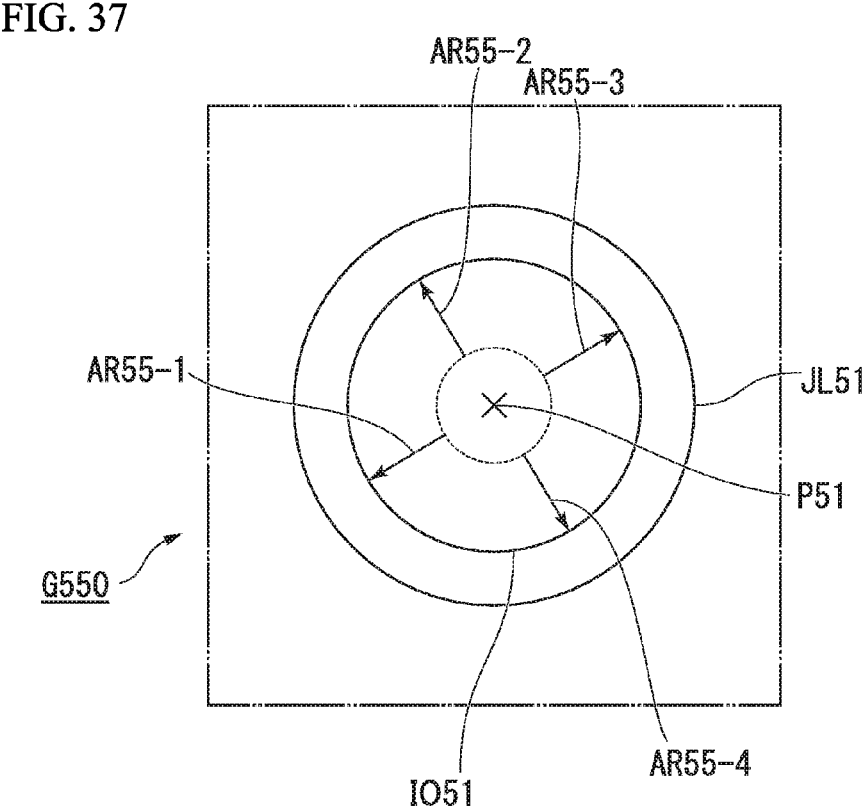
FIG. 37 shows an example of a game object according to a variation example.

FIG. 37 shows an example of an instructing object according to a variation example.

In the example shown in FIG. 37, the judgment line JL51 is a circle having its center at a prescribed center point P51. The instructing object IO51 appears to spurt outward from the prescribed center point P51 and is a circular object having a diameter that increases with the elapse of time (in the direction of the arrows 55-1, 55-2, 55-3, and 55-4). The instructing object IO51 instructs the operation timing at which it overlaps with the judgment line JL51. In this manner, an instructing object may be an object that instructs regarding the timing by changing its shape.

In each of the above-described embodiments, the game machines 10, 10A, and 10B may, rather than accepting the insertion of a medal M, accept insertion of money, such as a bill or coin, a medium such as a card having an internal storage that records data of the money or a ticket on which is recorded a printed code, or a medium in which a medium ID and money data are associated in a medium management server. The game machines 10, 10A, and 10B may, rather than paying out the insertion of a medal M, eject bills or coins, a card having an internal storage that records data of the money or a ticket on which is recorded a printed code, or a medium in which a medium ID and money data are associated in a medium management server. Such a game machine 10, 10A, or 10B is used, for example, in a casino.

In the above-described embodiments, the payout of credit that was not consumed may be made in an arbitrary form. For example, if medals M inserted into the medal inserter unit 18 are temporarily stocked and a striking operation is not satisfied, the game value recovery unit 166C of the game machine 10C may pass the medals M that were not consumed as is to the medal payout unit 17 for return to the player. Also, for example, in the game machine 10C, if a shooting game is to be executed, if a prescribed amount of credit is consumed when shooting and the target was not hit, the game value recovery unit 166C may distinguish the consumed amount of credit as credit to be returned, and may recover the credit. The returning unit 140 returns to the player all or a part of the credit to be returned at a prescribed timing.

The amount of credit returned may be established by an internal drawing, in which case, for example, the proportion to be returned is determined by the drawing. The return of credit may be done at the timing of determining that each game operation does not satisfy the prescribed skill condition, or may be done after the end of a plurality of game operations or at the end of a prescribed period of time (interval). In this case, the game machines 10 and 10A to 10G may return all or a part of the credit to be returned that had be accumulated (recovered) during the time from the return to the next return timing.

The game machines 10 and 10A to 10G may return as credit to be recovered credit that was consumed while consuming a prescribed amount of credit in according to the game operations without satisfying the prescribed skill condition. The game machines 10 and 10A to 10G may grant a reward based on the credit to be recovered. When this is done, the addition of a free game or a bonus game or points or an item in a game different from credit may be provided as a reward. For example, in the game machine 10, if a shooting game is to be executed, if the prescribed amount of credit is consumed during shooting but the target was not hit, the amount of credit consumed is distinguished as credit to be recovered and is recovered. At a prescribed timing, the game machine 10 executes a bonus game, based on the amount of accumulated credit to be recovered. The bonus game may be made a free game that does not require the consumption of credit, or may be a game that can be played by consuming the credit that was to be recovered. The bonus game reward expected value may be set to be higher, the greater is the amount of accumulated credit to be recovered.

Although in the above-described embodiments the description has been for the case in which the determination of credit consumption and the reward are made in linked fashion, this is not a restriction. If the prescribed skill condition is not satisfied, one of the consumption of credit and the determination of the reward may be executed first, these being executed independently.

Although the above-described embodiments are described for the case in which, as one example, if a game operation satisfies a prescribed skill condition an amount of credit that was specified as the bet amount by the player is consumed, this is not a restriction. For example, if a game operation is made, the game machines 10 and 10A to 10G may generate as a bonus object a game object that consumes an amount of credit that is less than normal, or a game object that consumes no credit. If a game operation satisfying the prescribed skill condition is made with respect to this bonus object, the game machines 10 and 10A to 10G may grant a reward in the same manner as for a normal game object.

Also, for example, the game machines 10 and 10A to 10G may execute a bonus game (free game) if a prescribed condition is satisfied. During the bonus game, with regard to all the game objects that are targets for game operations, the amount of credit consumed may be reduced or no credit may be consumed.

In each of the above-described embodiments, a game operation may be made in an arbitrary form. Specifically, for example, the operation of striking the edge of the striking surface of the drum 13 may be detected as a striking operation different from a striking operation near the center of the striking surface. Also, for example, in the game machines 10 and 10B to 10G, an operation of touching the player object PO10 displayed on the touch panel 12 may be treated the same as a striking operation on the drum 13. In the game machine 10A, for example, an operation of touching the instructing object IO50 or the judgment line JL50 may be treated the same as a striking operation on the drum 13.

A variation example of a game operation will now be described.

Figure 38:
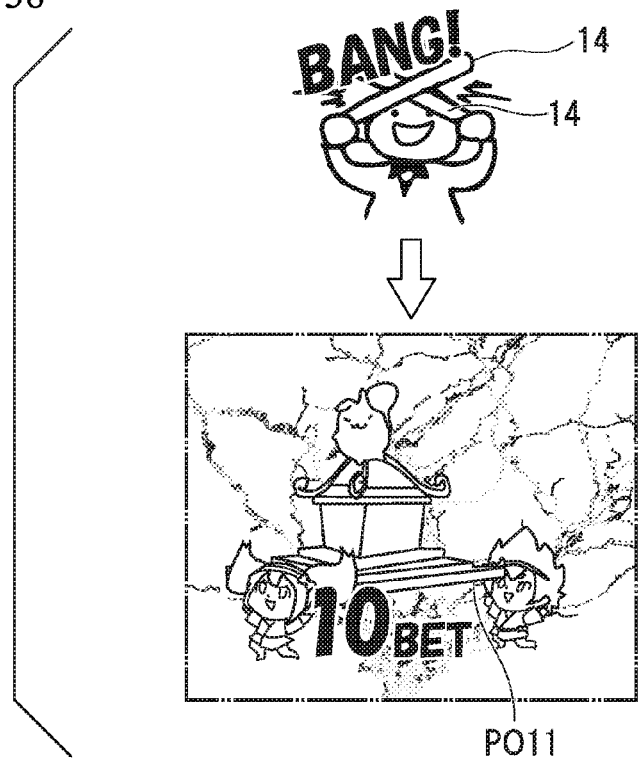
FIG. 38 shows an example of bet operation according to a variation example.

FIG. 38 shows an example of a bet operation according to a variation example.

In the bet operation of the variation example shown in FIG. 38, the player strikes a pair of two sticks 14 together. This operation, for example, increases the unit amount of credit consumed (the so-called bet amount). In this condition, if a striking operation is made, rather than increasing the amount of credit that is consumed each time, the content of the reward or the winning probability is increased, and a drawing with a high expected value is made. In this manner, the game machines 10, 10A, and 10B may accept an operation made by an arbitrary operation method as an arbitrary game operation, a bet operation, or the like, and an arbitrary operation other than those described above may also be accepted.

In the above-described embodiments, the skill condition may be established in a plurality of steps. For example, in the skill condition data according to the first and third embodiments, a plurality of reference distances may be established. In this case, for example, if the distance between the player object and the instructing object satisfies a distance range closer than among a plurality of reference distances, more credit is consumed, and a drawing with a high expected value is made. In contrast, if the distance between the player object and the instructing object satisfies a distance range further away than among a plurality of reference distances, less credit is consumed, and a drawing with a low expected value is made. In this manner, a plurality of skill conditions with different degrees of difficulty may be established to determine the consumed credit and the reward in accordance with the striking operation skill.

In the above-described embodiments, if the maximum bet has been made, the game machines 10 and 10A to 10G may grant an additional reward or grant the opportunity to obtain an additional reward. In this case, the maximum bet is the specification of the maximum bet amount with respect to all the targets that can be bet on (for example, all game objects or all operation acceptance regions).

If a game operation has satisfied the skill condition, the game machines 10 and 10A to 10G may generate a bonus object that only consumes a relatively small amount of credit or an instructing object (bonus object) that does not consume credit (has a consumed amount of zero). If a game operation satisfying a prescribed skill condition is made with respect to such a bonus object, the game reward is determined in the same manner as for a normal instructing object. The game machines 10 and 10A to 10G may be made to generate a bonus game (free game) in accordance with the advancement of the game and, with regard to all the instructing objects that are targets of game operations in the bonus game, may be made to reduce the amount of credit consumed or made not to consume credit.

In one aspect of the present invention, a game machine may include, but is not limited to, a game operation acceptance device configured to accept one or more game operations; a skill evaluating device configured to determine whether or not the one or more game operations that are accepted satisfy one or more predefined skill conditions; and a game value consuming device configured to consume a game value in case that the skill evaluating device determined that the one or more game operations that are accepted satisfy one or more predefined skill conditions.

In some cases, the game machine may further include, but is not limited to, a bet operation acceptance device configured to accept a bet operation which specifies an amount of the game value. The game operation acceptance device is configured to accept one or more game operations to at least one of a plurality of game objects of different types. The bet operation acceptance device is configured to accept one or more bet operations which each specify the consuming amount of the game value to be consumed for each type of the game objects. The game value consuming device is configured to determine the consuming amount of the game value, using the amount of game value specified by the bet operation by the bet operation acceptance device for the game object to the one or more game operations that are accepted by the game operation acceptance device.

In some cases, the game machine may further include, but is not limited to, a bet operation acceptance device configured to accept a bet operation which specifies an amount of the game value. The game operation acceptance device is configured to accept one or more game operations to at least one of a plurality of operation acceptance regions. The bet operation acceptance device is configured to accept one or more bet operations which each specify the consuming amount of the game value to be consumed for each of the plurality of operation acceptance regions. The game value consuming device is configured to determine the consuming amount of the game value, using the amount of game value specified by the bet operation by the bet operation acceptance device for the plurality of operation acceptance region on which the one or more game operations have been accepted by the game operation acceptance device.

In some cases, the game value consuming device is configured to determine the consuming amount of the game value, using information which represents a progress situation in the game.

In some cases, the game value consuming device is configured to reduce the consuming amount of the game value, in case that it is determined that a predefined game condition is satisfied using information which represents the progress situation in the game.

In some cases, the game machine may further include, but is not limited to, a skill condition setting device configured to change the one or more predefined skill conditions. The skill evaluating device is configured to determine whether or not the one or more game operations that are accepted satisfy the one or more predefined skill conditions that have been changed by the skill condition setting device.

In some cases, the skill condition setting device is configured to change the one or more predefined skill conditions by using information which represents the progress situation in the game.

In some cases, the skill condition setting device is configured to change the one or more predefined skill conditions, depending upon the type of the game object.

In some cases, the game machine may further include, but is not limited to, a setting operation acceptance device configured to accept a setting operation to the one or more predefined skill conditions. The skill condition setting device is configured to set the one or more predefined skill conditions, based on the setting operation that is accepted by the setting operation acceptance device.

In some cases, the game machine may further include, but is not limited to, an operation history holding device configured to hold one or more histories of the one or more game operations that are accepted by the game operation acceptance device. The skill condition setting device is configured to set the one or more predefined skill conditions, based on the one or more histories of the one or more game operations that are held by the operation history holding device.

In some cases, the game operation acceptance device is configured to accept a plurality of game operations as a single group of game operations. The skill evaluating device is configured to determine whether or not the single group of game operations that are accepted satisfy the one or more predefined skill conditions. The game value consuming device is configured to consume a game value in case that the skill evaluating device determined that the single group of game operations that are accepted satisfy the one or more predefined skill conditions.

In some cases, the game machine may further include, but is not limited to, a game reward determination device configured to determine a reward to the one or more game operations in a reward determination method based at least one of a result of the determination by the skill evaluation device and a result of a random selection, in case that the skill evaluation device determined that the one or more game operations that are accepted satisfy the one or more predefined skill conditions.

In some cases, the game reward determination device is configured to determine a reward to the one or more game operations in the reward determination method which is selected from a group of a first reward determination method based on the result of the determination by the skill evaluation device and the result of the random selection, a second reward determination method based on the result of the random selection, and a third reward determination method based on the result of the determination by the skill evaluation device.

In some cases, the game machine may further include, but is not limited to, a reward determination method acceptance device configured to accept a reward determination method specifying operation that specifies the reward determination method which determines a reward to the one or more game operations. The game reward determination device is configured to determine a reward to the one or more game operations in the reward determination method specified by the reward determination method specifying operation that is accepted by the reward determination method acceptance device.

In another aspect of the present invention, a game machine may include, but is not limited to, a game operation acceptance device configured to accept one or more game operations; a game value consuming device configured to consume a game value either before or after the game operation acceptance device accepts the one or more game operations; a skill evaluating device configured to determine whether or not the one or more game operations that are accepted by the game operation acceptance device satisfy one or more predefined skill conditions; and a game value returning device configured to return at least a part of the game value that has been consumed by the game value consuming device in case that the skill evaluating device determined that the one or more game operations that are accepted by the game operation acceptance device do not satisfy the one or more predefined skill conditions.

In still another aspect of the present invention, a game machine may include, but is not limited to, a game operation acceptance device configured to accept one or more game operations; a game value consuming device configured to consume a game value either before or after the game operation acceptance device accepts the one or more game operations; a skill evaluating device configured to determine whether or not the one or more game operations that are accepted by the game operation acceptance device satisfy one or more predefined skill conditions; and a game value returning device configured to execute a game with a reward which corresponds to at least a part of the game value that has been consumed by the game value consuming device in case that the skill evaluating device determined that the one or more game operations that are accepted by the game operation acceptance device do not satisfy the one or more predefined skill conditions.

In some cases, the game value returning device is configured to execute a game with, as a reward, the amount of game value which varies depending upon the number of game operations which did not satisfy the one or more predefined skill conditions after the game operation acceptance device accepted the one or more game operations.

In some cases, the game value returning device is configured to execute a game with a reward which varies depending upon the number of game operations which did not satisfy the one or more predefined skill conditions after the game operation acceptance device accepted the one or more game operations.

Each element or device for the game apparatus described above can be implemented by hardware with or without software. In some cases, the game apparatus may be implemented by one or more hardware processors and one or more software components wherein the one or more software components are to be executed by the one or more hardware processors to implement each element or device for the game apparatus. In some other cases, the game apparatus may be implemented by a system of circuits or circuitry configured to perform each operation of each element or device for the game apparatus.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network.

The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While certain embodiments of the present inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A game machine comprising:
   one or more computer readable memories that store one or more software components that include computer executable program instructions; and
   one or more computers that execute the computer executable program instructions to cause the one or more computers to:
   accept one or more game operations;
   accept a bet operation specifying an amount of game value to be consumed;
   determine whether or not the one or more game operations that are accepted satisfy one or more predefined skill conditions;

consume a game value in case that it is determined that the one or more game operations that are accepted satisfy the one or more predefined skill conditions; and change the one or more predefined skill conditions, wherein the one or more computers execute the computer executable program instructions to further cause the one or more computers to determine whether or not the one or more game operations that are accepted satisfy the one or more predefined skill conditions that have been changed.

2. The game machine according to claim 1, wherein the one or more computers execute the computer executable program instructions to further cause the one or more computers to:

accept one or more game operations to game objects, accept one or more bet operations which each specify the consuming amount of the game value to be consumed for the game objects, and determine the consuming amount of the game value, using the amount of game value specified by the bet operation by the bet operation acceptance device for the game object to the one or more game operations that are accepted.

3. The game machine according to claim 1, further wherein the one or more computers execute the computer executable program instructions to further cause the one or more computers to:

accept a bet operation which specifies an amount of the game value, accept one or more game operations to at least one of a plurality of operation acceptance regions, accept one or more bet operations which each specify the consuming amount of the game value to be consumed for each of the plurality of operation acceptance regions, and determine the consuming amount of the game value, using the amount of game value specified by the bet operation for the plurality of operation acceptance region on which the one or more game operations have been accepted by the game operation acceptance device.

4. The game machine according to claim 1, wherein the one or more computers execute the computer executable program instructions to further cause the one or more computers to determine the consuming amount of the game value, using information which represents a progress situation in the game.

5. The game machine according to claim 4, wherein the one or more computers execute the computer executable program instructions to further cause the one or more computers to reduce the consuming amount of the game value, in case that it is determined that a predefined game condition is satisfied using information which represents the progress situation in the game.

6. The game machine according to claim 1, wherein the one or more computers execute the computer executable program instructions to further cause the one or more computers to change the one or more predefined skill conditions by using information which represents the progress situation in the game.

7. The game machine according to claim 1, wherein the one or more computers execute the computer executable program instructions to further cause the one or more computers to change the one or more predefined skill conditions, depending upon the type of the game object.

8. The game machine according to claim 1, wherein the one or more computers execute the computer executable program instructions to further cause the one or more computers to:

accept a setting operation to the one or more predefined skill conditions, set the one or more predefined skill conditions, based on the setting operation that is accepted.

9. The game machine according to claim 1, wherein the one or more computers execute the computer executable program instructions to further cause the one or more computers to:

hold one or more histories of the one or more game operations that are accepted, and set the one or more predefined skill conditions, based on the one or more histories of the one or more game operations that are held.

10. The game machine according to claim 1, wherein the one or more computers execute the computer executable program instructions to further cause the one or more computers to:

accept a plurality of game operations as a single group of game operations;

determine whether or not the single group of game operations that are accepted satisfy the one or more predefined skill conditions; and consume a game value in case that the skill evaluating device determined that the single group of game operations that are accepted satisfy the one or more predefined skill conditions.

11. The game machine according to claim 1, wherein the one or more computers execute the computer executable program instructions to further cause the one or more computers to:

determine a reward to the one or more game operations in a reward determination method based at least one of a result of the determination and a result of a random selection, in case that it is determined that the one or more game operations that are accepted satisfy the one or more predefined skill conditions.

12. The game machine according to claim 11, wherein the one or more computers execute the computer executable program instructions to further cause the one or more computers to:

determine a reward to the one or more game operations in the reward determination method which is selected from a group of a first reward determination method based on the result of the determination and the result of the random selection, a second reward determination method based on the result of the random selection, and a third reward determination method based on the result of the determination.

13. The game machine according to claim 11, wherein the one or more computers execute the computer executable program instructions to further cause the one or more computers to:

accept a reward determination method specifying operation that specifies the reward determination method which determines a reward to the one or more game operations, and determine a reward to the one or more game operations in the reward determination method specified by the reward determination method specifying operation that is accepted.

14. A game machine comprising:
one or more computer readable memories that store one or more software components that include computer executable program instructions; and
one or more computers that execute the computer executable program instructions to cause the one or more computers to:
accept one or more game operations;
consume a game value either before or after the one or more game operations are accepted;
determine whether or not the one or more game operations that are accepted satisfy one or more predefined skill conditions; and
execute a game with a reward which corresponds to at least a part of the game value that has been consumed in case that it is determined that the one or more game operations that are accepted do not satisfy the one or more predefined skill conditions,
wherein the one or more computers execute the computer executable program instructions to further cause the one or more computers to: execute a game with, as a reward, the amount of game value which varies depending upon the number of game operations which did not satisfy the one or more predefined skill conditions after the one or more game operations are accepted.

15. A game machine comprising:
one or more computer readable memories that store one or more software components that include computer executable program instructions; and
one or more computers that execute the computer executable program instructions to cause the one or more computers to:
accept one or more game operations;
consume a game value either before or after the one or more game operations are accepted;
determine whether or not the one or more game operations that are accepted satisfy one or more predefined skill conditions; and
execute a game with a reward which corresponds to at least a part of the game value that has been consumed in case that it is determined that the one or more game operations that are accepted do not satisfy the one or more predefined skill conditions,
wherein the one or more computers execute the computer executable program instructions to further cause the one or more computers to execute a game with a reward which varies depending upon the number of game operations which did not satisfy the one or more predefined skill conditions after the game operation acceptance device accepted the one or more game operations.

* * * * *